(12) United States Patent
Sato et al.

(10) Patent No.: US 7,737,975 B2
(45) Date of Patent: Jun. 15, 2010

(54) NORMAL VECTOR INFORMATION GENERATING DEVICE AND NORMAL VECTOR INFORMATION GENERATING METHOD

(75) Inventors: Satoshi Sato, Osaka (JP); Katsuhiro Kanamori, Nara (JP); Natsuki Saito, Osaka (JP); Mikiya Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/361,707

(22) Filed: Jan. 29, 2009

(65) Prior Publication Data

US 2009/0135183 A1  May 28, 2009

Related U.S. Application Data

(63) Continuation of application No. PCT/JP2008/002162, filed on Aug. 7, 2008.

(30) Foreign Application Priority Data

Aug. 7, 2007  (JP) .............................. 2007-205984

(51) Int. Cl.
G06F 17/00 (2006.01)
G06T 1/00 (2006.01)
G06T 15/00 (2006.01)
G06T 15/50 (2006.01)
G06T 15/60 (2006.01)
G06K 9/34 (2006.01)

(52) U.S. Cl. ....................... 345/426; 382/157; 382/173; 382/174

(58) Field of Classification Search ................. 345/426; 382/154, 173
See application file for complete search history.

(56) References Cited

U.S. PATENT DOCUMENTS 5,028,138 A 7/1991 Wolff (Continued)

FOREIGN PATENT DOCUMENTS

JP 54-130976 10/1979

(Continued)

OTHER PUBLICATIONS

Umeyama et al.; "Separation of Diffuse and Specular Components of Surface Reflection by Use of Polarization and Statistical Analysis of Images;" May 2004; IEEE Transactions on Pattern Analysis and Machine Intelligence; vol. 26, No. 5; pp. 639-647.*

(Continued)

Primary Examiner—Ulka Chauhan
Assistant Examiner—Crystal Murdoch
(74) Attorney, Agent, or Firm—Wenderoth, Lind & Ponack, L.L.P.

(57) ABSTRACT

The normal vector information generating device generates normal vector information on the surface of an object, and includes: an image information obtaining unit obtaining information about an image of the object, the information including luminance information about luminance of light from the object and polarization information about polarization of the light; a shadow area extracting unit extracting an attached shadow area and a cast shadow area from the image based on the luminance information and the polarization information, the attached shadow area appearing on the surface of the object depending on an angle of incidence light, and the cast shadow area appearing on the surface of a material body when the light is blocked by the object; and a normal vector information generating unit generating normal vector information identifying a normal vector on the surface of the object in the attached shadow area using the polarization information.

22 Claims, 46 Drawing Sheets

(a) Object (ball)    (b) Degree of Polarization ρ

(c) Polarization phase φ    (d) Estimated polarization error E

U.S. PATENT DOCUMENTS

| | | | |
|---|---|---|---|
| 2006/0239584 | A1 | 10/2006 | Motomura et al. |
| 2007/0092132 | A1* | 4/2007 | Sato et al. .................. 382/154 |
| 2007/0222781 | A1 | 9/2007 | Kondo et al. |
| 2009/0141027 | A1* | 6/2009 | Sato et al. .................. 345/426 |

FOREIGN PATENT DOCUMENTS

| | | |
|---|---|---|
| JP | 5-264245 | 10/1993 |
| JP | 11-211433 | 8/1999 |
| JP | 2002-024818 | 1/2002 |
| JP | 2002-303513 | 10/2002 |
| JP | 2005-049935 | 2/2005 |
| JP | 2007-086720 | 4/2007 |
| WO | 2006/077710 | 7/2006 |
| WO | 2007/029446 | 3/2007 |
| WO | 2007/139070 | 12/2007 |
| WO | 2008/099589 | 8/2008 |

OTHER PUBLICATIONS

Terrier et al.; "A Device to Classify Surface Orientation from Polarization Images;" 2000; IEEE; pp. 495-498.*

Rahmann, Stefan; "Polarization Images: A Geometric Interpretation for Shape Analysis;" 2000; IEEE; pp. 538-542.*

Horn, Berthold; "Obtaining Shape from Shading Information;" 1989; MIT Press; pp. 115-155.*

Morel et al.; "Active Lighting Applied to Shape from Polarization;" 2006; IEEE; pp. 2181-2184.*

Miyazaki et al.; "Transparent Surface Modeling from a Pair of Polarization Images;" Jan. 2004; IEEE Transactions on Pattern Analysis and Machine Intelligence; vol. 26, No. 1; pp. 73-82.*

Ondrej Drbohlav et al., "Using Polarization to Determine Intrinsic Surface Properties", Proc. SPIE, vol. 3826, Jun. 1999, pp. 253-263.

Takayuki Kawashima et al., "Development of polarization imaging device and applications by using patterned polarizer," the 2006 General Conference of the Institute of Electronics, Information and Communication, No. D-11-52, 2006, p. 52 (and its partial English translation).

Megumi Saito et al., "Measurement of Surface Orientations of Transparent Objects Using Polarization in Highlight," the Journal of the Institute of Electronics, Information and Communication, D-II, vol. J82-D-II, No. 9, 1999, pp. 1383-1390 (and its English Abstract).

L. B. Wolff et al., "Constraining Object Features Using a Polarization Reflectance Model," IEEE Transactions on Pattern Analysis and Machine Intelligence, vol. 13, No. 7, Jul. 1991, pp. 635-657.

Gary A. Atkinson et al., "Recovery of Surface Orientation From Diffuse Polarization," IEEE Transactions on Image Processing, vol. 15, No. 6, Jun. 2006, pp. 1653-1664.

Daisuke Miyazaki et al., "Polarization-based Inverse Rendering from a Single View," Proceedings of the Ninth IEEE International Conference on Computer Vision (ICCV' 03), 2003.

* cited by examiner

FIG. 7
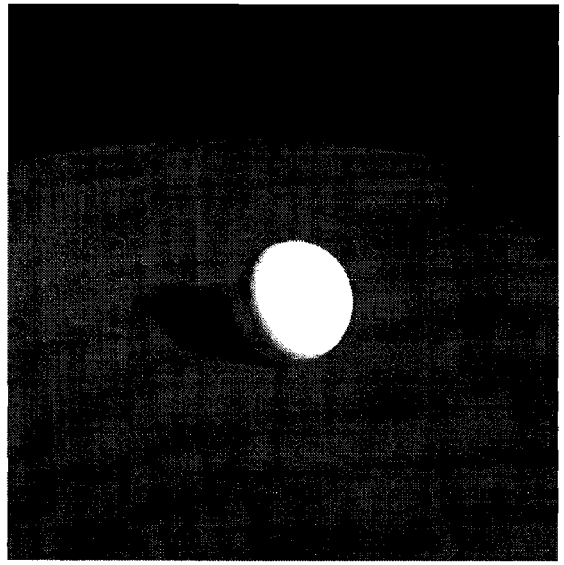
(a) Object (ball)
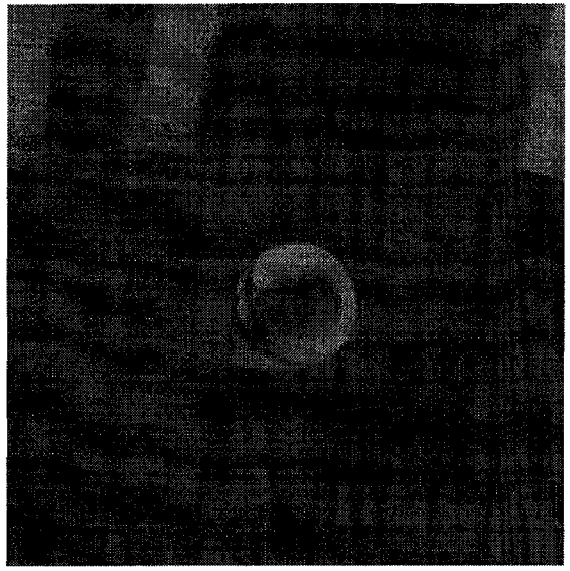
(b) Degree of Polarization $\rho$
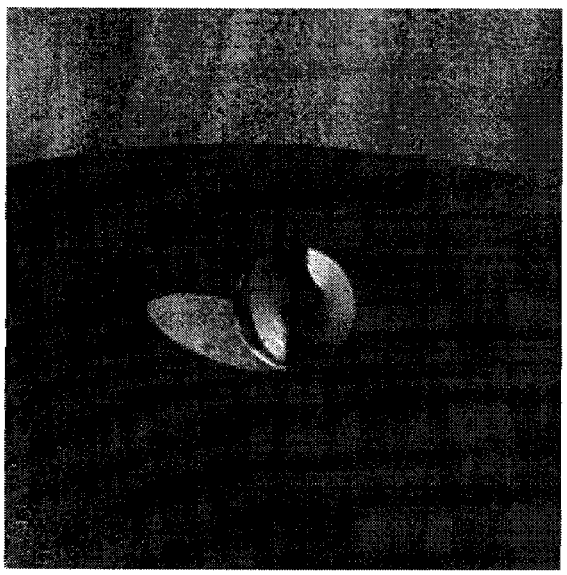
(c) Polarization phase $\phi$
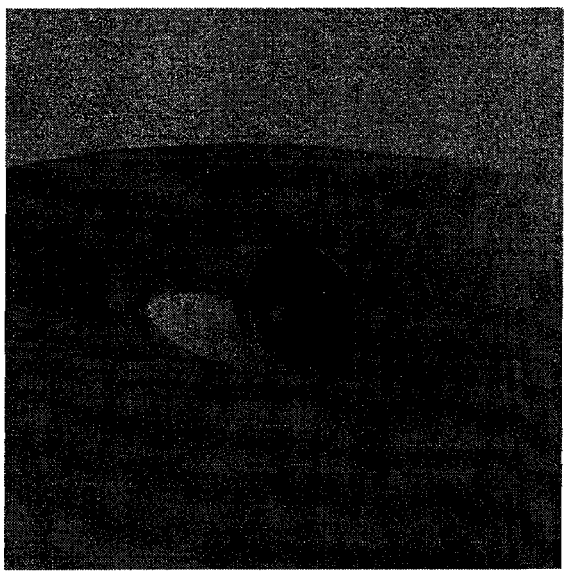
(d) Estimated polarization error E FIG. 8
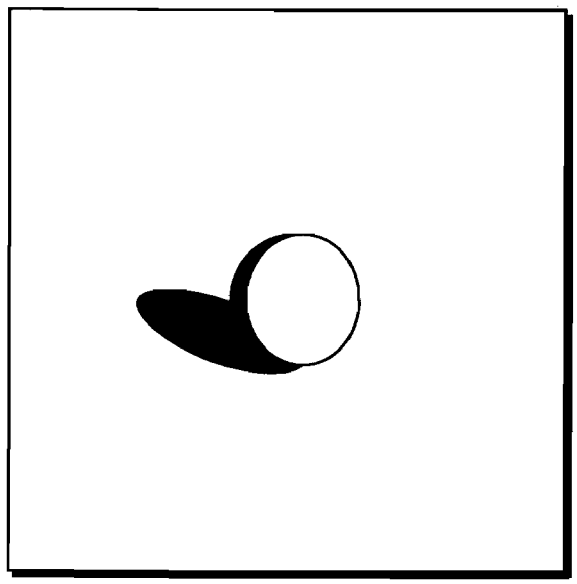
(a) Object (ball)
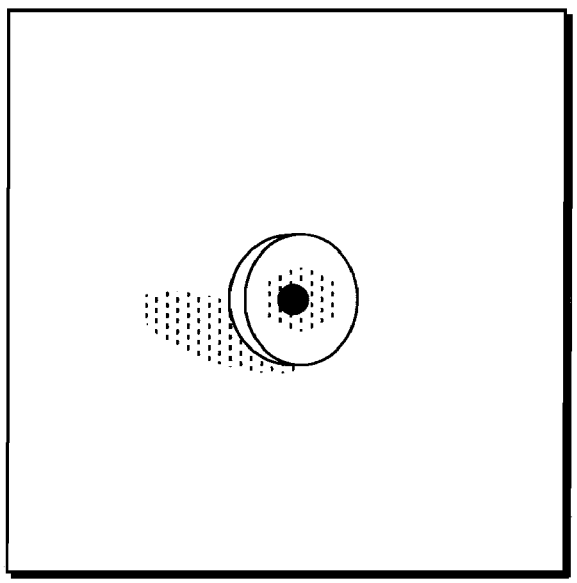
(b) Degree of Polarization ρ
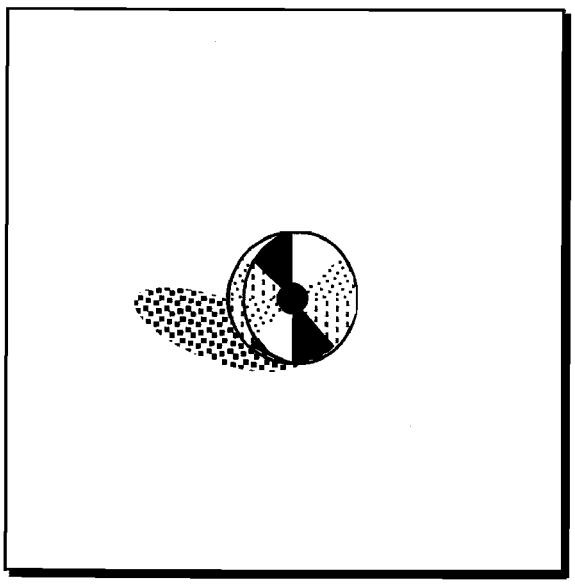
(c) Polarization phase φ
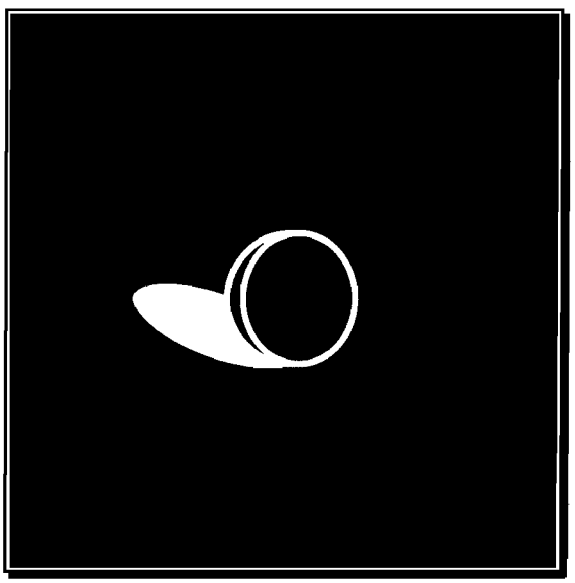
(d) Estimated polarization error E FIG. 16
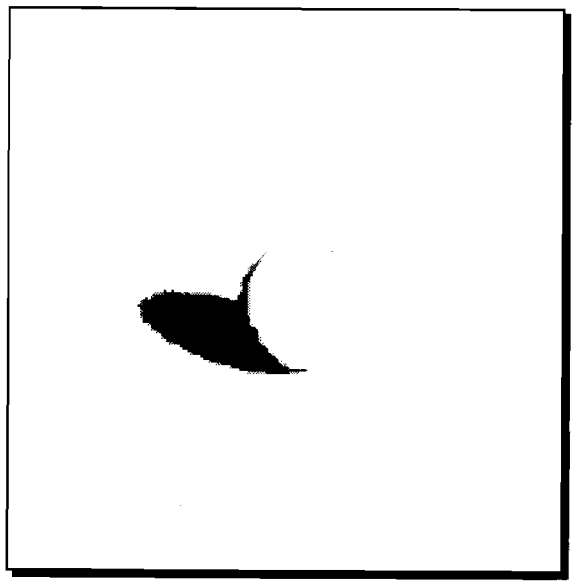
(a) Shadow area
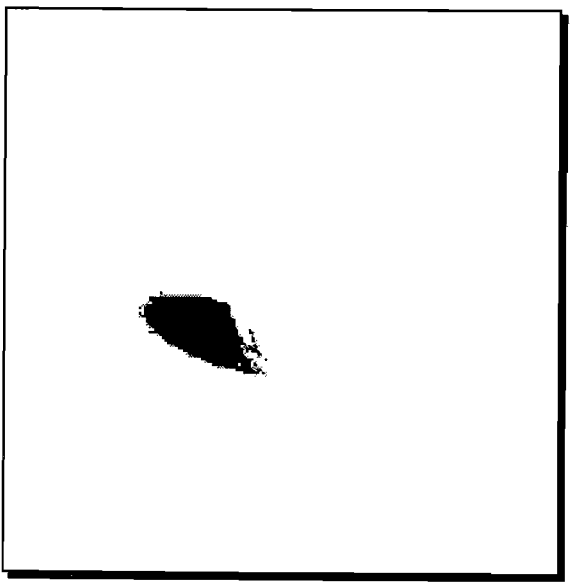
(b) Cast shadow area
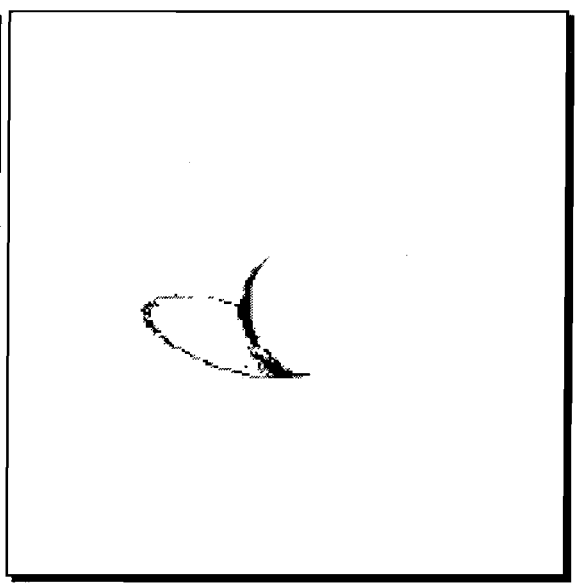
(c) Attached shadow area

FIG. 18

| Pixel position | Amplitude A | Degree of polarization ρ | Polarization phase [rad] | Estimated polarization error E | Area division result |
|---|---|---|---|---|---|
| ... | ... | ... | ... | ... | ... |
| (141,117) | 269.5 | 0.0968 | 0.900 | $2.48 \times 10^3$ | Diffuse reflection area |
| ... | ... | ... | ... | ... | ... |
| (151,138) | 14435 | 0.794 | 2.29 | $2.33 \times 10^6$ | Specular reflection area |
| ... | ... | ... | ... | ... | ... |
| (111,144) | 33.1 | 0.0983 | 0.00639 | $4.02 \times 10^2$ | Attached shadow area |
| ... | ... | ... | ... | ... | ... |
| (98,151) | 4.01 | 0.0167 | 1.28 | $7.92 \times 10^2$ | Cast shadow area |
| ... | ... | ... | ... | ... | ... |
| (164,144) | 588.7 | 0.0946 | 1.78 | $4.65 \times 10^3$ | Diffuse reflection area |
| ... | ... | ... | ... | ... | ... |

N = 37 (polarizer is rotated by 5 degrees)

FIG. 19

| Area | Amplitude A | Degree of polarization ρ | Estimated polarization error E |
|---|---|---|---|
| Diffuse reflection area | A ≥ 256 | ρ < 0.7 | — |
| Specular reflection area | | ρ ≥ 0.7 | E ≤ $(0.3)^2 \cdot (2A)^2 \cdot N$ |
| Attached shadow area | A < 256 | — | E > $(0.3)^2 \cdot (2A)^2 \cdot N$ |
| Cast shadow area | | | |

A: Amplitude of luminance variation curve by polarizers
N = 37 (the number of samples, polarizers are rotated by 5 degrees)

FIG. 46
(a) 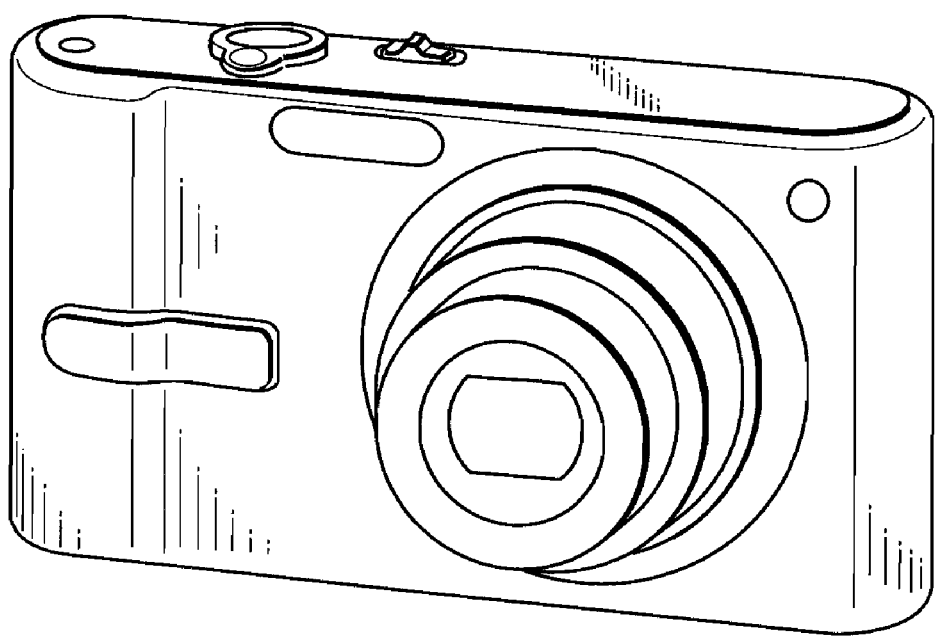
(b) 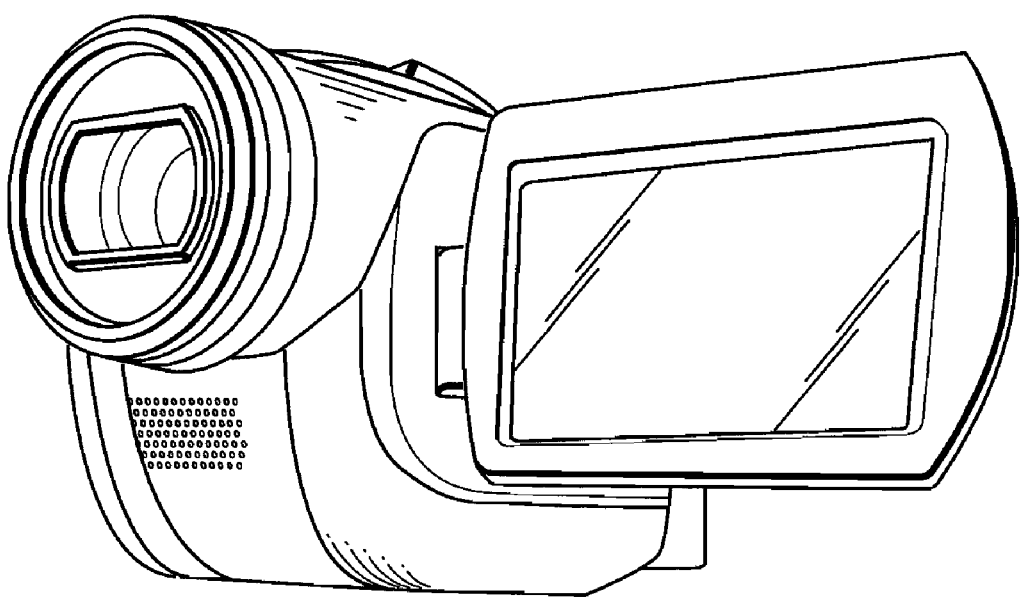

FIG. 48
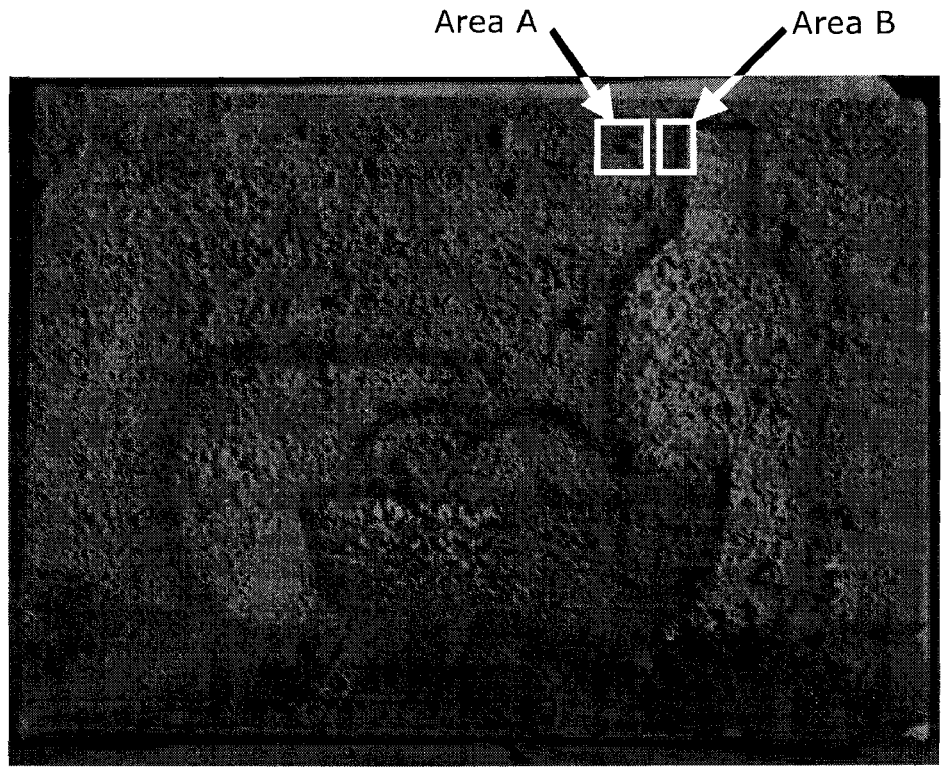
(a) Object (oil painting)
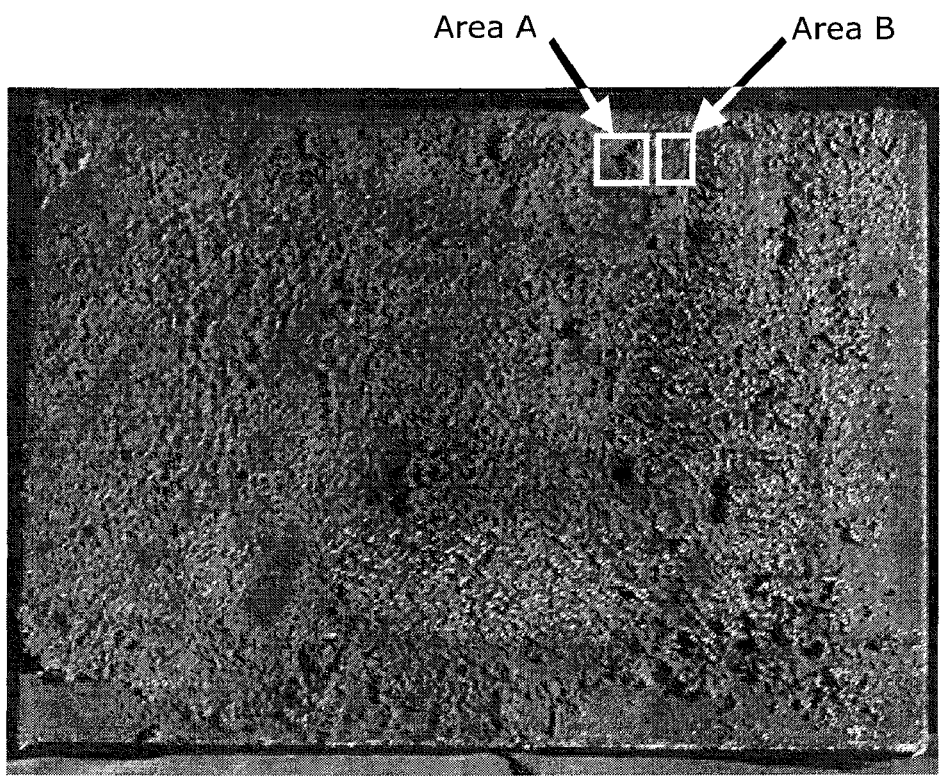
(b) Degree of polarization $\rho$

NORMAL VECTOR INFORMATION GENERATING DEVICE AND NORMAL VECTOR INFORMATION GENERATING METHOD

CROSS REFERENCE TO RELATED APPLICATION

This is a continuation application of PCT application No. PCT/JP2008/002162 filed Aug. 7, 2008, designating the United States of America.

BACKGROUND OF THE INVENTION (1) Field of the Invention

The present invention relates to a device which generates normal vector information on the surface of an object, and in particular to a device which generates normal vector information from a polarized image.

(2) Description of the Related Art

It is said that mobile phones with a camera, digital cameras, digital movie cameras, and the like will be highly refined in the future as in the case of high definition televisions (HDTV), and miniaturization of these is being progressed to provide added values. However, it is conceivable that miniaturization of an optical system and imaging elements causes problems of limiting sensitivity and basic imaging performances such as the diffraction limit of a lens, and that high refinement will reach the limit in the future. In this case, the image quality can be enhanced by assigning, using computer graphics, information related to various physical characteristics used to generate an image, in addition to obtained insufficient image information of an object. For this, physical information in an image generating process must be obtained beyond the range of the conventional two-dimensional image processing. Examples of such physical information include three-dimensional shape information of the object, and a light source for lighting the object. Input of shape information requires an active sensor which projects a laser light or a LED light source, a distance measuring system such as a two-eye stereo, or the like, and thus requires a large system. This generates restrictions that, for example, it is only possible to reduce a distance between a camera and an object approximately to a few meters, and a target object must be a bright solid diffuse object. Therefore, such camera or the like cannot be used to image distant outside scenes such as scenes in athletics meets and to image portraits where hairs and clothes are important.

One of techniques which can be used to image outside scenes and general objects is a technique for using polarization as a completely passive method for sensing the shapes of objects. For example, Patent Reference 1 discloses a method for generating normal vector information of portions of an object according to a method for observing specular reflection components while rotating a deflecting plate mounted in the front of the lens of a camera without making any special assumption for lighting the object (random polarization: non-polarized lighting). The surface normal vector of the object has two-dimensional degrees of freedom determined by calculating two angles that are an angle of an incident plane containing rays of incidence light and reflected light and an angle of incidence on the incidence plane. The information of incidence plane for specular reflection is calculated from the angle at which the value of luminance changed by the rotation of the deflecting plate becomes the minimum.

For example, in Patent Reference 1, the one-dimensional degree of freedom of an angle at an emission plane containing rays of incidence light and reflected light is calculated from among the normal vector information of the object according to a method for observing diffuse reflection components while rotating the deflecting plate mounted in the front of the lens of the camera without making any special assumption for lighting the object (random polarization: non-polarized lighting). The information of emission plane for diffuse reflection is calculated from the angle at which the value of luminance changed by the rotation of the deflecting plate becomes the maximum. According to this approach, it is possible to calculate two-dimensional degrees of freedom which represent the normal vectors of an object by performing stereo processing while changing the positions of the camera and the light source.

[Patent Reference 1] Specification of U.S. Pat. No. 5,028,138
[Non-patent Reference 1] Ondrej Drbohlav and Sara Radim, "Using polarization to determine intrinsic surface properties", Proc. SPIE Vol. 3826, pp. 253-263, 1999

SUMMARY OF THE INVENTION

However, the technique of the above-mentioned Patent Reference 1 is directed to specular reflection only, and thus entails a problem that no normal vector information can be generated for shadow areas. In addition, the technique of the above-mentioned Patent Reference 1 is directed to diffuse reflection only, and thus entails a problem that normal vector information cannot be generated accurately for areas such as shadow areas and specular reflection areas having reflection characteristics different from those of diffuse reflection.

In other words, each of the conventional techniques generates normal vector information using polarization, but entails a problem that normal vector information for shadow areas cannot be generated any more. In the case where no normal vector information is generated for shadow areas, estimation accuracy of normal vector information is increased, but areas for which normal vector information can be estimated are limited. In the opposite case where normal vector information for shadow areas is generated according to any of the conventional technique, the accuracy is extremely low.

For this, the present invention aims to provide a normal vector information generating device and the like which can generate normal vector information for shadow areas highly accurately.

In order to achieve the aim, the normal vector information generating device according to the present invention generates normal vector information on the surface of an object, and includes: an image information obtaining unit configured to obtain information about an image of the object, the information including luminance information which is information about luminance of light from the object and polarization information which is information about polarization of the light from the object; a shadow area extracting unit configured to extract an attached shadow area and a cast shadow area from the image of the object based on the luminance information and the polarization information obtained by the image information obtaining unit, the attached shadow area appearing on the surface of the object depending on an angle of incidence light, and the cast shadow area appearing on the surface of a material body other than the object when the light is blocked by the object; and a normal vector information generating unit configured to generate normal vector information identifying a normal vector on the surface of the object in the attached shadow area extracted by the shadow area extracting unit using the polarization information obtained by the image information obtaining unit. In this way, normal vector information on the surface of the corresponding object is generated for the shadow areas using the polarized information.

In other words, the present invention generates normal vector information focusing on the differences in the polarization characteristics between the attached shadow areas and cast shadow areas. At this time, the shadow areas are divided into attached shadow areas and cast shadow areas based on the differences in the polarization characteristics, and accurate normal vector information of the attached shadow areas is generated assuming specular reflection.

In addition, as for the cast shadow areas of which polarization information includes a lot of errors and normal vector information is generated with an extremely low accuracy, no normal vector information generating process is performed so as to generate highly accurate normal vector information for areas as large as possible.

Here, a "shadow" appears when light reaches a solid, and contains an "attached shadow" and a "cast shadow". An "attached shadow" appears on the solid itself depending on the angle of incidence light, and a "cast shadow" appears on a plane or on the surface of another solid when light is blocked by the solid.

It is to be noted that the present invention can be implemented not only as a normal vector information generating device, but also as a normal vector information generating method, as a program causing a computer to execute the steps included in the method, and as a computer readable recording medium such as DVDs on which the program is recorded.

According to the present invention, it is possible to extract attached shadow areas and cast shadow areas using the polarization information of an object and to generate normal vector information of the attached shadow areas. Thus, it is possible to generate normal vector information for shadow areas highly accurately.

Thus, the present invention generates three-dimensional shape information of an object, thereby allowing high refinement of images. Therefore, the present invention is highly practical today when mobile imaging devices such as mobile phones with a camera, digital cameras, digital movie cameras and the like are becoming popular because image resolutions are important for such mobile imaging devices with an optical system and imaging elements miniaturized.

FURTHER INFORMATION ABOUT TECHNICAL BACKGROUND TO THIS APPLICATION

The disclosure of Japanese Patent Application No. 2007-205984 filed on Aug. 7, 2007 including specification, drawings and claims is incorporated herein by reference in its entirety.

The disclosure of PCT application No. PCT/JP2008/002162 filed, Aug. 7, 2008, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7($a$) is a diagram showing a plastic sphere ball as an object, and FIG. 7($b$) to ($d$) are diagrams which respectively represent, in the three images, the degree of polarization $\rho$, the polarization phase angle $\phi$, and the estimated polarization error E in the case where the object is imaged;

FIG. 8($a$) to ($d$) are schematic diagrams obtained by emphasizing the contrast of the respectively corresponding FIG. 7($a$) to ($d$);

FIGS. 16($a$), ($b$), and ($c$) are diagrams showing the results of optical area division performed by the area dividing unit in Embodiment 1 of the present invention;

FIG. 18 is a diagram showing a specific example of area division performed by the area dividing unit in Embodiment 1 of the present invention;

FIG. 19 is a diagram showing a specific example of judgment standards at the time of area division performed by the area dividing unit;

FIGS. 46($a$) and ($b$) are diagrams showing examples of application products containing a normal vector information generating device according to the present invention;

FIG. 48($a$) is an image of oil painting as an object, and FIG. 48($b$) is a diagram showing the degree of polarization β (polarization information) corresponding to the image shown in FIG. 48($a$)

DESCRIPTION OF THE PREFERRED EMBODIMENT(S)

An Embodiment is described below with reference to the drawings.

Embodiment 1

First, a description is given of the outline of a normal vector information generating device in Embodiment 1 of the present invention.

Figure 1:
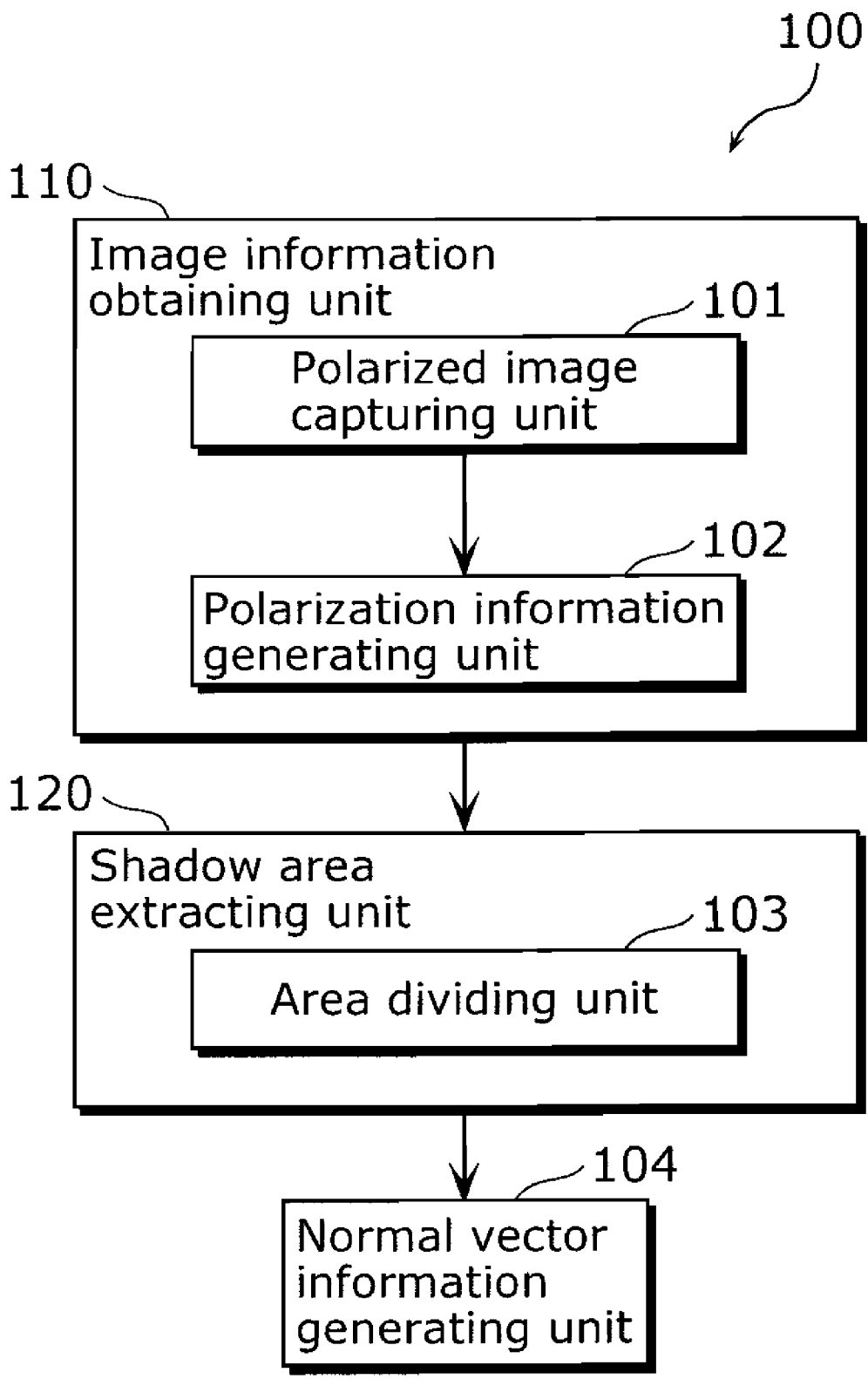
FIG. 1 is a functional block diagram showing the structure of a normal vector information generating device in Embodiment 1 of the present invention.

FIG. 1 is a functional block diagram showing the structure of a normal vector information generating device 100 in this Embodiment. This normal vector information generating device 100 is a device that generates normal vector information in the surface of an object, and includes an image information obtaining unit 110, a shadow area extracting unit 120, and a normal vector information generating unit 104.

The image information obtaining unit 110 is a processing unit for obtaining information related to an object image including luminance information about luminance of light from the object, and polarization information about polarization of light from the object, and includes a polarized image capturing unit 101 and a polarization information generating unit 102. It is to be noted that this image information obtaining unit 110 obtains luminance information and polarization information for each unit image which makes up the object image.

The polarized image capturing unit 101 in the image information obtaining unit 110 is a processing unit for obtaining a polarized image of an object by receiving light transmitted through polarizers each having a different angle of a polarization principal axis.

The polarization information generating unit 102 in the image information obtaining unit 110 is a processing unit for generating, from the polarized image obtained by the polarized image capturing unit 101, polarization information about polarization of received light for each of image areas which make up the polarized image using the correspondence relation between the angles of polarization principal axes of the polarizers and the luminance of light transmitted through the polarizers.

The shadow area extracting unit 120 is a processing unit for extracting, from the object image, attached shadow areas and cast shadow areas on a per unit image basis, based on luminance information and polarization information obtained by the image information obtaining unit 110. The attached shadow areas are areas in which attached shadows appear on the surface of an object depending on the angle of incidence light, and cast shadow areas are areas in which cast shadows appear on the surface of a material body other than the object when light is blocked by the object. This Embodiment includes an area dividing unit 103 which performs area division as an example of area extraction.

The area dividing unit 103 in the shadow area extracting unit 120 is a processing unit for dividing a polarized image into image areas each of which is made of a group of image areas having common optical characteristics, based on similarity (likeness) between the luminance information of the polarized image and the polarized information generated by the polarization information generating unit 102. At this time, the area dividing unit 103 compares the luminance of each image area and a predetermined threshold value. When the luminance is less than the threshold value, the area dividing unit 103 classifies the image area into a low luminance area (shadow area in this Embodiment) including a shadow area (an attached shadow area and a cast shadow area).

This area dividing unit 103 performs area division on an image (a polarized image here), but it is to be noted that operations performed by the shadow area extracting unit in the present invention are not limited to such area division, and area extraction (that is, a process for identifying a part of an area in an image) may be performed instead. In other words, in order to facilitate understanding of the present invention, this DESCRIPTION describes, as an example of area extraction, area division for classifying all the areas of an image into any of several kinds of areas including attached shadow areas and cast shadow areas. However, the normal vector information generating device according to the present invention may perform any area extraction for identifying some of the areas in the image without performing such area division. Thus, "area division (classification into areas) in the DESCRIPTION may be read as "area extraction (extraction of areas). In addition, the definition of "area detection (detection of areas) in the DESCRIPTION is the same as that of "area extraction (extraction of areas).

The normal vector information generating unit 104 is a processing unit for generating, for each of the areas divided by the area dividing unit 103, normal vector information identifying a normal vector on the surface of a corresponding object using the polarization information generated by the polarization information generating unit 102.

Figure 2:
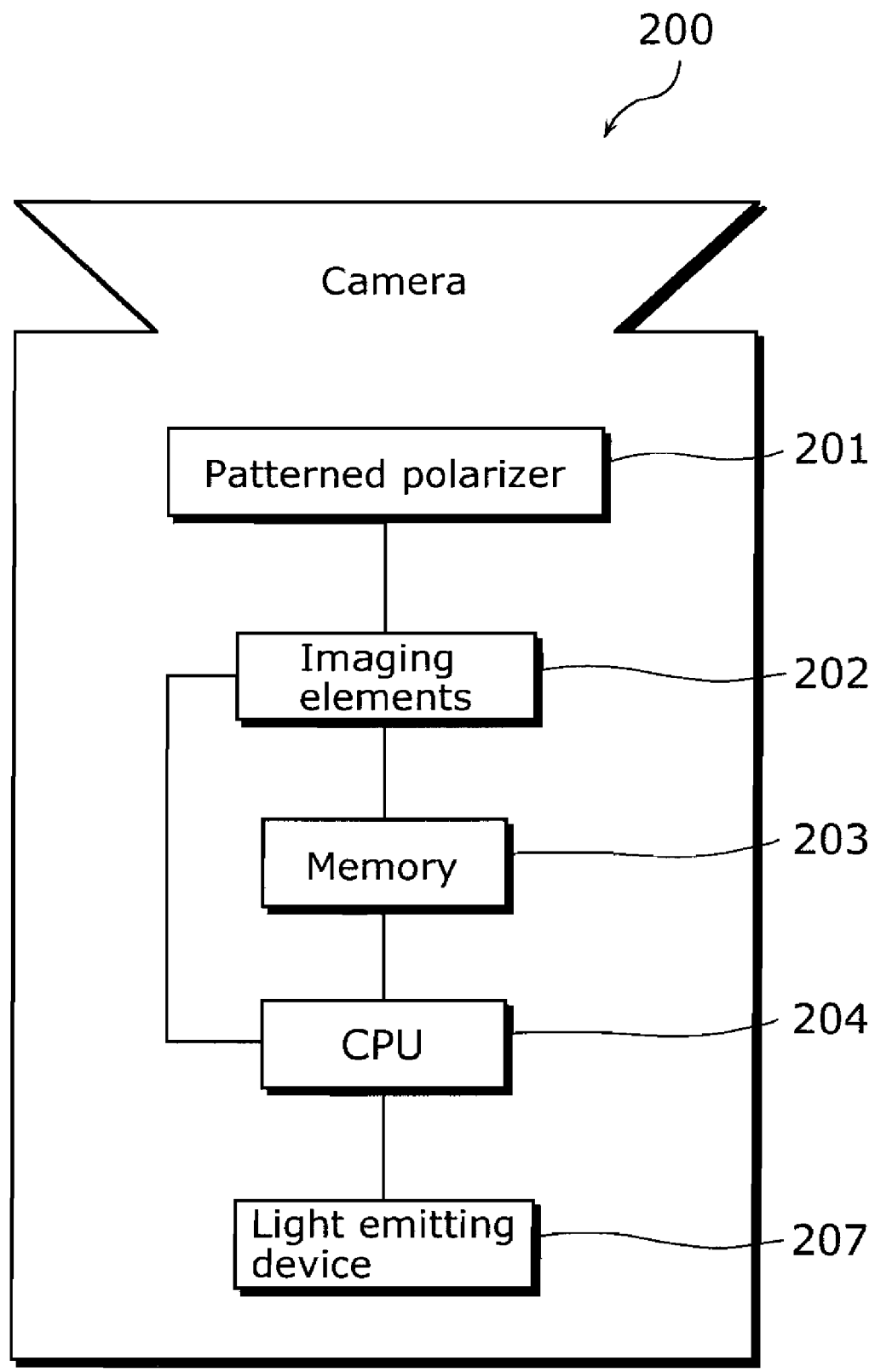
FIG. 2 is a structural diagram of a camera mounting a normal vector information generating device in Embodiments 1, 2, and 4 of the present invention.
Figure 3:
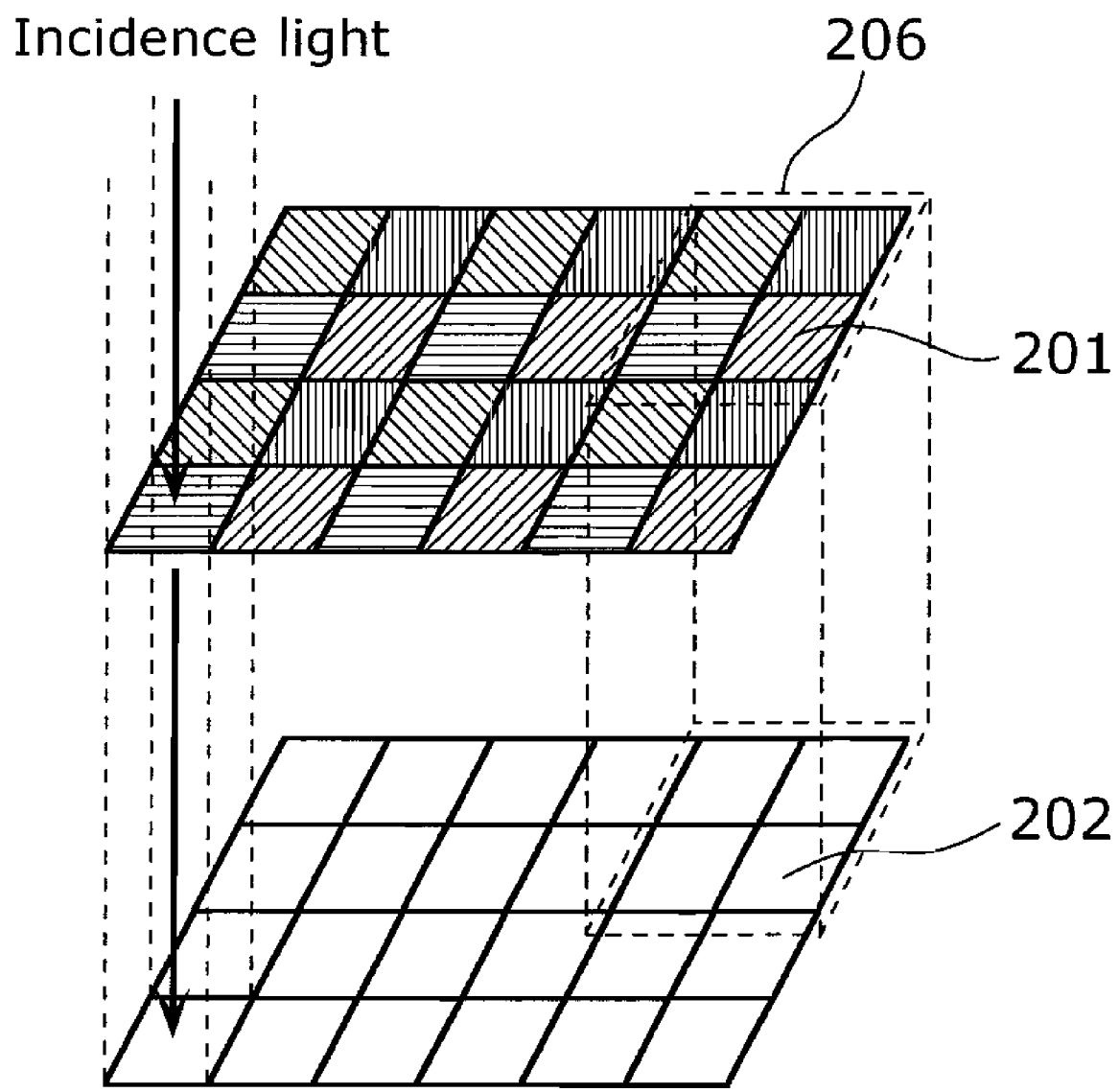
FIG. 3 is a schematic diagram showing the relationship between a patterned polarizer and imaging elements provided in the camera shown in FIG. 2.

FIG. 2 shows an example of the hardware structure of a camera 200 mounting the normal vector information generating device 100 in this Embodiment. FIG. 3 is a schematic diagram showing the relationship between the patterned polarizer 201 and the imaging elements 202 shown in FIG. 2. This camera 200 is an imaging device including a function for generating normal vector information, and includes the patterned polarizer 201, imaging elements 202, a memory 203, a CPU 204, and a light emitting device 207.

The patterned polarizer 201 is a group of polarizers arranged in a matrix. As shown in FIG. 3, each group of polarizers is a set of four kinds of polarizers having polarization principal axis angles ψi of 0, 45, 90, and 135 degrees respectively.

As shown in FIG. 3, each of the imaging elements 202 is a group of pixels (light-receiving elements) which are arranged in a matrix and receive light transmitted through the respective polarizers which make up the patterned polarizer 201. Desirably, the imaging elements 202 are arranged horizontally with respect to the imaging surface. It is to be noted that an imaging unit 206 is made of four (kinds of) polarizers in the patterned polarizer 201, and four pixels (light receiving elements) corresponding to the imaging elements 202. The image obtained using this imaging unit 206 is a unit ("unit image") to be processed in the processes performed by the polarization information generating unit 102, the area dividing unit 103, and the normal vector information generating unit 104. In other words, the normal vector information generating device 100 performs generation of polarization information, area division, and generation of normal vector information for each unit image (also referred to as "pixel" hereinafter) obtained using the imaging unit 206.

The memory 203 includes a RAM as an operation area for the CPU 204 and a ROM in which a program or the like is stored.

The CPU 204 is a processor which executes a program stored in the memory 203, accesses the memory 203, and controls the imaging elements 202 and the light emitting device 207.

The light emitting device 207 is a flash which projects light on the object.

It is to be noted that the polarized image capturing unit 101 shown in FIG. 1 is implemented as the patterned polarizer 201 and the imaging elements 202 shown in FIG. 2. The polarization information generating unit 102, the area dividing unit 103, and the normal vector information generating unit 104 shown in FIG. 1 are implemented by means that the CPU 204 shown in FIG. 2 executes the program stored in the memory 203. In addition, the memory 203 is used as an operation area for storing the polarized image obtained by the polarized image capturing unit 101, the polarization information generated by the polarization information generating unit 102, the normal vector information generated by the normal vector information generating unit 104, various parameters generated temporarily, and the like.

Figure 4:
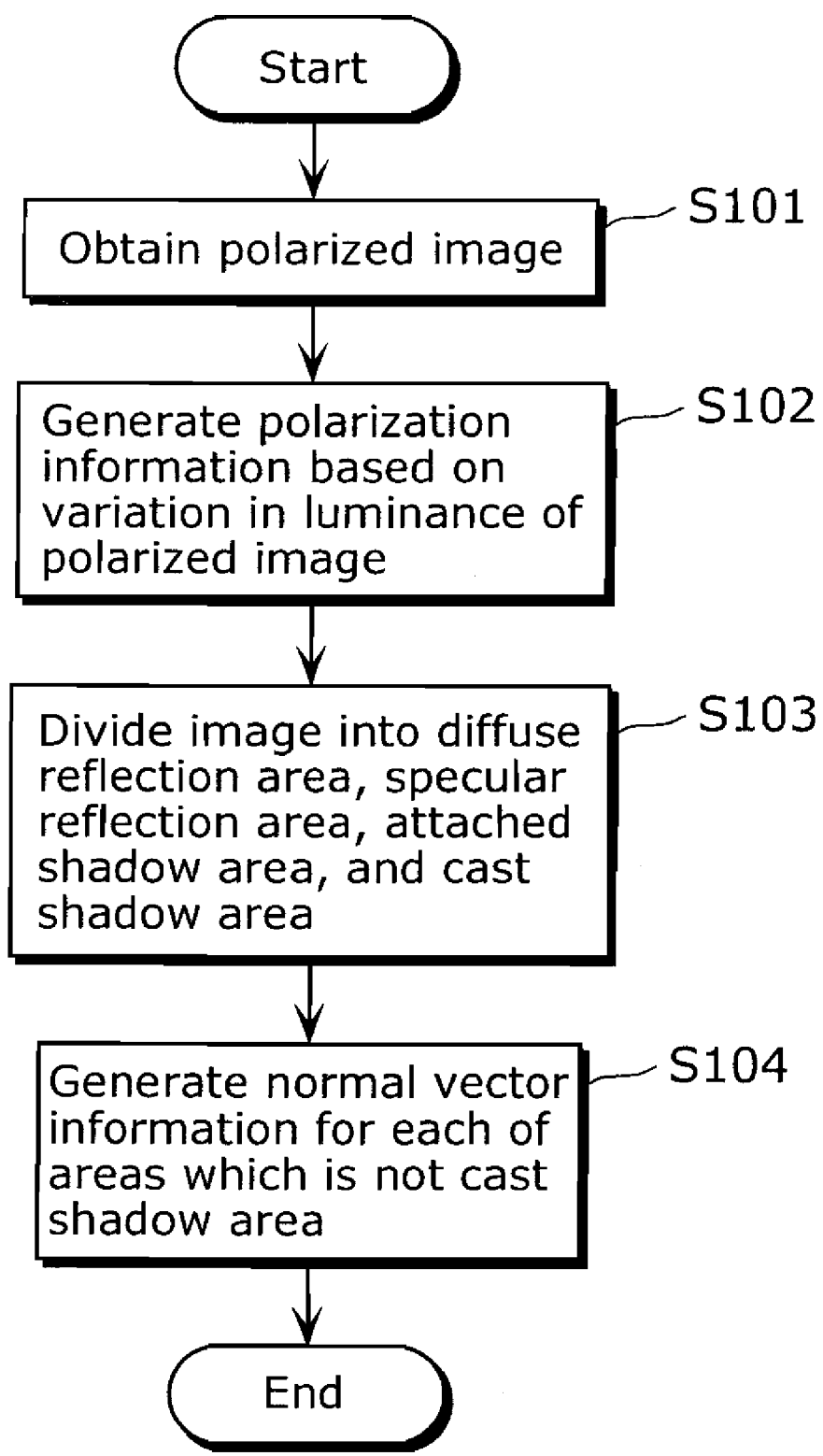
FIG. 4 is a flowchart of processes performed by the normal vector information generating device in Embodiment 1 of the present invention.

FIG. 4 is a flowchart of processes performed by the normal vector information generating device 100 in this Embodiment. First, the polarized image capturing unit 101 images a polarized image which is an image including polarization information by means that the imaging elements receives light from the object through the patterned polarizer 201 (S101). The polarization information generating unit 102 generates polarization information using luminance variation of the polarized image captured by the polarized image capturing unit 101 (S102). The area dividing unit 103 divides the image into diffuse reflection areas, specular reflection areas, and low luminance areas (attached shadow areas and cast shadow areas in this Embodiment) using the polarization information generated by the polarization information generating unit 102 and the luminance information obtained by the polarized image capturing unit 101 (S103). The normal vector information generating unit 104 generates normal vector information from polarization information that the polarization information generating unit 102 has generated based on the result of the area division performed by the area dividing unit 103 (S104). At this time, no normal vector information is generated because a lot of errors are included in the polarization information about cast shadow areas.

Next, descriptions are given of detailed functions of the respective functional elements of the normal vector information generating device 100 in this Embodiment.

Figure 5:
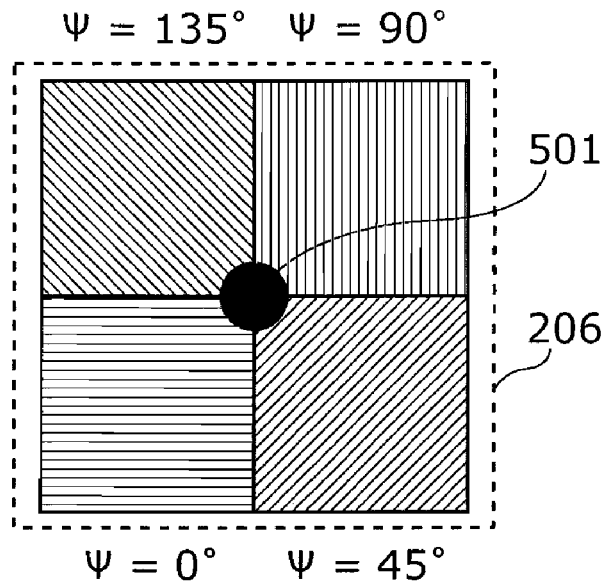
FIG. 5 is a schematic diagram for illustrating an arrangement state of the patterned polarizer provided in the camera shown in FIG. 2.

First, a detailed description is given of the polarized image capturing unit 101. The polarized image capturing unit 101 obtains polarized image including polarization information by means that the imaging elements 202 receive light from the object through the patterned polarizer 201. FIG. 5 is a diagram of a schematic view when the imaging units 206 shown in FIG. 3 are viewed in the direction of incidence light. In this diagram, the straight lines within each polarizer (each pixel) show the direction of the polarization principal axis of a micro deflecting plate placed on the pixel. In other words, this imaging unit 206 holds pixels including four kinds of polarization directions which forms rotation angles (of ψi=0, 45, 90, and 135 degrees) with respect to the polarization axis. The patterned polarizer shows polarization characteristics that TM waves are transmitted while TE waves are reflected (not transmitted).

These characteristics are produced using photonic crystals disclosed, for example, in Non-patent Reference 2: "Pattern ka henkohshi wo mochiita henkoh imaging device to riyoh gijyutsu no kaihatsu (Development of polarization imaging device and applications using patterned polarizer)", the 2006 General Conference of the Institute of Electronics, Information and Communication, No. D-11-52, page 52, 2006. In the case of photonic crystals, light having vibration planes horizontal to grooves formed on the surfaces is TE waves, and light having vibration planes vertical to the grooves formed on the surfaces is TM waves.

As for imaging of this polarization information, the luminance dynamic range and the number of bits are desirably large as much as possible (for example, 16 bits).

Next, a description is given of detailed functions of the polarization information generating unit 102. The polarization information generating unit 102 is a processing unit for generating polarization information using polarized image obtained by the polarized image capturing unit 101.

Figure 6:
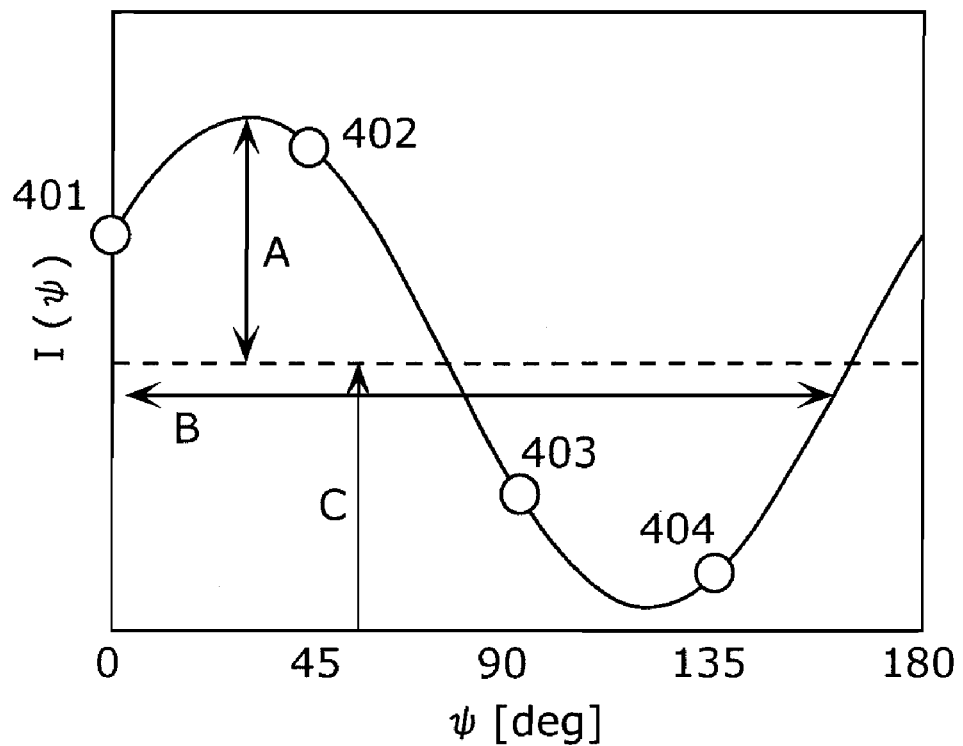
FIG. 6 is a schematic diagram for illustrating a luminance sinusoidal variation and observed luminance points.

It is known that the luminance changes after the transmission through the polarizers depending on the angles of polarization principal axes of the polarizers. FIG. 6 shows luminance sinusoidal curves 401 to 404 after the transmission through the four kinds of polarizers having different polarization principal axis angles $\psi i$ of 0, 45, 90, and 135 degrees, respectively. In other words, these sinusoidal curves show polarization characteristics in the point 501 in FIG. 5. It is to be noted that the polarization principal axis angle of 0 degree is identical to 180 degrees (n). In addition, it is desirable that a camera for achieving imaging gamma of 1 is used or the imaging gamma is corrected to 1 by linearity correction in the obtainment of these sinusoidal curves. These four points are drawn exactly on the respective sinusoidal curves, but in reality, it is desirable that one of these sinusoidal curves in 180-degree cycle is determined as the optimum value based on a lot of observation points.

This polarization information generating unit 102 generates, as polarization information, the amplitude and phase information of this curve. More specifically, the reflected light luminance I with respect to the principal axis angle $\phi$ of the patterned polarizer 201 is approximated as shown below.

[Math 1]

$$I(\psi) = A \cdot \sin 2(\psi - B) + C \quad \text{(Expression 1)}$$

Here, as shown in FIGS. 6, A, B, and C are constants in Expression 1, and represents the amplitude, phase, and average value of a luminance variation curve by a polarizer, respectively. Here, Expression 1 is expanded as shown below.

[Math 2]

$$I(\psi) = a \cdot \sin 2\psi + b \cdot \cos 2\psi + C \quad \text{(Expression 2)}$$

Where,

[Math 3]

$$A = \sqrt{a^2 + b^2}, \sin(-2B) = \frac{b}{\sqrt{a^2 + b^2}}, \quad \text{(Expression 3)}$$
$$\cos(-2B) = \frac{a}{\sqrt{a^2 + b^2}}$$

[Math 4]

$$B = -\frac{1}{2}\tan^{-1}\left(\frac{b}{a}\right) \quad \text{(Expression 4)}$$

In other words, a sinusoidal (Expression 1) is approximated by calculating A, B, and C which minimize the following Expression 5 in the samples ($\phi i$, Ii) of the four pixels. However, Ii shows an observation luminance at the time when the rotation angle of the deflecting plate is $\phi i$. In addition, N is the number of samples, and is 4 here.

[Math 5]

$$f(a, b, C) = \sum_{i=0}^{N-1} (I_i - a \cdot \sin 2\psi_i - b\cos 2\psi_i - C)^2 \quad \text{(Expression 5)}$$

The above processes determine three parameters A, B, and C in sinusoidal approximation.

The polarization information generating unit 102 generates any one or some of the following as polarization information using parameters calculated in this way.

The degree of polarization $\rho$

[Math 6]

$$\rho = \frac{I_{max} - I_{min}}{I_{max} + I_{min}} = \frac{A}{C} = \frac{A}{\overline{I}} \quad \text{(Expression 6)}$$

Polarization phase $\phi$ (0 degree $\leq \phi \leq$ 180 degrees)

[Math 7]

$$\phi = \frac{\pi}{4} + B \quad \text{(Expression 7)}$$

Estimated polarization error E

[Math 8]

$$E = \sum_{i=0}^{N-1} (I_i - A \cdot \sin 2(\psi_i - B) - C)^2 \quad \text{(Expression 8)}$$

Here, the degree of polarization is a parameter indicating the degree of polarization of light. A polarization phase is the angle at which luminance changing depending on the angle of the polarization principal axis becomes maximum. An estimated polarization error is the total of differences between the luminance values observed in the four pixel samples and the corresponding luminance values determined from the above sinusoidal obtained through the approximation.

FIG. 7 is a diagram representing, in form of images, the degree of polarization $\rho$, the polarization phase $\phi$, and the estimated polarization error E in the case where a plastic sphere ball as an object is imaged. In this diagram, FIG. 7(a) shows a plastic sphere ball as an object, and FIG. 7(b) shows the degree of polarization $\rho$ of the object of FIG. 7(a), FIG. 7(c) shows the polarization phase $\phi$ (0 degree is shown in black, and 180 degrees is shown in white) of the object of FIG. 7(a), and FIG. 7(d) shows the estimated polarization error E of the object of FIG. 7(a). In addition, FIG. 8 shows schematic diagrams of FIG. 7 (including diagrams obtained by emphasizing the contrast of the diagrams of FIG. 7). Each of the drawings shows that white portions have larger luminance values, the degree of polarization is great around the shielding edge of the ball, the polarization phase simply increases in the 180 degree cycle counterclockwise around the sphere in the area which is not covered by the attached shadow of the object. This polarization phase is the angle at which the luminance changed by the rotation becomes the maximum value, and is the information of an emission plane in the case where light is diffuse reflected on the object.

Next, a description is given of the detailed functions of the area dividing unit 103. The area dividing unit 103 classifies the portions of an image into diffuse reflected areas, specular reflected areas, attached shadow areas, and cast shadow areas using polarization information generated by the polarization information generating unit 102 and the luminance information obtained by the polarized image capturing unit 101.

Here, descriptions are given of diffuse reflection and specular reflection. It is known that the reflection characteristics of the surface of the object are represented as the total of specular reflection components as "pressing mark" and diffuse reflection components as mat reflection components. The diffuse reflection components are observed irrespective of the direction of a light source which irradiates the object. Whereas, the specular reflection components can be observed only in the case where a light source is present in the substantially specular reflection direction with respect to the normal vector direction and sight line direction of the object because the specular reflection components are components having high direction dependency. This applies the polarization characteristics.

It is known that, in the case where the object is an object causing specular reflection which is "pressing mark", when light is irradiated from all the directions, the object is heavily affected by mirror reflection which is specular reflection components (for example, as for transparent object, Non-patent reference 3: "Highlight no henkoh kaiseki ni motozuku tohmei buttai no hyomen keijyo sokutei (Measurement of Surface Orientations of Transparent Objects Using Polarization in Highlight), Megumi Saito, Yohichi Sato, Katsushi Ikeuchi, Hiroshi Kashiwagi, the Journal of The Institute of Electronics, Information and Communication, D-II, Vol. J82-D-II, No. 9, pp. 1383-1390, 1999

Figure 9:
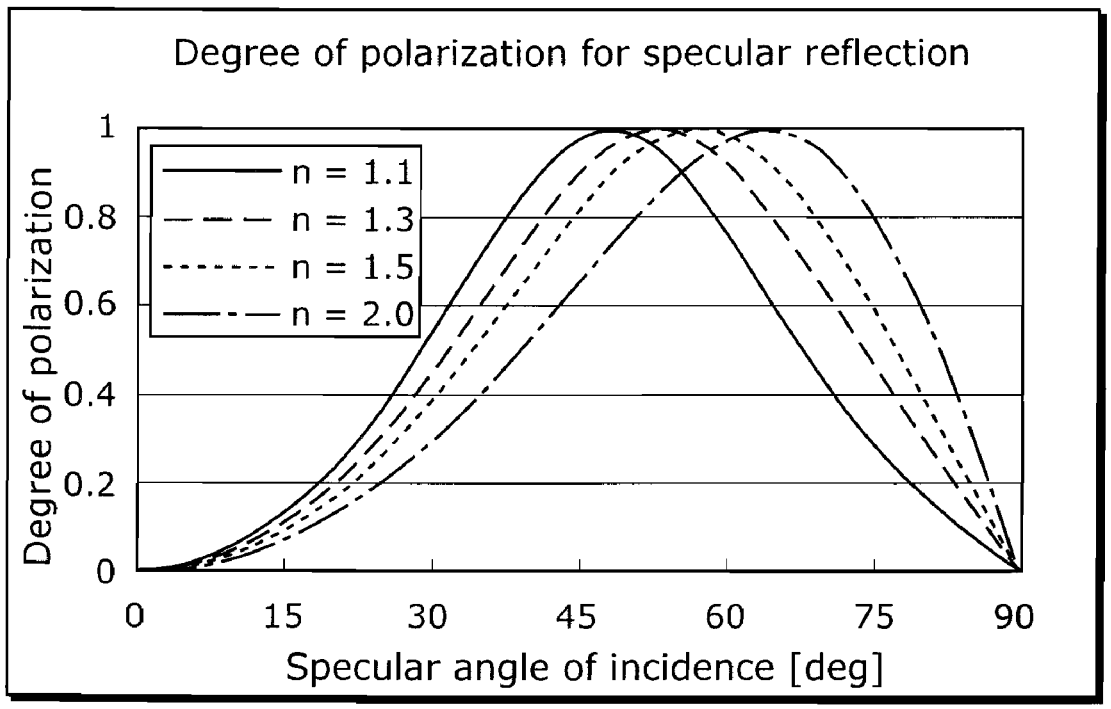
FIG. 9 is a graph showing the degree of polarization with respect to the incidence angle of specular reflection components when the refractive indices n of the object equal 1.1, 1.3, 1.5, and 2.0.
Figure 10:
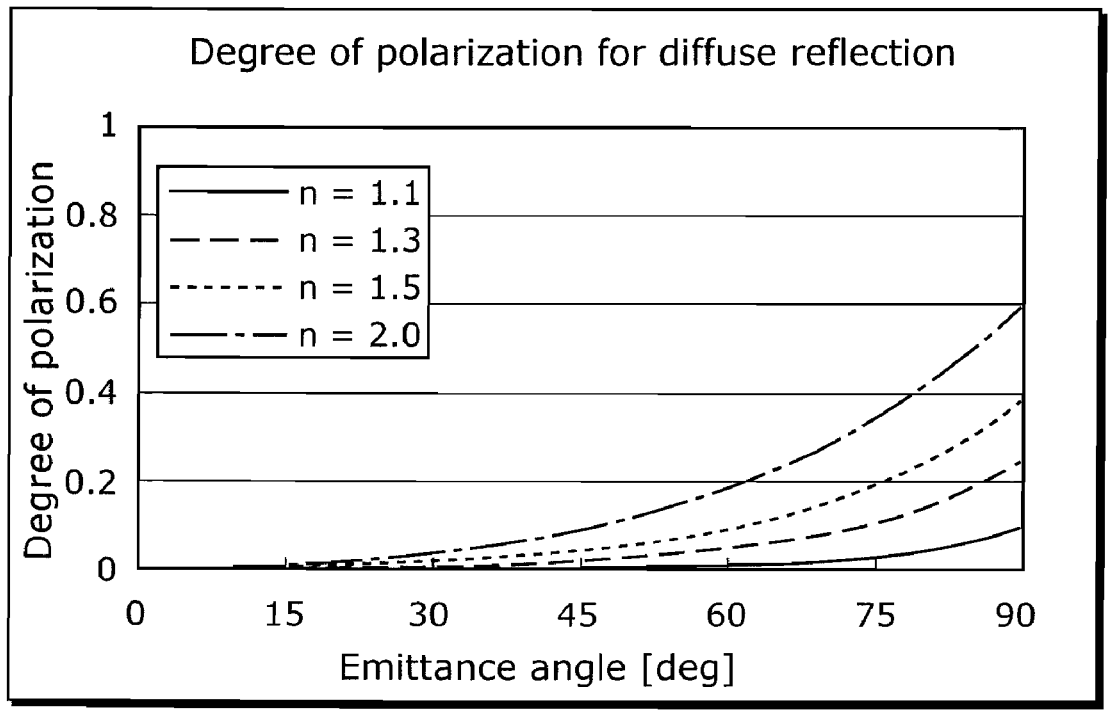
FIG. 10 is a graph showing the degree of polarization with respect to the emission angle of diffuse reflection components when the refractive indices n of the object equal 1.1, 1.3, 1.5, and 2.0.

FIG. 9 and FIG. 10 are graphs each showing the degree of polarization of specular reflection components and diffuse reflection components when the refractive index n of the object equals 1.1, 1.3, 1.5, and 2.0 (for example, "L. B. Wolff and T. E. Boult, 'Constraining object features using a polarization reflectance model', IEEE Transactions on Pattern Analysis and Machine Intelligence, Vol. 13, No. 7, pp. 635-657, 1991" Non-patent Reference 4.) Here, in FIG. 9, the horizontal axis shows an incidence angle, and the vertical axis shows the degree of polarization. In addition, in FIG. 10, the horizontal axis shows an emission angle, and the vertical axis shows the degree of polarization. The drawings show that the degrees of polarization of specular reflection components are higher than those of diffuse reflection components when light is emitted from all the directions. Based on this, it is estimated that specular reflection components are dominant also in respect of polarization characteristics. This applies when a shielding edge or the like having an emission angle of nearly 90 degrees is excluded.

In addition, a known method is a method for calculating, based on the polarization phase φ, the degree of freedom for an angle of an emission plane (incidence angle) containing rays of incidence light and reflected light from among the normal vector information of the object. It is also known that how to calculate normal vector information is totally different depending on whether specular reflection is dominant or diffuse reflection is dominant in the object (for example, see Non-patent Reference 1). When diffuse reflection components are dominant, the information about the emission plane of diffuse reflection can be calculated as the angle at which the luminance changed by the rotation of the deflecting plate becomes the maximum value. In the opposite case where specular reflection components are dominant, the information about the incidence plane of diffuse reflection can be calculated as the angle at which the luminance changed by the rotation of the deflecting plate becomes the minimum value. Here, focusing on the fact that the variation curve of the polarization luminance is a sinusoidal of a 180-degree cycle, it is known that the one-dimensional freedom degree of 90 degrees of an estimated normal vector entails errors in the case where normal vector information is generated without considering whether diffuse reflection is dominant or specular reflection is dominant. Therefore, classification into diffuse reflection and specular reflection is important in the process of generating normal vector information from polarization information.

Figure 11:
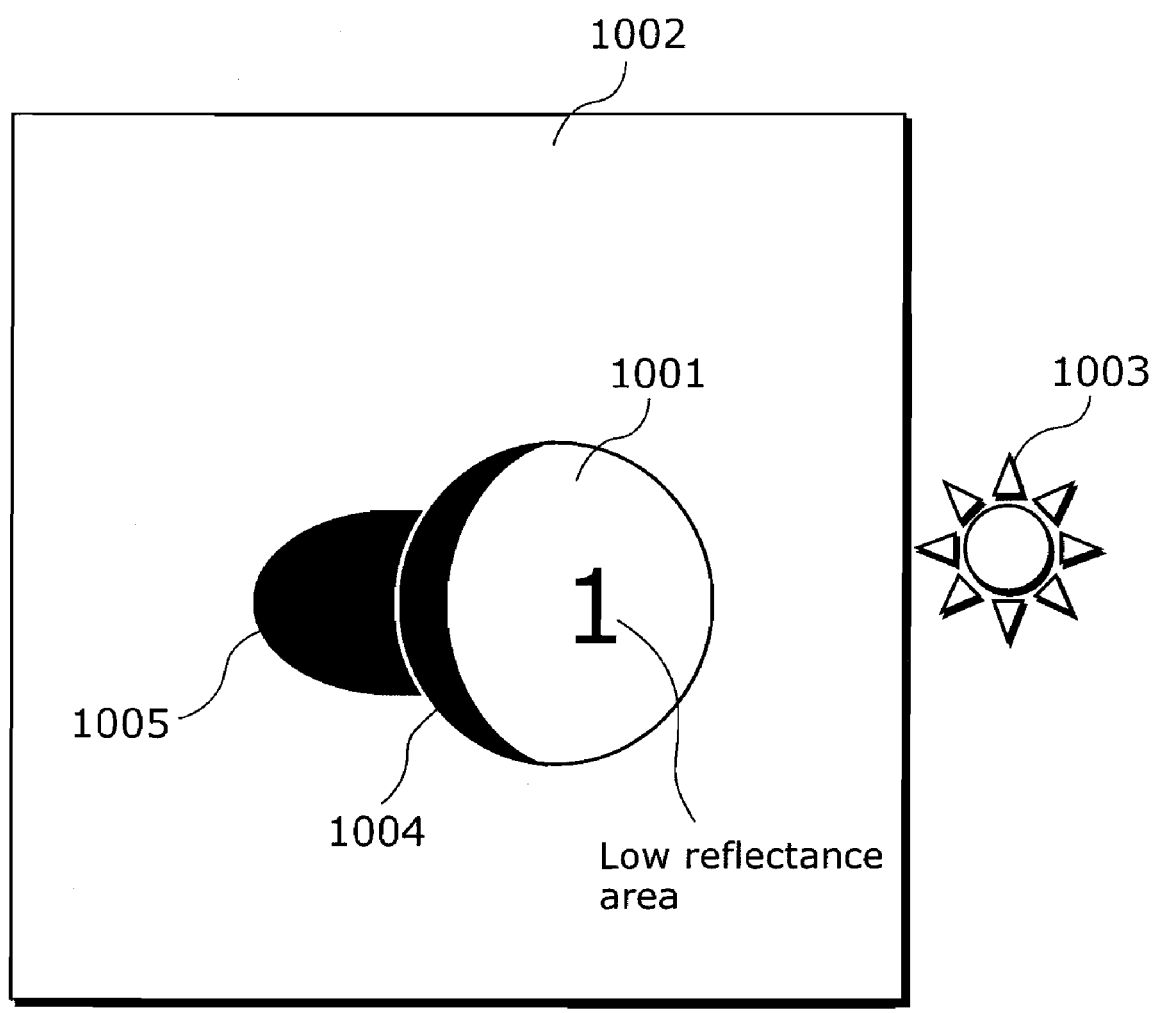
FIG. 11 is a schematic diagram for illustrating classification of a shadow area into an attached shadow area and a cast shadow area.

Next, descriptions are given of attached shadow areas and cast shadow areas. FIG. 11 is a schematic diagram for illustrating (classification of a shadow area into) an attached shadow area and a cast shadow area. What is shown here is that the object 1001 which is a sphere object placed on a plane 1002 is being lighted by the light source 1003. In this diagram, each of the area 1004 and the area 1005 shows a shadow area. The area 1004 is an "attached shadow area" which is generated because the normal vector of the object 1001 does not face the light source 1003, and the area 1005 is a "cast shadow area" which is generated because light is blocked by the object 1001 as a shielding.

Next, a description is given of the difference in polarization characteristics between attached shadow areas and cast shadow areas. First, it is assumed that a scene is imaged which satisfies the following Condition 1 satisfied by almost all image scenes captured on the ground.

Condition 1: "an object including a large plane exists near an object in an image scene, and a light source exists in the direction opposite to the large plane of the object.

This applies, for example, in the following scenes.

1. An indoor scene where a ball as an object is placed on a table. In addition, this ball is lighted by a fluorescent lamp placed on the ceiling.

2. An indoor scene where a person as an object is seated on a chair on a floor. In addition, this person is lighted by solar light coming through a window.

3. An outdoor scene where an automobile as an object is running on a road. This object is lighted by solar light.

In addition, this Condition is satisfied to almost all image scenes captured on the ground because walls and buildings have a large plane.

Figure 12:
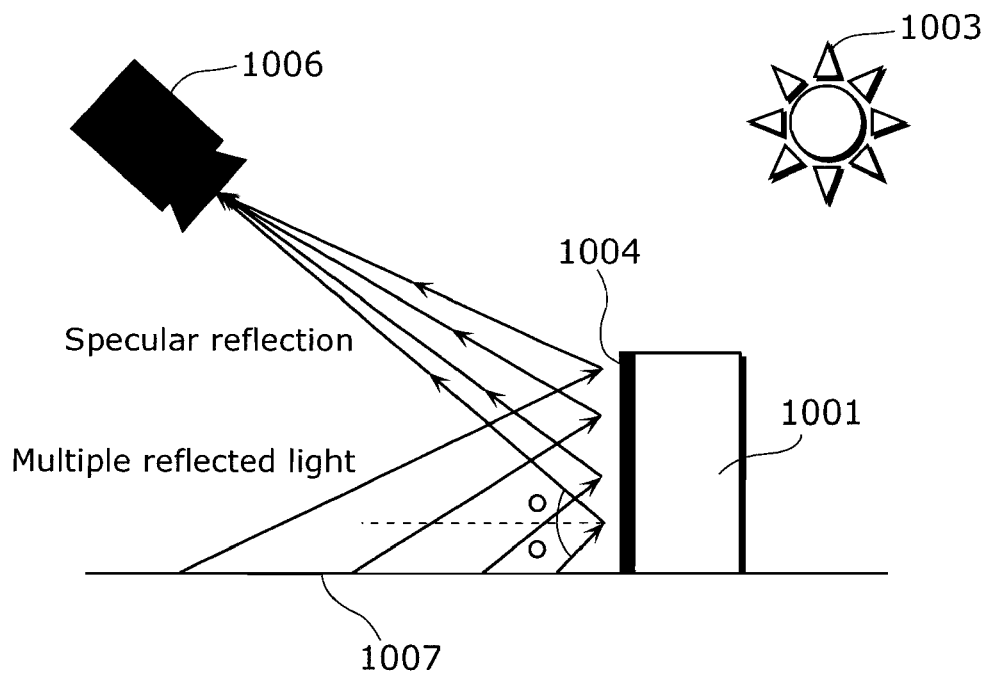
FIG. 12 is a schematic diagram for illustrating incidence of multiple reflected light in an attached shadow area.

First, a description is given of an attached shadow area in the case where this Condition 1 is satisfied. As shown in FIG. 11, an attached shadow area is a shadow area which appears because the normal vector of an object faces the direction opposite to the light source. Here, taking into consideration, based on the Condition 1, that a large plane exists in the direction opposite to the light source and that, in reality, a large amount of wraparound light (multiple reflected light) exist in the shadow area, it is considered that multiple reflected light is incident from various directions in the attached shadow area. In other words, it is considered that multiple reflected light as specular reflection exists with respect to the normal vectors of the camera 200 and the pixels in which attached shadow area is generated. FIG. 12 is a schematic diagram showing this state. In this diagram, the camera 1006 shows a camera mounting the normal vector information generating device 100 in this Embodiment, and the plane 1007 shows the large plane.

As described earlier, the degrees of polarization of specular reflection components are higher than those of diffuse reflection components. Therefore, the attached shadow areas indicating the reflection characteristics of specular reflection components have a relatively higher degree of polarization.

Figure 13:
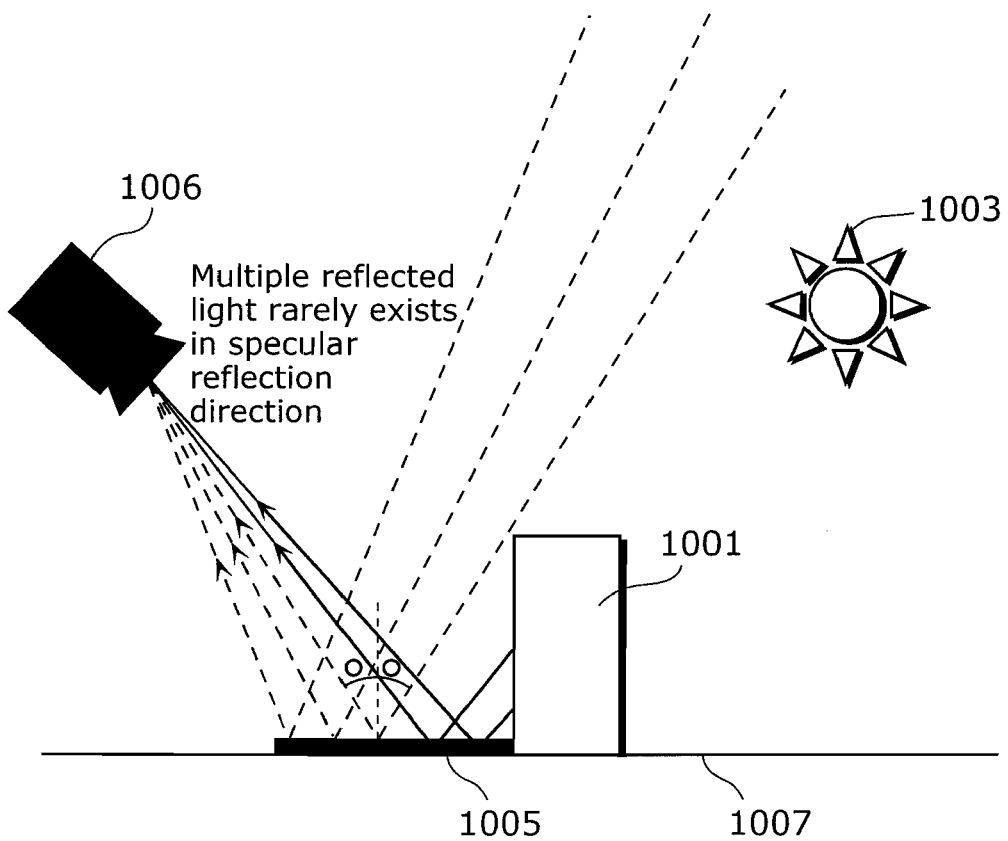
FIG. 13 is a schematic diagram for illustrating incidence of multiple reflected light in a cast shadow area.

Next, a description is given of attached shadow areas. As shown in FIG. 11, an attached shadow area is a shadow area which is generated when light is blocked by a shielding. Here, considering the Condition 1, it is likely that attached shadow areas are generated on a plane in a normal vector direction of a large plane. Therefore, multiple reflected light comes only from directions limited compared to the case of attached shadow area. From this, it is unlikely that the light source exists in the specular reflection direction. FIG. 13 is a schematic diagram showing this state.

Further, as shown in FIG. 10, the degree of polarization of diffuse reflection components is relatively low. This shows that the polarization components in the attached shadow area are relatively small. Luminance itself is small in shadow areas, and thus it is very difficult to estimate small polarization components. Therefore, the estimated polarization errors in the attached shadow areas are very large.

To sum up the above, the polarization characteristics of shadow areas are classified as shown below.

(1) Attached shadow areas

The degree of polarization is high, and estimated polarization errors are small.

In many cases, specular reflection characteristics are indicated.

(2) Cast shadow areas

The degree of polarization is low, and estimated polarization errors are large in number.

In many cases, diffuse reflection characteristics are shown.

The use of these classification standards makes it possible to classify shadow areas into attached shadow areas and cast shadow areas. For example, it is possible to divide, from attached shadow areas, low luminance areas identified by polarization information indicating polarization characteristics of specular reflection (indicating that the degree of polarization is high, or the estimated polarization errors are small). A description is given below of the area dividing unit 103 which performs area division using such characteristics.

Figure 14:
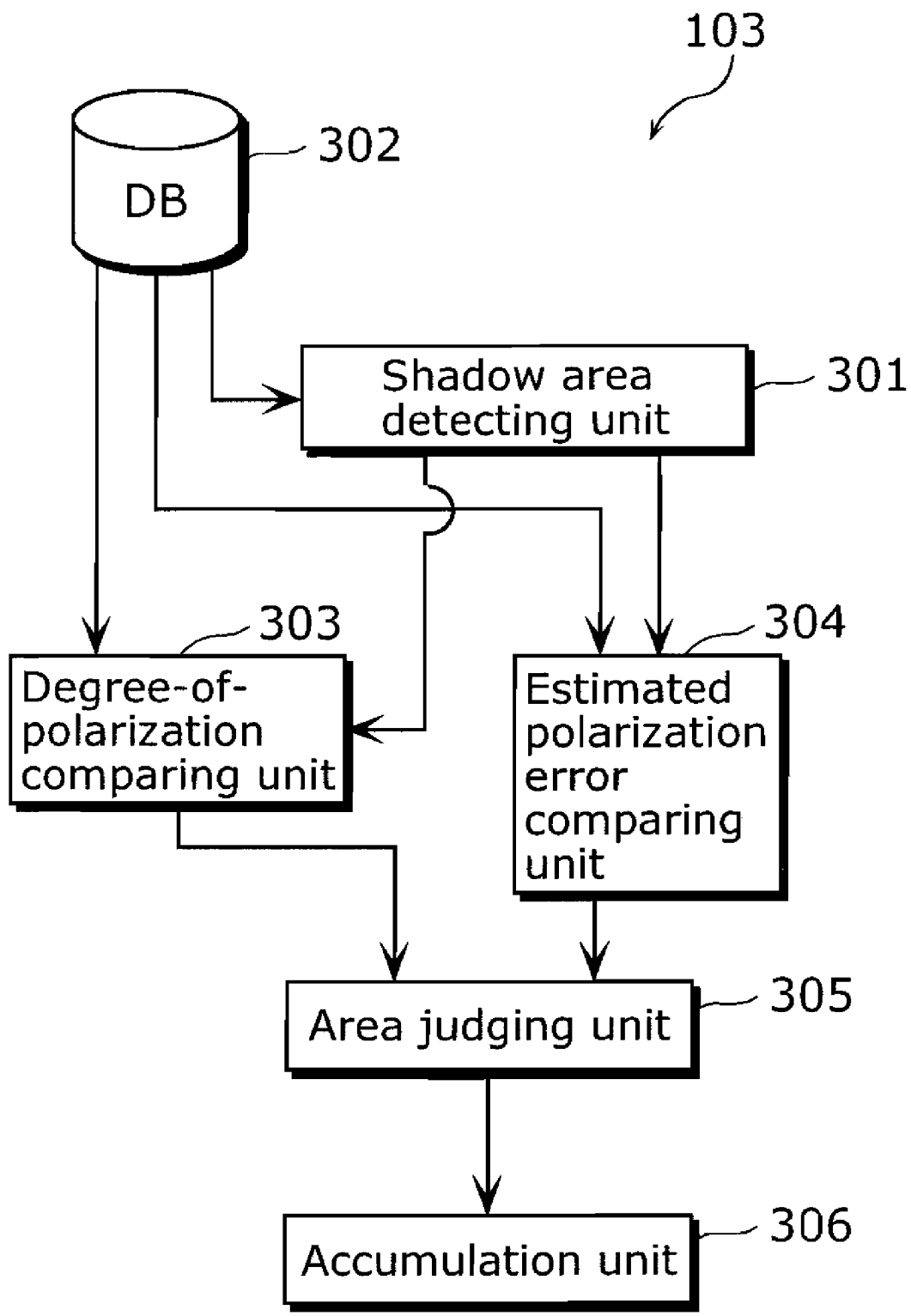
FIG. 14 is a functional block diagram showing a detailed structure of an area dividing unit in Embodiment 1 of the present invention.

FIG. 14 is a functional block diagram showing a detailed structure of the area dividing unit 103 in the normal vector information generating device 100 shown in FIG. 1. The area dividing unit 103 is a processing unit for classifying the portions of an image into diffuse reflection areas, specular reflection areas, attached shadow areas, and cast shadow areas using the polarization information generated by the polarization information generating unit 102 and the luminance information obtained by the polarized image capturing unit 101. The area dividing unit 103 includes a shadow area detecting unit 301, a DB 302, a degree-of-polarization comparing unit 303, an estimated polarization error comparing unit 304, an area judging unit 305, and an accumulation unit 306.

The shadow area detecting unit 301 is a processing unit for estimating whether the pixels in an image obtained by the polarized image capturing unit 101 are shadow areas or not.

The DB 302 is a memory or the like for storing, in advance, a threshold value TH_PDS referred to by the degree-of-polarization comparing unit 303 and the threshold value Th_Err referred to by the estimated polarization error comparing unit 304.

The degree-of-polarization comparing unit 303 is a processing unit for reading the threshold value TH_PDS from the DB 302, and comparing the degree of polarization of a target pixel that the shadow area detecting unit 301 has estimated to be a non-shadow area and the threshold value TH_PDS.

The estimated polarization error comparing unit 304 is a processing unit for reading the threshold value Th_Err from the DB 302, and comparing the estimated polarization error E of a target pixel that the shadow area detecting unit 301 has estimated to be a shadow area and the threshold value Th_Err.

The area judging unit 305 judges whether the target pixel is a diffuse reflection area, a specular reflection area, a cast shadow area, or an attached shadow area, depending on the result of comparison made by the degree-of-polarization comparing unit 303 and the estimated polarization error comparing unit 304, and accumulates the result in the accumulation unit 306.

The accumulation unit 306 is a memory or the like for storing the result of the area division by the area judging unit 305.

Figure 15:
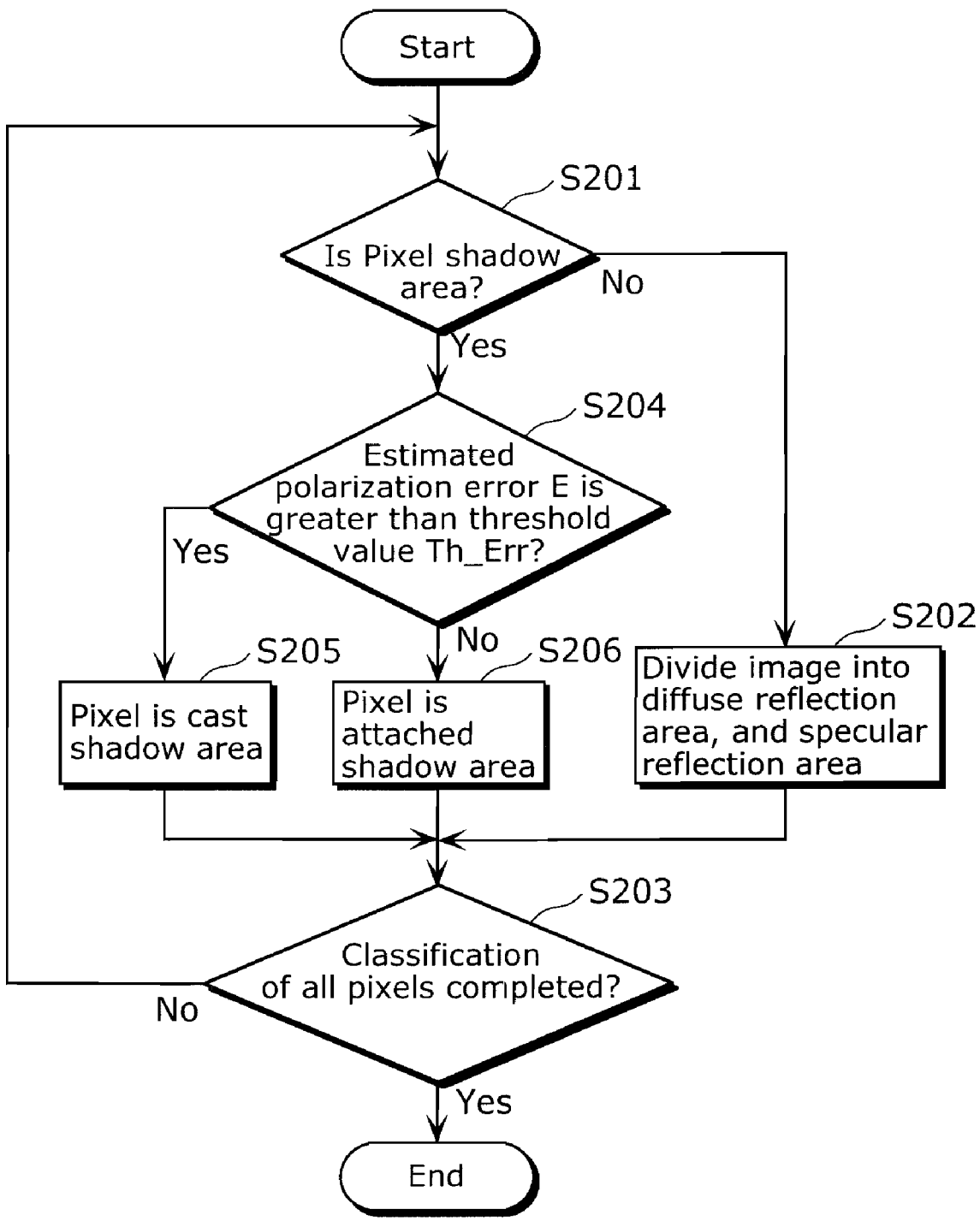
FIG. 15 is a flowchart of processes performed by the area dividing unit in Embodiment 1 of the present invention.

FIG. 15 is a flowchart of processes performed by this area dividing unit 103. First, the shadow area detecting unit 301 estimates whether or not a pixel in the image obtained by the polarized image capturing unit 101 is a low luminance area (a shadow area in this Embodiment) (S201). For example, the pixel having a luminance value or a luminance variation curve amplitude by a polarizer equal to or less than a threshold value may be estimated to be a shadow area, based on the fact that a shadow area has a low luminance value. The threshold value for estimating a shadow area in this way may be determined empirically. For example, 256 may be set for the luminance value of a 16-bit monochrome image. This threshold value may be held in the DB 302. FIG. 16(a) is a result of shadow detecting processes performed on the image of FIG. 7(a) (FIG. 8(a) which is a schematic diagram of FIG. 7(a)). The black area in the drawings shows the cast shadow resulting from the detection.

Figure 17:
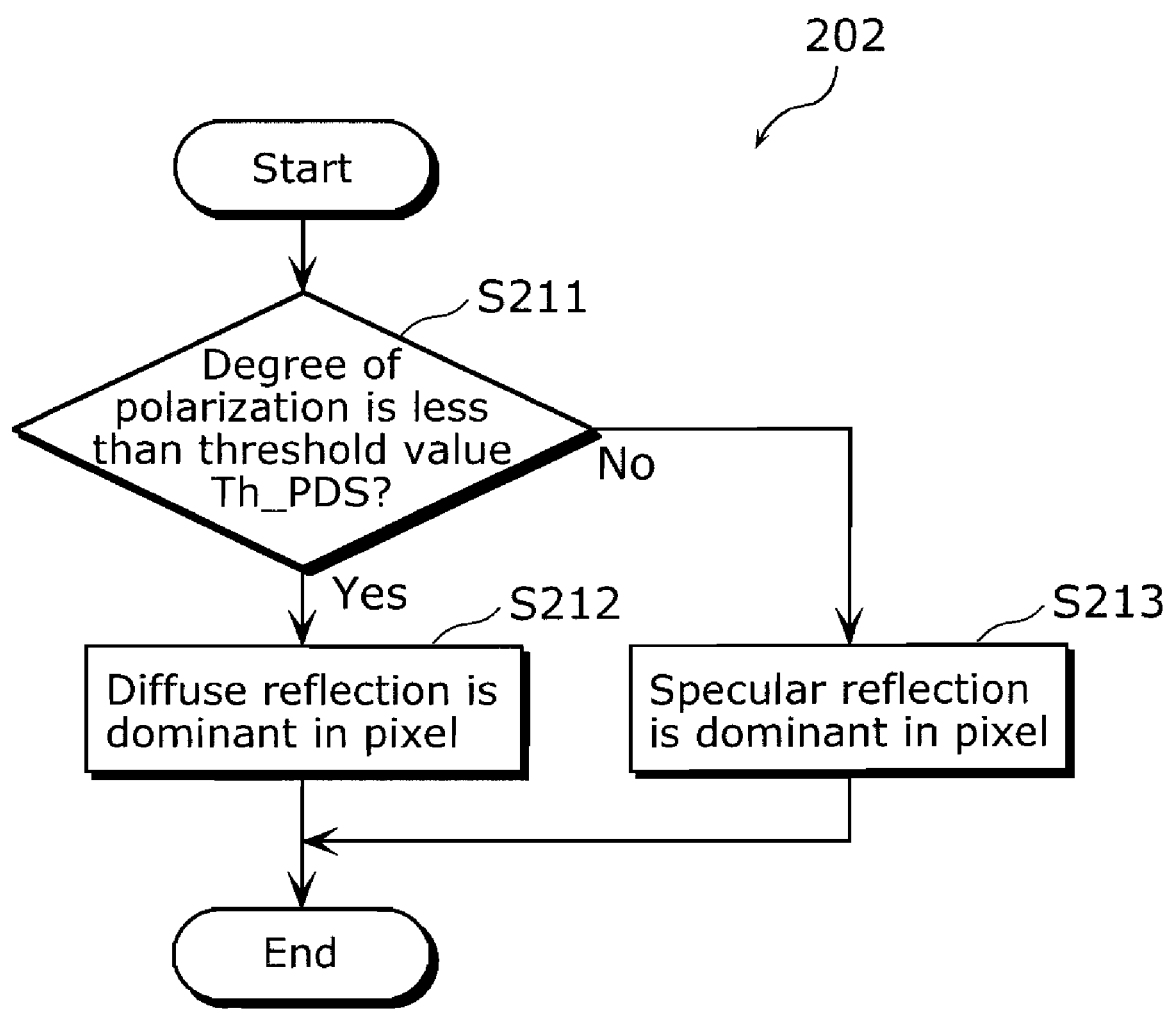
FIG. 17 is a flowchart of processes for classification into diffusion reflection and specular reflection in Embodiment 1 of the present invention.

When the pixel is not a shadow area (No in S201), the degree-of-polarization comparing unit 303 judges whether the diffuse reflection components are dominant or specular reflection components are dominant in the pixel (S202). FIG. 17 is a flowchart of detailed processes for classification into diffuse reflection and specular reflection (S202) by the degree-of-polarization comparing unit 303. Here, the degree-of-polarization comparing unit 303 judges whether the diffuse reflection is dominant or specular reflection is dominant in the pixel, based on the earlier-mentioned fact that "the degree of polarization is high in specular reflection". First, the degree-of-polarization comparing unit 303 checks whether the degree of polarization of the pixel is less than the threshold value TH_PDS or not (S211). When the degree of polarization of the pixel is less than the threshold value TH_PDS (Yes in S211), the area judging unit 305 judges that diffuse reflection is dominant in the pixel (the pixel is a diffuse reflection area) (S212). In the opposite case where the degree of polarization is greater than the threshold value TH_PDS (No in S211), the area judging unit 305 judges that specular reflection is dominant in the pixel (the pixel is a specular reflection area) (S213). The area judging unit 305 accumulates the result of the area division in the accumulation unit 306.

It is to be noted that the threshold value Th_PDS may be set based on the refraction index of the object, the normal vector direction of the object, the light source direction, the sight line direction and the like. As shown in FIG. 9 and FIG. 10, the polarization degree of specular reflection components of the object and the polarization degree of diffuse reflection components can be uniquely determined when the refraction index, the incidence angle, and the emission angle are calculated. Therefore, the polarization degree of specular reflection components and the polarization degree of diffuse reflection components calculated in FIG. 9 and FIG. 10 may be used as threshold values Th_PDS. In addition, in the case where information such as the refraction index of the object, the normal vector direction of the object, the light source direction, the sight line direction cannot be obtained, the threshold value Th_PDS may be determined based on the possible maximum value of the polarization degree of a diffuse reflection component. For example, it is considered, from FIG. 10, that the maximum value of the polarization degree of a diffuse reflection component is approximately 0.6 supposing that no object having a refraction index of 2.0 or more exists, and thus approximately 0.7 may be set as the threshold value Th_PDS. These threshold values may be held in the DB 302.

After the completion of the diffuse reflection/specular reflection classification process (S202), the area judging unit 305 checks whether or not the optical classification of all the pixels have been completed (S203). If there remains a pixel which has not been classified yet (No in S203), the shadow area detecting unit 301 detects whether or not another pixel is a shadow area (S201). In addition, the optical classification of all the pixels has been completed (Yes in S203), the area dividing unit 103 completes the processing.

In the opposite case where the pixel is a shadow area (Yes in S201), the estimated polarization error comparing unit 304 evaluates the magnitude of the estimated polarization error E defined according to the above Expression 8 (S204). In other words, the estimated polarization error comparing unit 304 compares the magnitude of the estimated polarization error E and the threshold value Th_Err. As the result, when the magnitude of the estimated polarization error E is greater than the threshold value Th_Err (Yes in S204), the area judging unit 305 judges that the pixel is a cast shadow area (S205). In contrast, when the magnitude of the estimated polarization error E is less than the threshold value Th_Err (No in S204), the area judging unit 305 judges that the pixel is an attached shadow area (S206). The area judging unit 305 accumulates the result of the area division in the accumulation unit 306.

The threshold value Th_Err at this time may be determined using, as standards, the luminance value of the captured image, the amplitude component A and the bias component C of Expression 2. For example, the following may be applied when determining the threshold value Th_Err using, as a standard, the amplitude component A.

[Math 9]

$$Th\_Err = (Th\_E)^2 \cdot (2A)^2 \cdot N \qquad \text{(Expression 9)}$$

This Expression shows the difference between the degree of the estimated polarization error E and the amplitude component A. Here, Th_E is a proper positive constant, and may be determined empirically. For example, 0.3 may be set. In addition, N is the number of samples mentioned above. These threshold values may be held in the DB 302.

FIG. 16(b) and FIG. 16(c) show the attached shadow area and the cast shadow area calculated in this way. In the drawings, the black areas are selected areas. It is possible to separate the cast shadow area and the attached shadow area by performing contraction and expansion processes on large areas used in the image processing for each of the cast shadow areas and the attached shadow areas calculated in this way.

FIG. 18 is a diagram showing an example of area division performed by the area dividing unit 103. Here are shown, for each of the pixels which make Lip a polarized image, specific values of the pixel position, the amplitude A, the degree of polarization ρ, the polarization phase φ, the estimated polarization error E, and the result of the area division. Here, the judgment standards in the area division are as shown in FIG. 19. In other words, whether a pixel is a diffuse reflection area, a specular reflection area, or a shadow area is judged depending on whether the amplitude A is 256 or more (S201 in FIG. 15), whether a pixel is a diffuse reflection area, or a specular reflection area is judged depending on whether the degree of polarization ρ is less than 0.7 or not (S211 in FIG. 17), and whether a pixel is a cast shadow area or an attached shadow area is judged depending on whether the estimated polarization error E is greater than the threshold value Th_Err shown in the Expression 9 (S204 in FIG. 15). As the result of the judgment based on these judgment standards, as shown in FIG. 18, it is judged that the pixels (141, 117) belong to diffuse reflection areas, the pixels (151, 138) belong to specular reflection areas, the pixels (111, 144) belong to attached shadow areas, the pixels (98, 151) belong to cast shadow areas, and the pixels (165, 144) belong to diffuse reflection areas.

Figure 20:
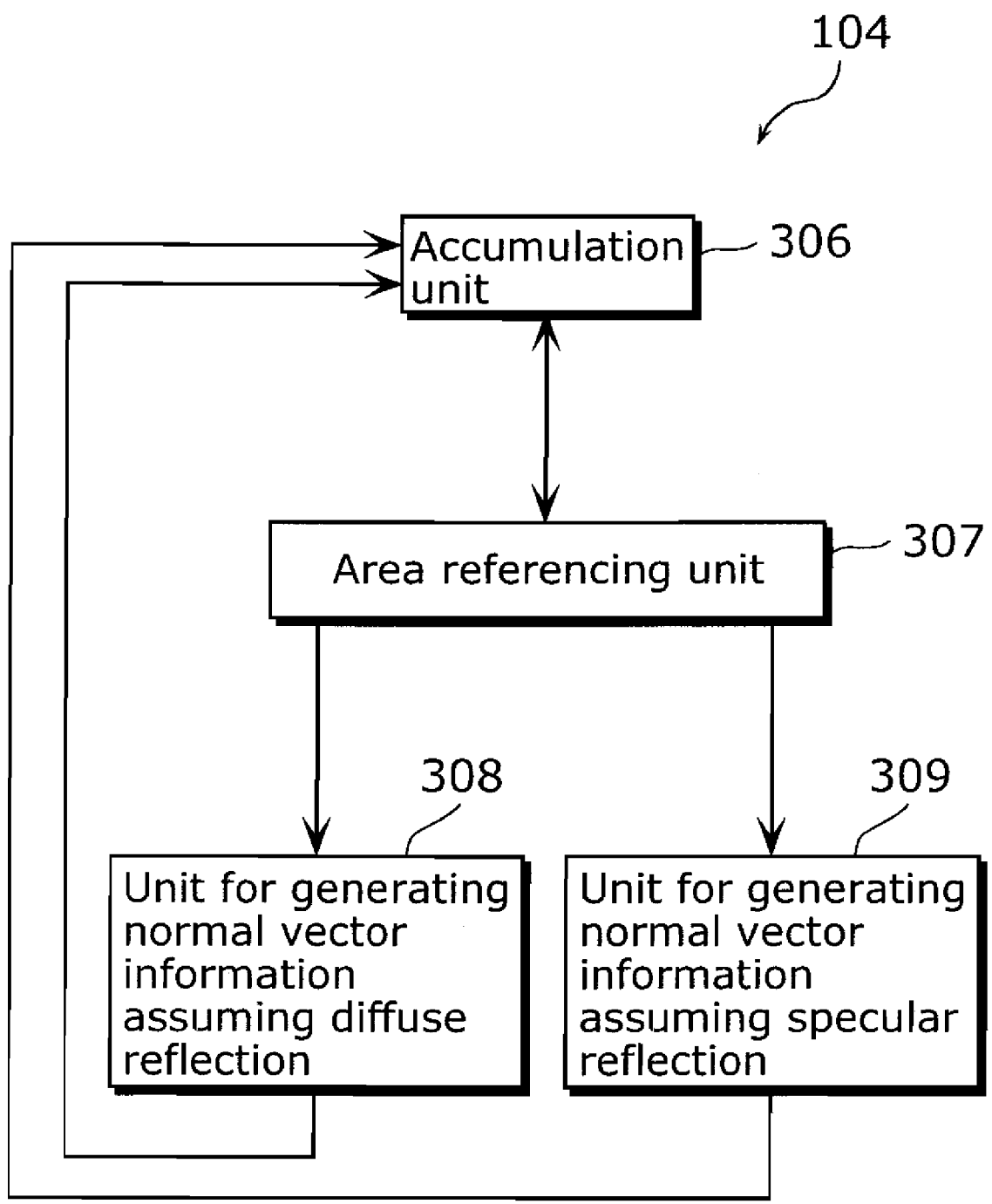
FIG. 20 is a functional block diagram showing a detailed structure of a normal vector information generating unit in Embodiment 1 of the present invention.

Next, a description is given of detailed functions of the normal vector information generating unit 104. FIG. 20 is a functional block diagram showing the detailed structure of the normal vector information generating unit 104 in the normal vector information generating device 100 shown in FIG. 1. This normal vector information generating unit 104 is a processing unit for generating normal vector information from polarization information based on the result of the area division performed by the area dividing unit 103, and includes the accumulation unit 306, the area referencing unit 307, a unit for generating normal vector information assuming diffuse reflection 308, and a unit for generating normal vector information assuming specular reflection 309. It is to be noted that, in this diagram, the structural elements common with FIG. 14 are assigned with the same numerical references as those in FIG. 14, and detailed descriptions thereof are omitted.

The area referencing unit 307 is a processing unit for judging whether diffuse reflection components are dominant or specular reflection components are dominant in a target pixel (whether the target pixel is a diffuse reflection area or the target pixel is a specular reflection area), or whether the pixel is an attached shadow area or not, by referring to the result of the area division accumulated in the accumulation unit 306.

The unit for generating normal vector information assuming diffuse reflection 308 is a processing unit for generating normal vector information of a pixel corresponding to a diffuse reflection area assuming diffuse reflection. More specifically, the angle of the polarization principal axis at which the luminance becomes the maximum in the sinusoidal obtained through the approximation is generated as the normal vector information of the emission plane of the object corresponding to the pixel.

The unit for generating normal vector information assuming specular reflection 309 is a processing unit for generating normal vector information of pixels corresponding to specular reflection areas and attached shadow areas assuming specular reflection. More specifically, the angle of the polarization principal axis at which the luminance becomes the minimum in the sinusoidal obtained through the approximation is generated as the normal vector information of the incidence plane of the object corresponding to the pixel.

Figure 21:
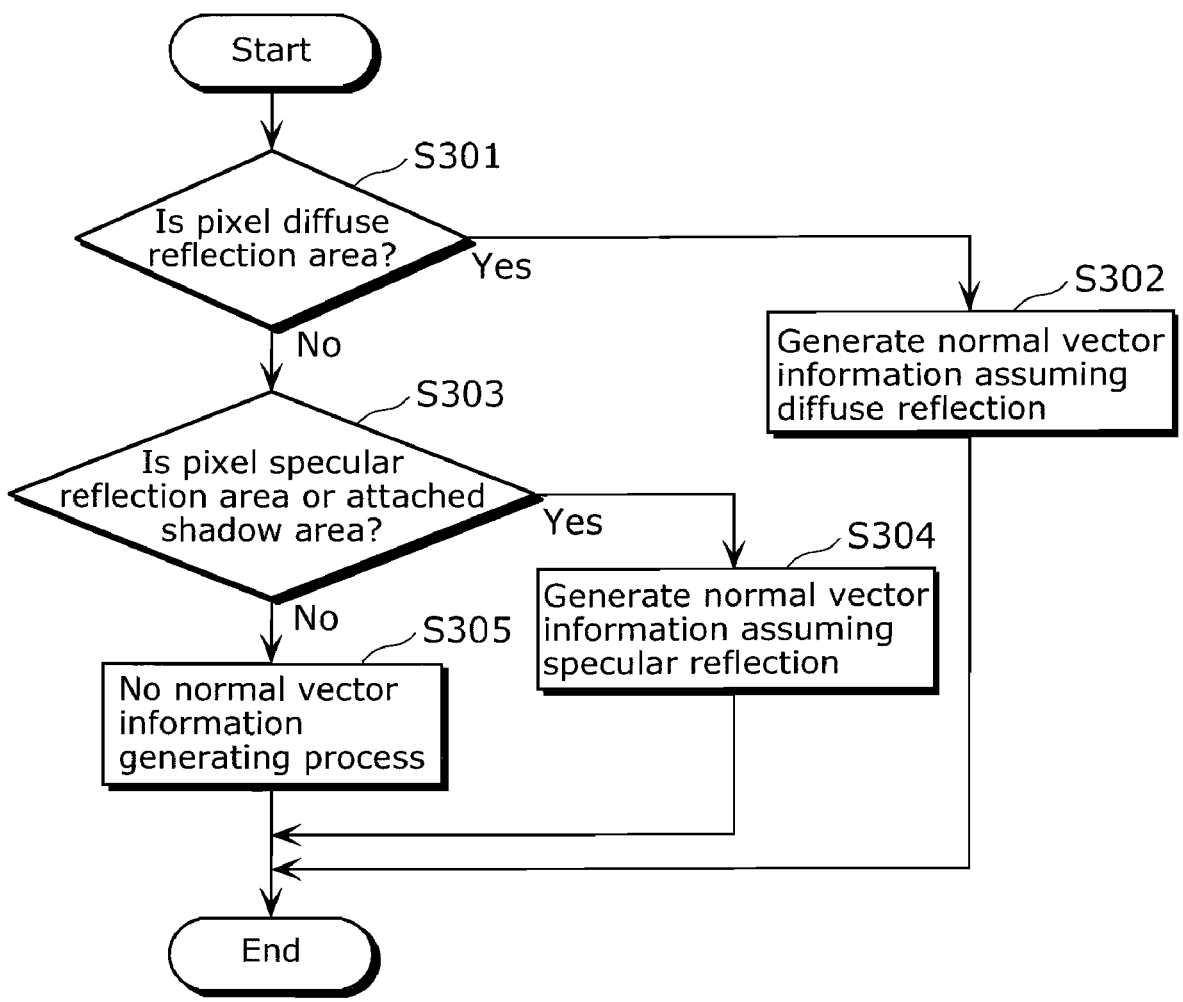
FIG. 21 is a flowchart of processes performed by the normal vector information generating unit in Embodiment 1 of the present invention.

FIG. 21 is a flowchart of processes performed by this normal vector information generating unit 104. First, the area referencing unit 307 judges whether or not diffuse reflection components are dominant in the pixel, based on the result of the optical area division detected by the area dividing unit 103. In this processing, the result of the area division may be read from the accumulation unit 306 in which the result of the area judging unit 305 is accumulated. When it is judged that diffuse reflection components are dominant (Yes in S301), the unit for generating normal vector information assuming diffuse reflection 308 generates normal vector information of the pixel assuming diffuse reflection (S302). More specifically, the one-dimensional degree of freedom of the normal vector on an emission plane is calculated as an angle at which luminance changed by the rotation of a deflecting plate becomes the maximum value. In other words, the angle of the polarization principal axis at which the luminance becomes the maximum in the sinusoidal obtained through the approximation is generated as the normal vector information of the emission plane of the object corresponding to the pixel.

In addition, when diffuse reflection components are not dominant in the pixel (No in S301), the area referencing unit 307 judges whether specular reflection components are dominant (the pixel is a specular reflection area) or the pixel is an attached shadow area (S303). As the result, it is judged that specular reflection components are dominant, or the pixel is an attached shadow area (Yes in S303), the unit for generating normal vector information assuming specular reflection 309 generates normal vector information of the pixel assuming specular reflection (S304). More specifically, the one-dimensional degree of freedom of the normal vector on the incidence plane is calculated as the angle at which the luminance changed by the rotation of a deflecting plate becomes the minimum value. In other words, the angle of the polarization principal axis at which the luminance becomes the minimum in the sinusoidal obtained through the approximation is generated as normal vector information of the incidence plane of the object corresponding to the pixel.

In contrast, when the pixel is judged to be a cast shadow area, in other words, when neither diffuse reflection components nor specular reflection components are dominant, and the pixel is not a cast shadow area (No in S303), this normal vector information generating unit 104 judges that errors are dominant in the polarization information of the pixel and that it is impossible to generate accurate normal vector information, and does not perform any normal vector information generating process (S305).

Figure 22:
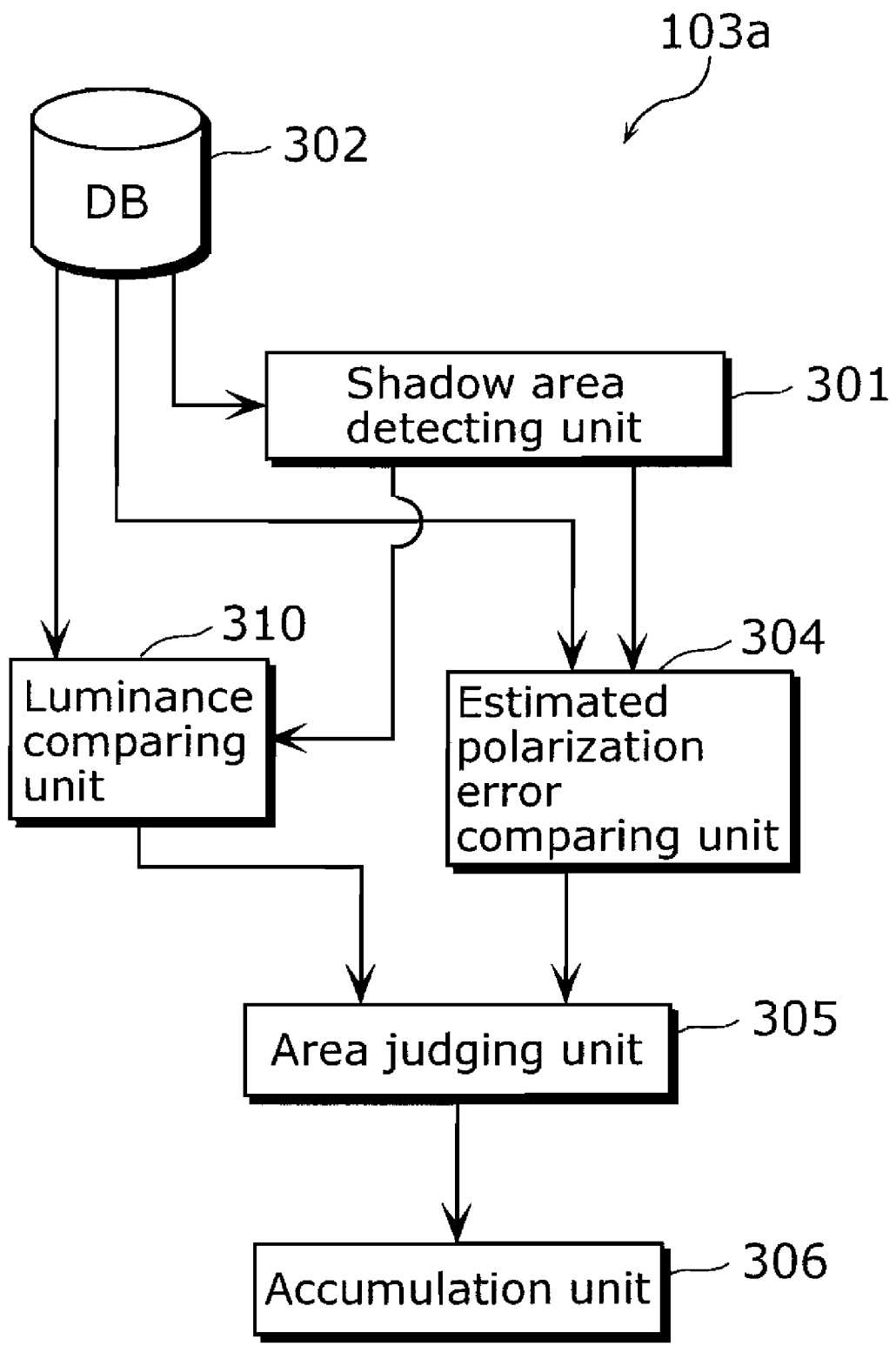
FIG. 22 is a functional block diagram showing the structure of the area dividing unit according to a Variation of Embodiment 1 of the present invention.

In the processes shown in FIG. 15, the degree of polarization is used to judge whether diffuse reflection components are dominant in the pixel or specular reflection components are dominant in the pixel (S202), but it is to be noted that a luminance value may be used. FIG. 22 is a functional block diagram showing the detailed structure of the area dividing unit 103a according to this Variation for judging diffuse reflection or specular reflection using the luminance value. This area dividing unit 103a includes a shadow area detecting unit 301, a DB 302, an estimated polarization error comparing unit 304, an area judging unit 305, an accumulation unit 306, and a luminance comparing unit 310. It is to be noted that, in FIG. 22, the structural elements common with FIG. 14 are assigned with the same numerical references as those in FIG. 14, and detailed descriptions thereof are omitted.

The luminance comparing unit 310 is a processing unit for reading the threshold value TH_IDS from the DB 302, and comparing the luminance value of the target pixel and the threshold value TH_IDS.

Figure 23:
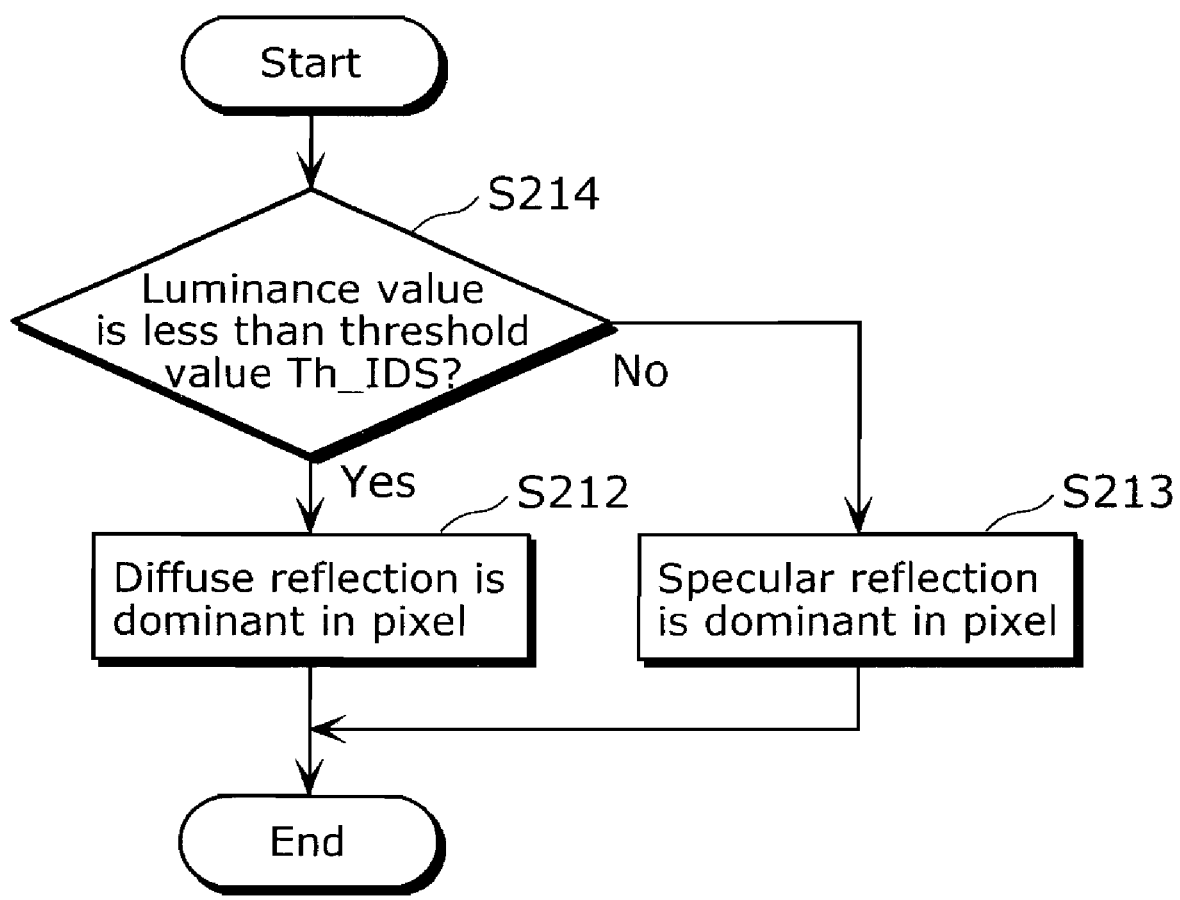
FIG. 23 is a flowchart of processes for classification into diffuse reflection and specular reflection performed by the area dividing unit shown in FIG. 22.

FIG. 23 is a flowchart of processes performed by this area dividing unit 103a. It is to be noted that, in FIG. 23, the steps common with FIG. 17 are assigned with the same numerical references as those in FIG. 17, and detailed descriptions thereof are omitted. The luminance comparing unit 310 checks whether the luminance value of the pixel is less than the threshold value TH_IDS or not (S214). When the luminance value of the pixel is less than the threshold value TH_IDS (Yes in S214), the area judging unit 305 judges that diffuse reflection is dominant in the pixel (S212). In the opposite case where the luminance value of the pixel is greater than the threshold value TH_IDS (No in S214), the area judging unit 305 judges that specular reflection is dominant in the pixel (S213). In this way, it is judged whether diffuse reflection components are dominant in the pixel or specular reflection components are dominant in the pixel using the luminance value.

Figure 24:
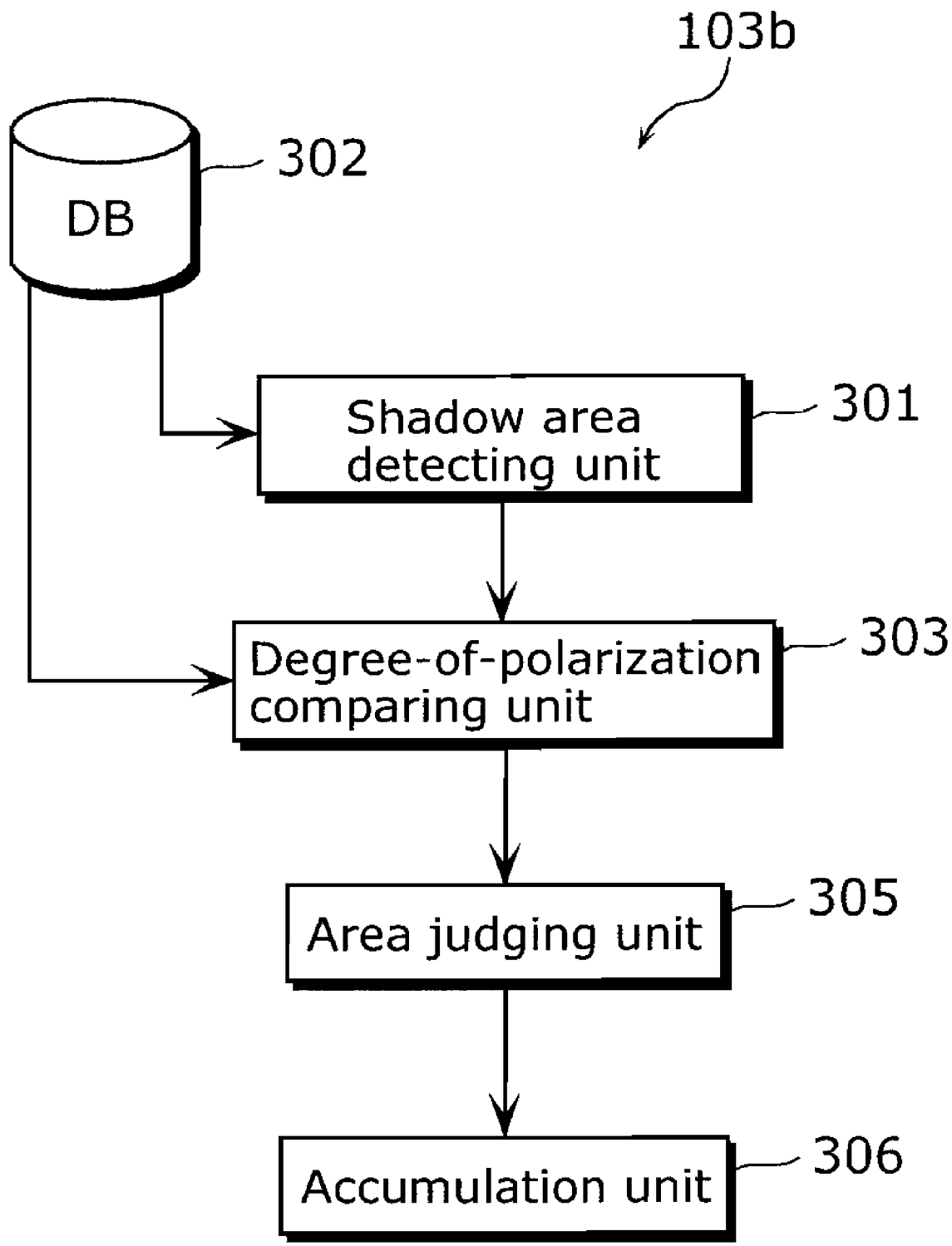
FIG. 24 is a functional block diagram showing the structure of the area dividing unit according to the Variation of Embodiment 1 of the present invention.

In addition, the degree of polarization may be used instead of the estimated polarization error in the judgment whether the pixel is an attached shadow area or a cast shadow area using an estimated polarization error (S204) in the processes shown in FIG. 15. FIG. 24 is a functional block diagram showing the detailed structure of the area dividing unit 103b according to this Variation for judging whether an attached shadow area or a cast shadow area using the degree of polarization. This area dividing unit 103b includes a shadow area detecting unit 301, a DB 302, an estimated polarization error comparing unit 304, an area judging unit 305 and an accumulation unit 306. It is to be noted that, in FIG. 24, the structural elements common with FIG. 14 are assigned with the same numerical references as those in FIG. 14, and detailed descriptions thereof are omitted.

Figure 25:
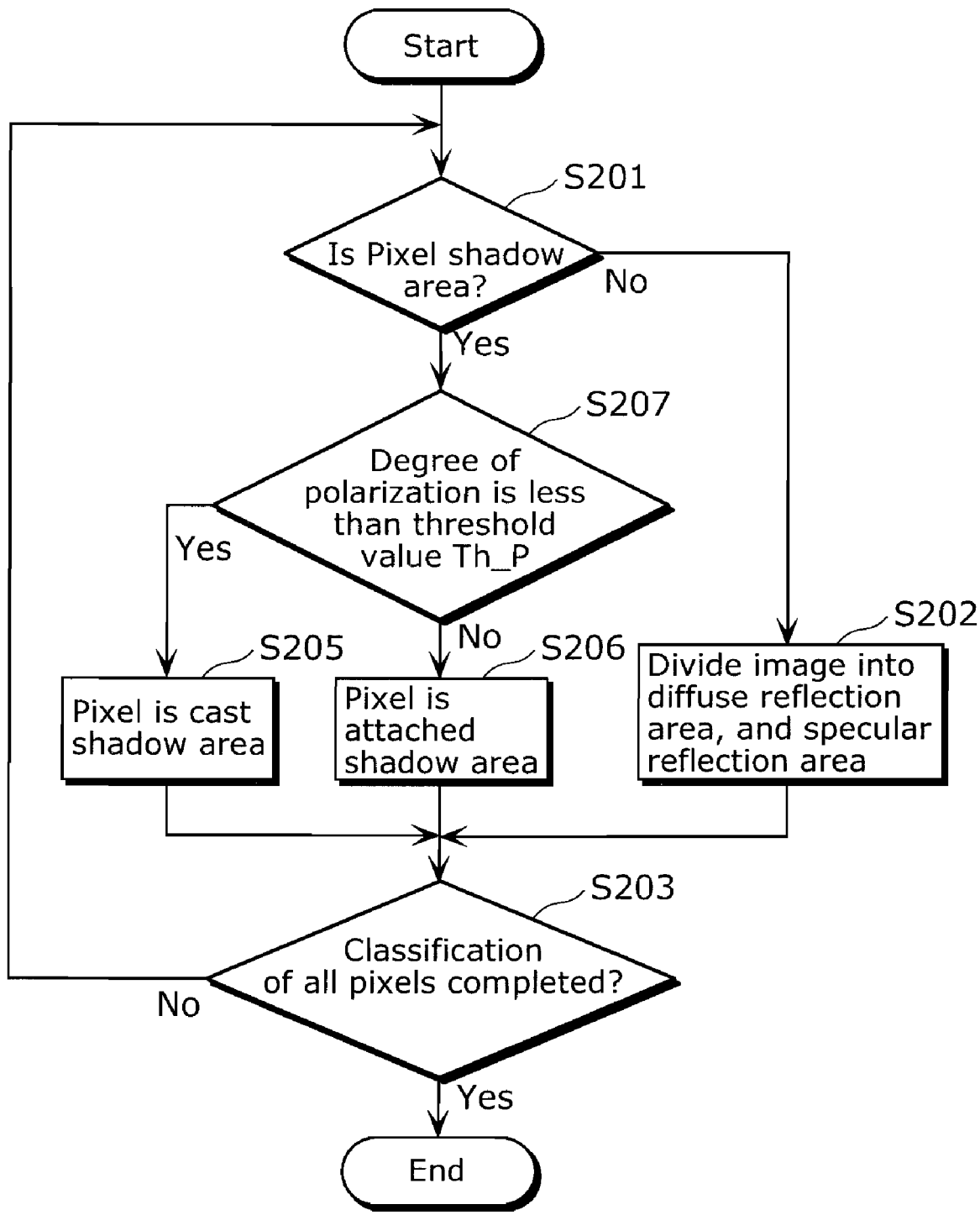
FIG. 25 is a flowchart of processes performed by the area dividing unit shown in FIG. 24.

FIG. 25 is a flowchart of processes performed by this area dividing unit 103b. It is to be noted that, in FIG. 25, the steps common with FIG. 15 are assigned with the same numerical references as those in FIG. 15, and detailed descriptions thereof are omitted.

When the shadow area detecting unit 301 judges that the pixel is a shadow area (Yes in S201), the degree-of-polarization comparing unit 303 compares the degree of polarization ρ defined by Expression 6 and the threshold value Th_P in order to judge whether the pixel is an attached shadow area or a cast shadow area (S207). As the result, when the degree of polarization ρ is less than the threshold value Th_P (Yes in S207), the area dividing unit 305 judges that the pixel is a cast shadow area (S205), whereas when the degree of polarization ρ is less than the threshold value Th_P (No in S207), the area dividing unit 305 judges that the pixel is an attached shadow area (S206). In this way, whether the pixel is an attached shadow area or a cast shadow area is judged based on the degree of polarization.

It is to be noted that the threshold value Th_P may be set based on the refraction index of the object, the normal vector direction of the object, the light source direction, the sight line direction and the like. As shown in FIG. 9 and FIG. 10, the polarization degree of specular reflection components of the object and the polarization degree of diffuse reflection components can be uniquely determined when the refraction index, the incidence angle, and the emission angle are calculated. Therefore, the polarization degree of specular reflection components and the polarization degree of diffuse reflection components calculated in FIG. 9 and FIG. 10 may be used as Th_P. In addition, in the case where information such as the refraction index of the object, the normal vector direction of the object, the light source direction, the sight line direction cannot be obtained, the threshold value Th_P may be determined based on the possible maximum value of the polarization degree of a diffuse reflection component. For example, it is considered, from FIG. 10, that the maximum value of the polarization degree of a diffuse reflection component is approximately 0.6 supposing that no object having a refraction index of 2.0 or more exists, and thus approximately 0.7 may be set as the threshold value Th_P.

Figure 26:
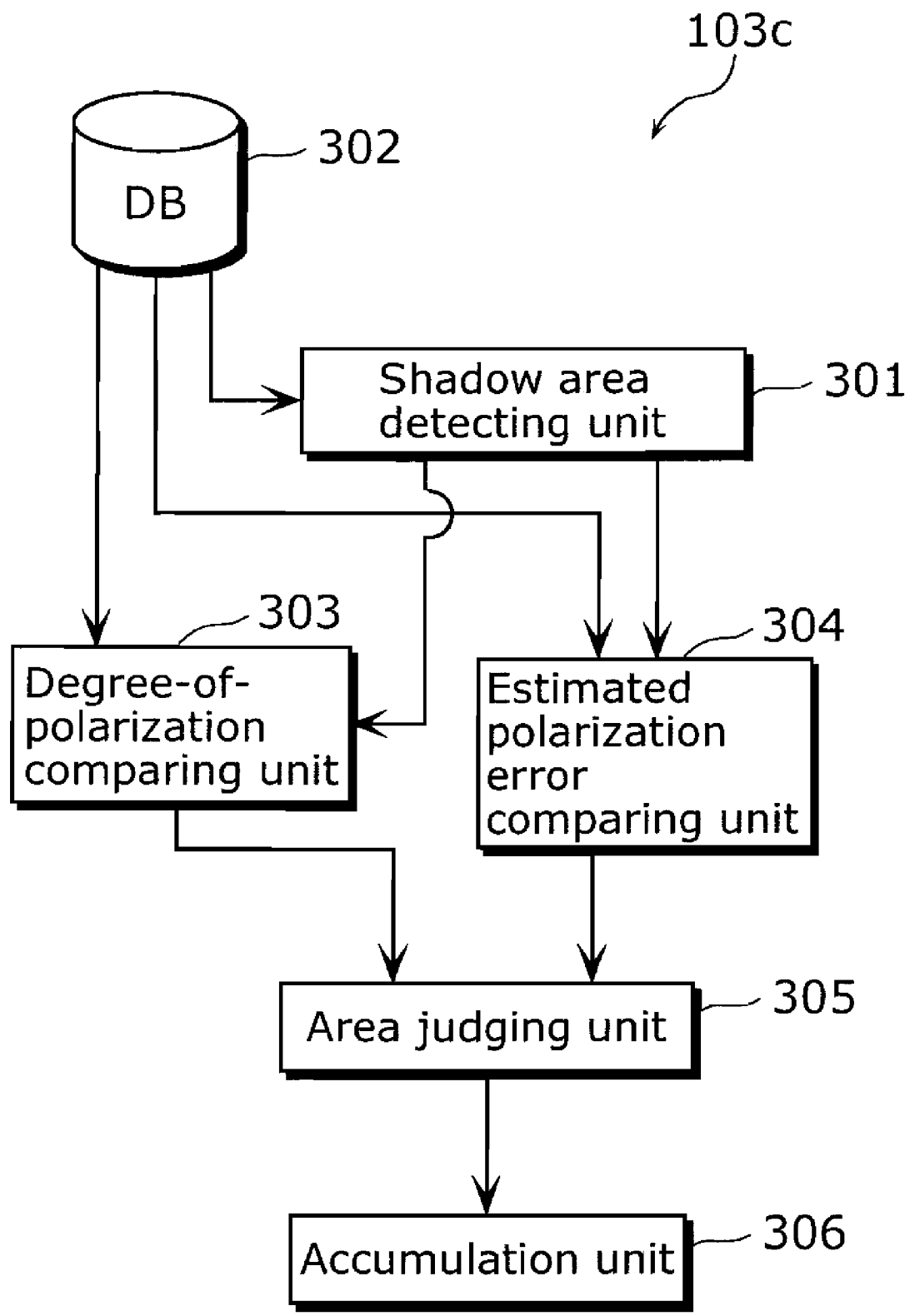
FIG. 26 is a functional block diagram showing the structure of the area dividing unit according to the Variation of Embodiment 1 of the present invention.

In addition, in the processes shown in FIG. 15, both an estimated polarization error and the degree of polarization may be used not only one of these in the judgment whether the pixel is an attached shadow area or a cast shadow area (S204). FIG. 26 is a functional block diagram showing the detailed structure of the area dividing unit 103c according to this Variation for judging whether the pixel is an attached shadow area or a cast shadow area using both the estimated polarization error and the degree of polarization. This area dividing unit 103c includes a shadow area detecting unit 301, a DB 302, a degree-of-polarization comparing unit 303, an estimated polarization error comparing unit 304, an area judging unit 305, and an accumulation unit 306. It is to be noted that, in FIG. 26, the structural elements common with FIG. 14 are assigned with the same numerical references as those in FIG. 14, and detailed descriptions thereof are omitted. This area dividing unit 103c includes the same structural elements as those of the area dividing unit 103 shown in FIG. 14, but the judgment standards in the area division performed by the area judging unit 305 are different from those of the area dividing unit 103.

Figure 27:
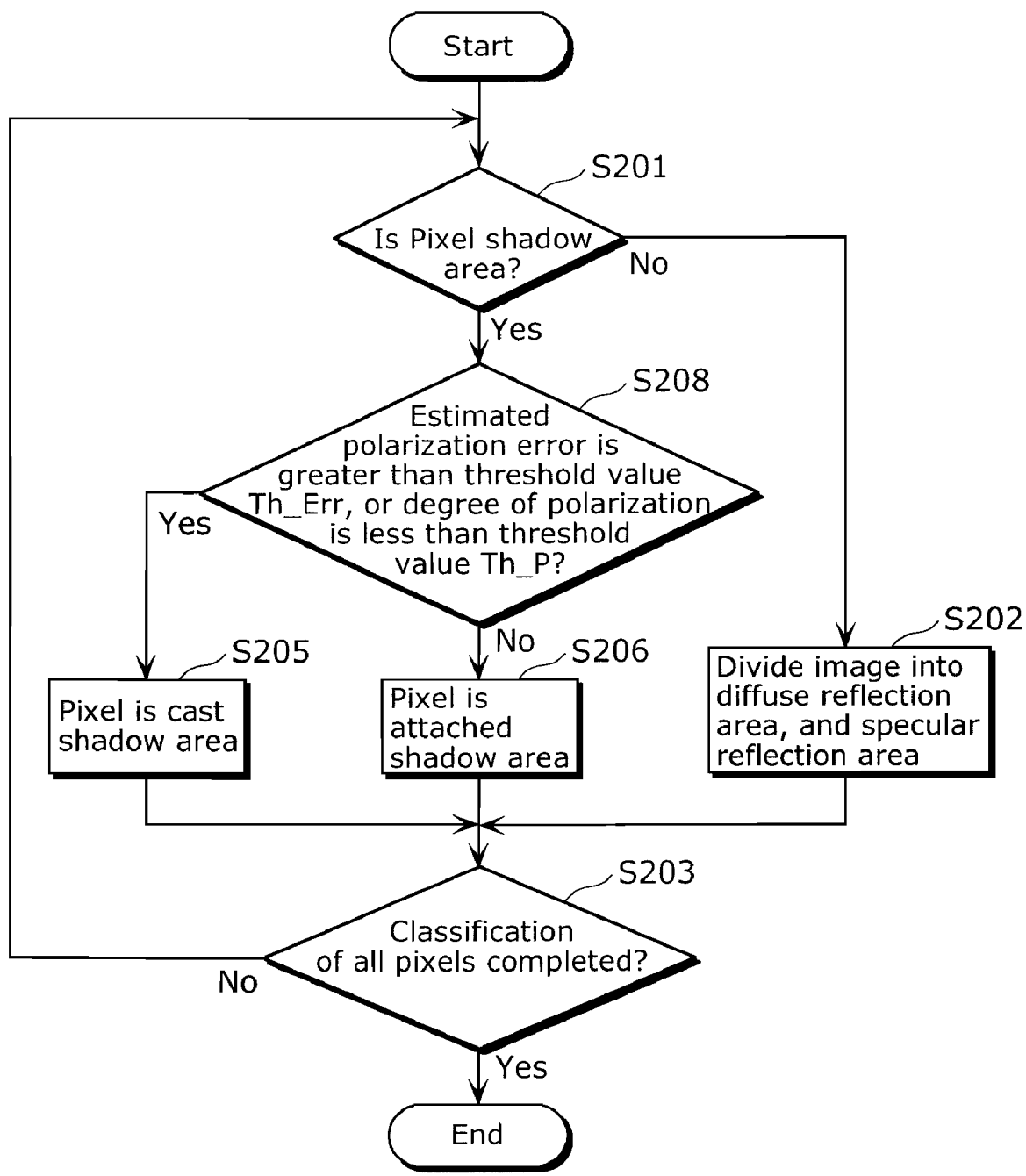
FIG. 27 is a flowchart of processes performed by the area dividing unit shown in FIG. 26.

FIG. 27 is a flowchart of processes performed by this area dividing unit 103c. It is to be noted that, in FIG. 27, the steps common with FIG. 15 are assigned with the same numerical references as those in FIG. 15, and detailed descriptions thereof are omitted. When the shadow area detecting unit 301 judges that a target pixel is a shadow area (Yes in S201), the estimated polarization error comparing unit 304 and the degree-of-polarization comparing unit 303 evaluate the estimated polarization error E defined by Expression 8 and the degree of polarization ρ defined by Expression 6 respectively in order to judge whether the pixel is an attached shadow area or a cast shadow area. In other words, the estimated polarization error comparing unit 304 compares the estimated polarization error E and the threshold value Th_Err, and the degree-of-polarization comparing unit 303 compares the degree of polarization ρ and the threshold value Th_P.

As the result, when the estimated polarization error E is greater than the threshold value Th_Err, or the magnitude of the degree of polarization ρ is less than the threshold value Th_P (Yes in S208), the area judging unit 305 judges that the pixel is a cast shadow area (S205), whereas when the magnitude of the estimated polarization error E is less than the threshold value Th_Err, and the magnitude of the degree of polarization ρ is greater than the threshold value Th_P (No in S208), the area judging unit 305 judges that the pixel is an attached shadow area (S206). In this way, both the estimated polarization error and the degree of polarization are used to judge whether the pixel is an attached shadow area or a cast shadow area.

It is to be noted that the threshold value Th_Err of the estimated polarization error E may take a greater value compared to the case of making a judgment by only using the estimated polarization error as in the processes in FIG. 15, and that the threshold value Th_P of the degree of polarization ρ may take a smaller value compared to the case of making a judgment based on the degree of polarization only as in the processes in FIG. 25. In addition, the area judging unit 305 may judge that the pixel is an attached shadow area only when the magnitude of the estimated polarization error E is greater than the threshold value Th_Err, and the magnitude of the degree of polarization ρ is less than the threshold value Th_P (S208).

In addition, an estimated polarization error is used to judge whether the pixel is an attached shadow area or a cast shadow area (S204) in the processes of FIG. 15, the judgment may be made based on the fact that the polarization characteristics of the attached shadow area are specular reflection characteristics. For example, the polarization phase (p defined by Expression 7 may be used. As described above, the polarization phase ϕ shows one component of the normal vector of the object, but the relationship between the polarization phase ϕ and the one component of the normal vector of the object vary by 90 degrees depending on whether specular reflection components are dominant regarding the object or diffuse reflection components are dominant regarding the object. For example, FIG. 7(c) (FIG. 8(c) which is a schematic diagram of FIG. 7(c)) shows that the polarization phase of the attached shadow area is significantly different from the polarization phase information of the adjacent area. This is because the attached shadow area shows the polarization characteristics of specular reflection components, and the adjacent area shows the polarization characteristics of diffuse reflection components. For this, the pixel indicating the polarization characteristics of specular reflection components is detected and the attached shadow area is detected by evaluating the continuity of the polarization phase of the object.

In addition, the shadow area detecting unit 301 shown in FIG. 14 and the like may use a light emitting device 207 (such as a flash) mounted on a camera 200. This is because, when an object having a sufficiently small reflectance such as a blackout curtain exists, a judgment based on the luminance value is insufficient to distinguish the shadow area and the blackout curtain. With reference to the drawings, a detailed description is given of the normal vector information generating device according to the Variation of this Embodiment in which such flash is used.

Figure 28:
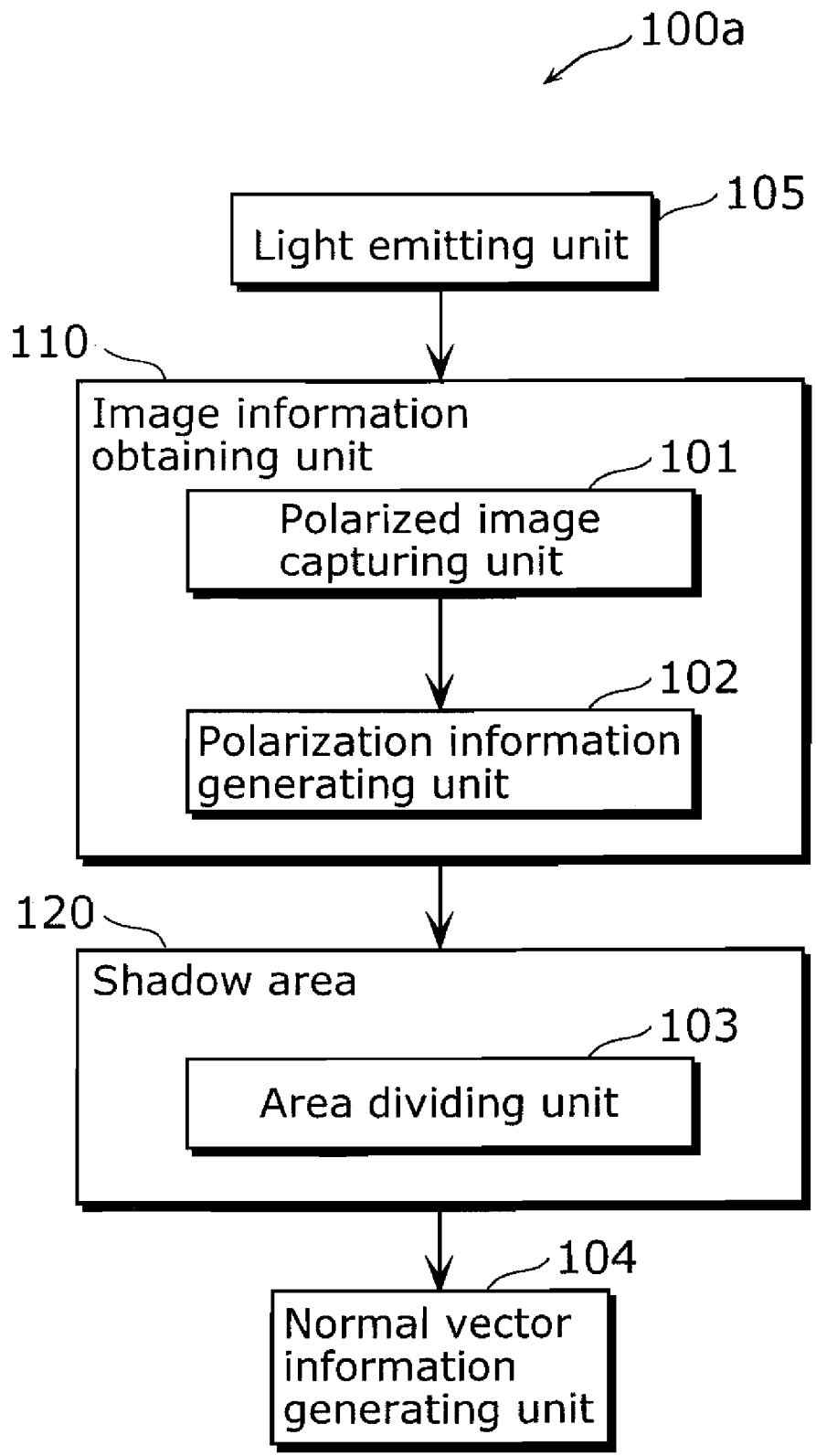
FIG. 28 is a functional block diagram showing the structure of the normal vector information generating device in the Variation, of Embodiment 1, using a flash.

FIG. 28 is a functional block diagram showing the structure of the normal vector information generating device 100a according to the Variation like this. This normal vector information generating device 100a has the structure of the normal vector information generating device 100 shown in FIG. 1 and the light-emitting unit 105 added thereto. It is to be noted that, in FIG. 28, the structural elements common with FIG. 1 are assigned with the same numerical references as those in FIG. 1, and detailed descriptions thereof are omitted.

The light emitting unit 105 is a flash for projecting light onto the object working with the imaging operations performed by the normal vector information generating device 100a. At this time, this light emitting unit 105 controls lighting of the flash. The polarized image capturing unit 101 captures two images working with the light emitting unit 105; one of the images is captured in a state where the flash is used, and the other is captured in a state where the flash is not used. At this time, the images are captured in such a manner that the positional relationship between the object and the camera 200 is not changed. For example, such imaging may be performed using a serial imaging function of the camera 200.

Figure 29:
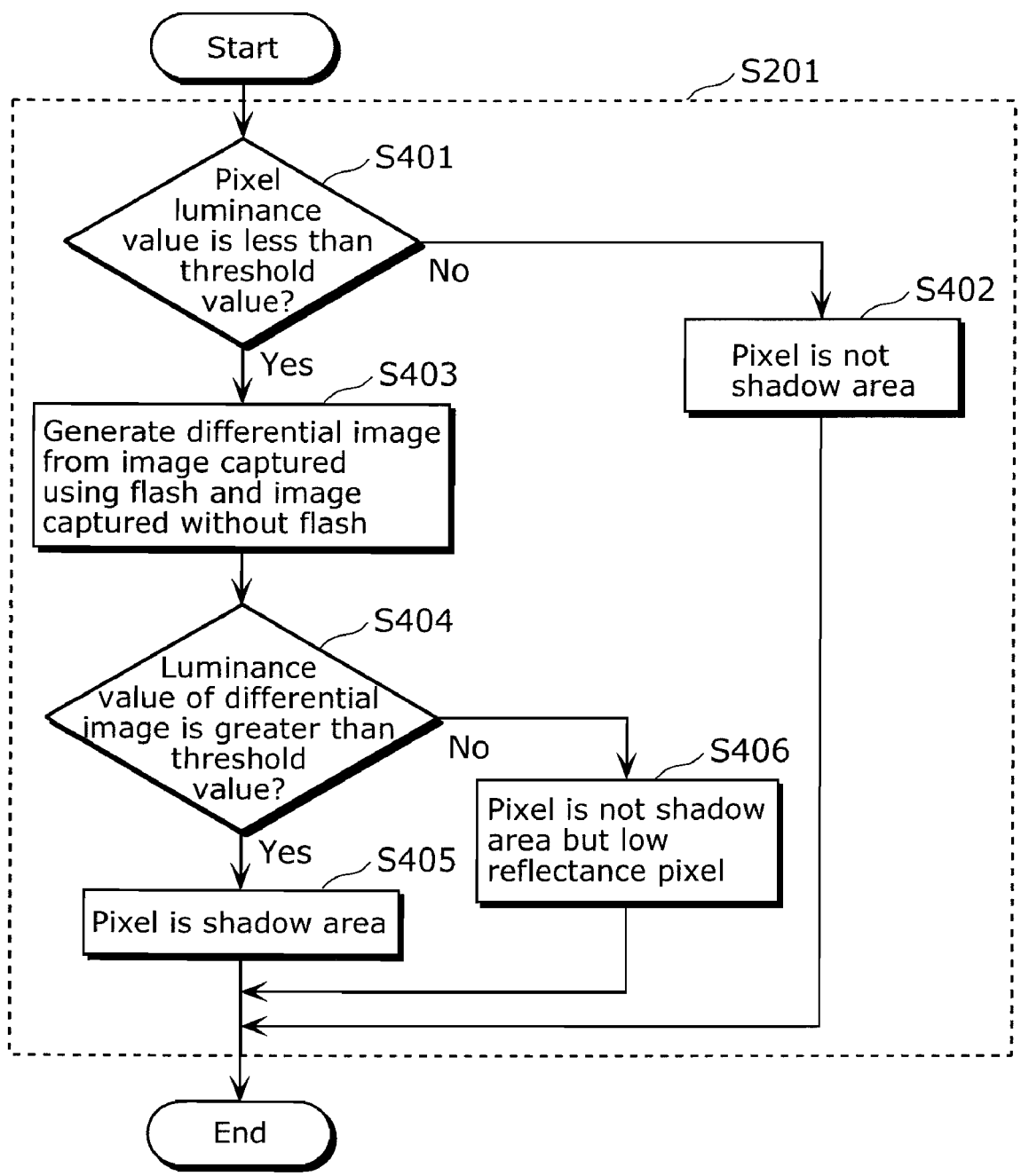
FIG. 29 is a flowchart of shadow detecting processes performed by the normal vector information generating device shown in FIG. 28.

FIG. 29 is a flowchart of shadow detecting processes performed by the normal vector information generating device 100a according to this Variation. In other words, FIG. 29 is a flowchart indicating another approach of the shadow area detecting process (S201) in FIG. 15. First, the shadow area detecting unit 301 checks the luminance value of the pixel in a state where the flash is not used (S401). In the case where the luminance value of the pixel is greater than the threshold value (No in S401), the shadow area detecting unit 301 judges that the pixel is not a low luminance area (here, a shadow area) (S402), and ends the processing.

In the opposite case where the luminance value of the pixel is less than the threshold value (Yes in S401), it is highly likely that the pixel is a shadow area, and thus, the shadow area detecting unit 301 generates a differential image between the flash image captured using the flash and the normal image captured without using the flash (S403). Assuming that the lighting position of the flash is sufficiently close to the positions of the imaging elements and the distances between them are approximately equal, a cast shadow caused by the lighting flash does not exist on the image. This is because the sight line direction equals to the light source direction. Therefore, direct light appears on the areas when the flash is lighted although the areas are shadow areas in a no-flash state. Accordingly, the luminance values of the shadow areas increase significantly.

On the other hand, when the pixel is not a shadow area and a blackout curtain having a low reflectance, the luminance value does not substantially change when the flash is used because of its low reflectance. In other words, when the luminance value of the differential image captured using the flash is equal to or greater than the threshold value (Yes in S404), the shadow area detecting unit 301 judges that the pixel is a shadow area (S405), and ends the processing. In contrast, when the luminance value of the differential image by the flash is less than the threshold value (No in S404), the shadow area detecting unit 301 judges that the pixel is not a shadow area but a low reflectance area (or a low reflectance pixel) (S405), and ends the processing.

Even when an object such as a blackout curtain having a small reflectance exists in this way, it is possible to detect shadow areas accurately, classify the shadow areas into attached shadow areas and cast shadow areas, and generate accurate normal vector information of the shadow areas by assuming specular reflection. In addition, as for shadow areas having polarization information including a lot of errors and where only extremely poor accuracy is obtained when normal vector information is generated, not performing normal vector information generating processes makes it possible to generate highly accurate normal vector information of areas as large as possible.

As described above, according to the normal vector information generating device in this Embodiment, the shadow areas are classified into attached shadow areas and cast shadow areas, and as for the attached shadow areas, accurate normal vector information is generated assuming specular reflection. In addition, as for shadow areas having polarization information including a lot of errors and where only extremely poor accuracy is obtained when normal vector information is generated, not performing normal vector information generating processes makes it possible to generate highly accurate normal vector information of areas as large as possible.

In this Embodiment, photonic crystals are used as a patterned polarizer 201, but film-type polarizing elements or polarizing elements of wire grid type or using another mechanism may be used. In addition, luminance having different polarization principal axes may be obtained in time series by performing imaging while rotating the deflecting plate mounted in the front of the lens of the camera 200 without using a patterned polarizer. This method is disclosed in Japanese Patent Application Publication No. 11-211433: Patent Reference 2.

Embodiment 2

Next, a description is given of a normal vector information generating device in Embodiment 2 of the present invention.

Figure 30:
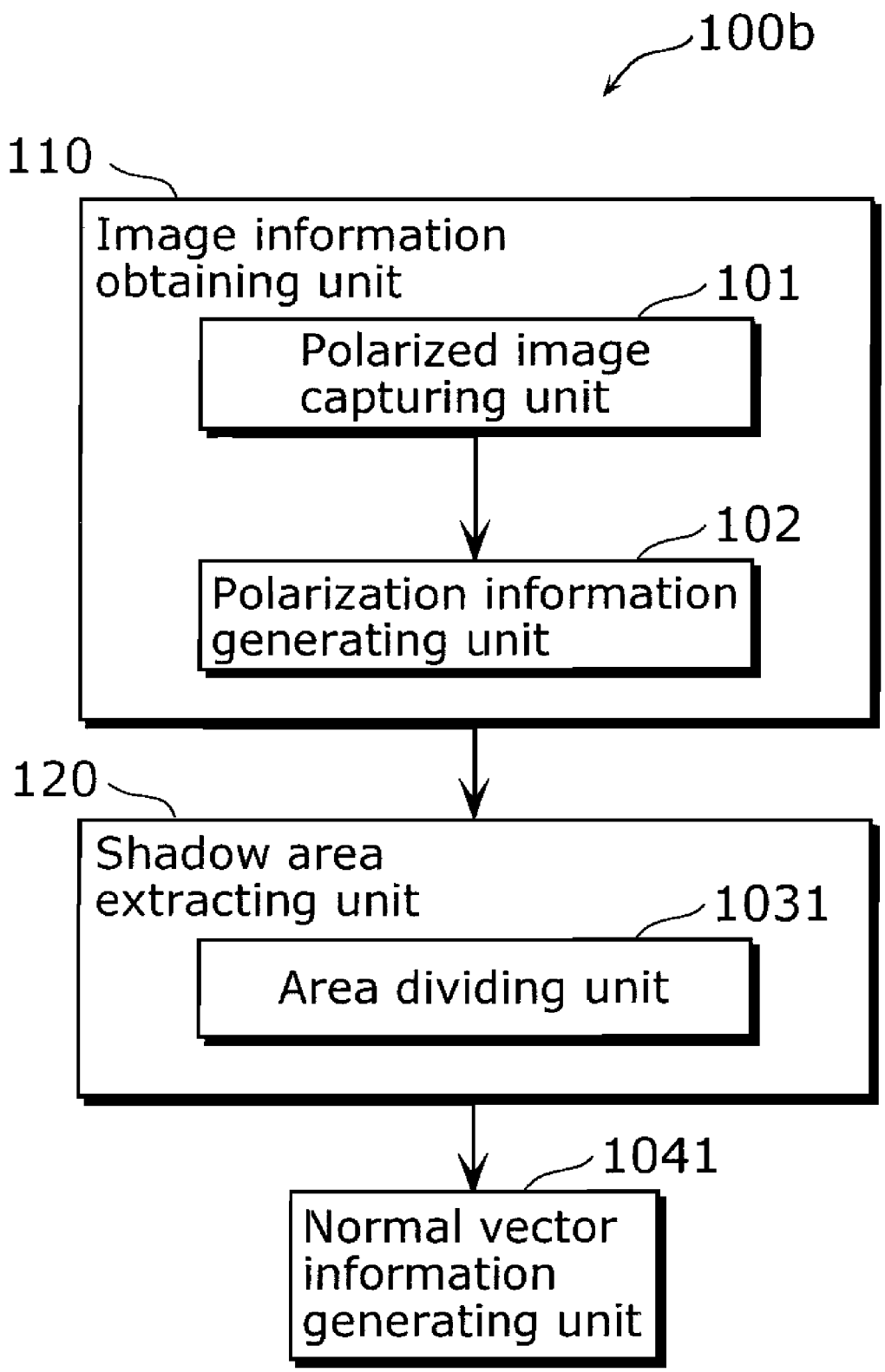
FIG. 30 is a functional block diagram showing the structure of a normal vector information generating device in Embodiment 2 of the present invention.

FIG. 30 is a functional block diagram showing the structure of the normal vector information generating device 100b in this Embodiment. This normal vector information generating device 100b is a device for generating normal vector information on the surface of an object, and is characterized in that low luminance areas are classified into "attached shadow areas or low reflectance areas" and cast shadow areas. This normal vector information generating device 100b includes an area dividing unit 1031 and a normal vector information generating unit 1041 instead, which are slightly different in their functions from the area dividing unit 1031 and the normal vector information generating unit 1041 provided with the normal vector information generating device 100 in Embodiment 1. It is noted that the same structural elements as those of the normal vector information generating device 100 in Embodiment 1 are assigned with the same numerical references, and descriptions thereof are omitted.

The area dividing unit 1031 is a processing unit for dividing a polarized image into plural areas each of which is a group of image areas having optically common characteristics using similarity (likeness) between the luminance information of the polarized image and the polarized information generated by the polarization information generating unit 102. At this time, the area dividing unit 1031 compares the luminance of each image area and a predetermined threshold value, and classifies the image area as a low luminance area including a shadow area (the low luminance area including "an attached shadow area or a low reflectance area" and a cast shadow area in this Embodiment) when the luminance is less than the threshold value. In this Embodiment, the area dividing unit 1031 classifies the low luminance areas into "attached shadow areas or low reflectance areas" and cast shadow areas to divide the image into diffuse reflection areas, specular reflection areas, "attached shadow areas or low reflectance areas" and shadow areas.

The normal vector information generating unit 1041 is a processing unit for generating normal vector information from polarized information for each of the areas divided by the area dividing unit 1031. This normal vector information generating unit 1041 generates normal vector information assuming that the attached shadow areas are "attached shadow areas or low reflectance areas", unlike Embodiment 1.

Figure 31:
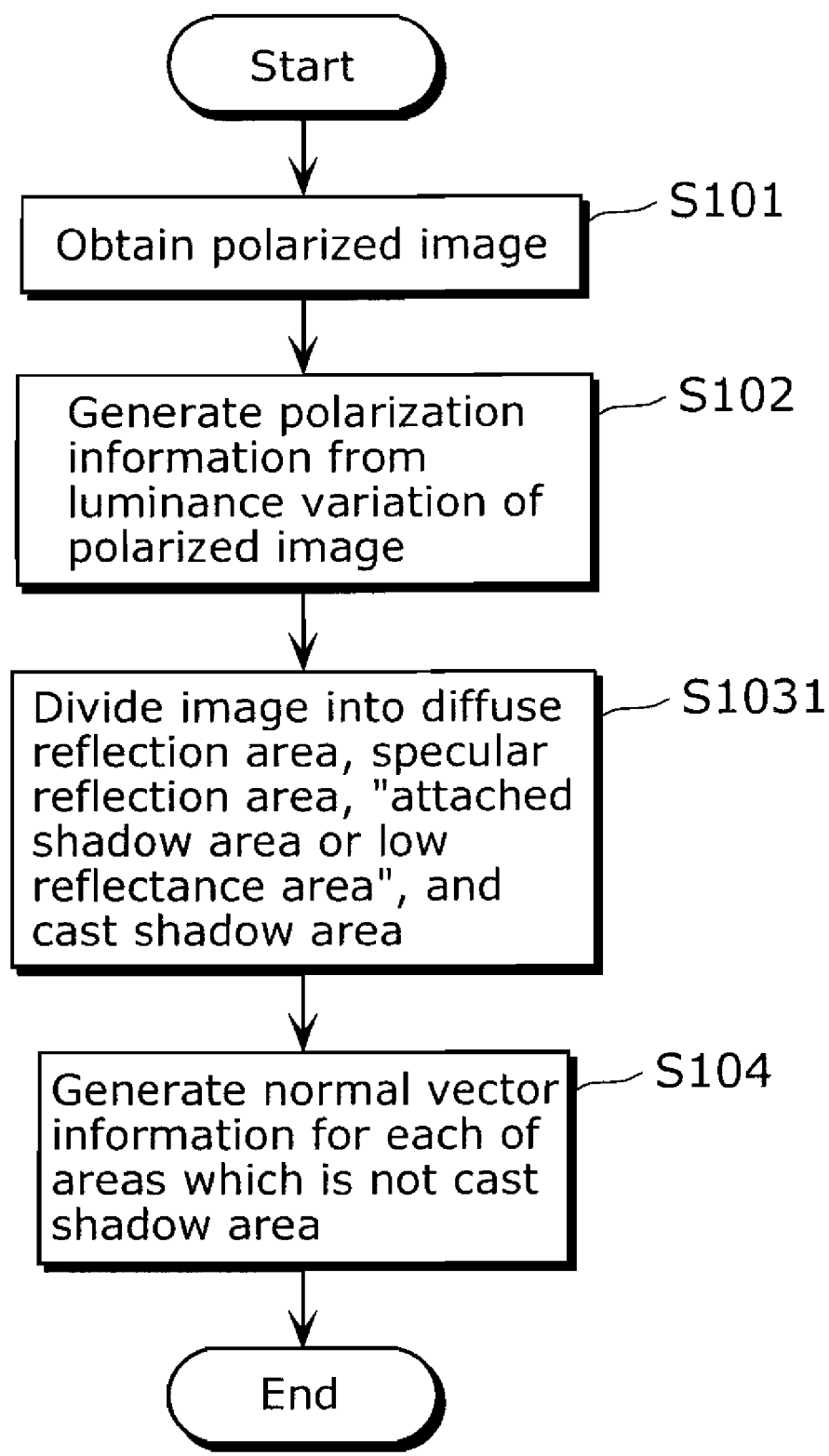
FIG. 31 is a flowchart of processes performed by the normal vector information generating device in Embodiment 2 of the present invention.

FIG. 31 is a flowchart of processes performed by the normal vector information generating device 100b in this Embodiment. It is to be noted that, in FIG. 31, the steps common with FIG. 4 in Embodiment 1 are assigned with the same numerical references as those in FIG. 4, and the descriptions thereof are omitted.

The area dividing unit 1031 classifies the portions of the image into diffuse reflection areas, specular reflection areas, and low luminance areas (in this Embodiment, "attached shadow areas or low reflectance areas" and cast shadow areas) using the polarization information generated by the polarization information generating unit 102 and the luminance information obtained by the polarized image capturing unit 101 (S1031).

The normal vector information generating unit 1041 generates normal vector information from the polarization information based on the result of the area division performed by the area dividing unit 1031 as described later (S104). At this time, no normal vector information generating process is performed because a lot of errors are included in the polarization information about cast shadow areas.

First, a description is given of the difference in the polarization characteristics of an object having a low reflectance. The internal reflection of the object having smooth surface and has a low reflectance is approximately 0, and diffuse reflection components are very weak. On the other hand, under the specular reflection condition, light is reflected and thus specular reflection becomes greater. In other words, it is considered that diffuse reflection components are weak in the low reflectance area, and specular reflection components become relatively dominant. This shows that the object having a low reflectance has the polarization characteristics as in the attached shadow areas described below.

(1) "Attached shadow areas or low reflectance areas"

The degree of polarization is high, and estimated polarization errors are small.

In many cases, specular reflection characteristics are indicated.

(2) Cast shadow areas

The degree of polarization is low, and estimated polarization errors are large.

In many cases, diffuse reflection characteristics are shown.

The low luminance areas are classified into "attached shadow areas or low reflectance areas" and cast shadow areas based on these classification standards. These processes are described in detail below with reference to the drawings.

Figure 32:
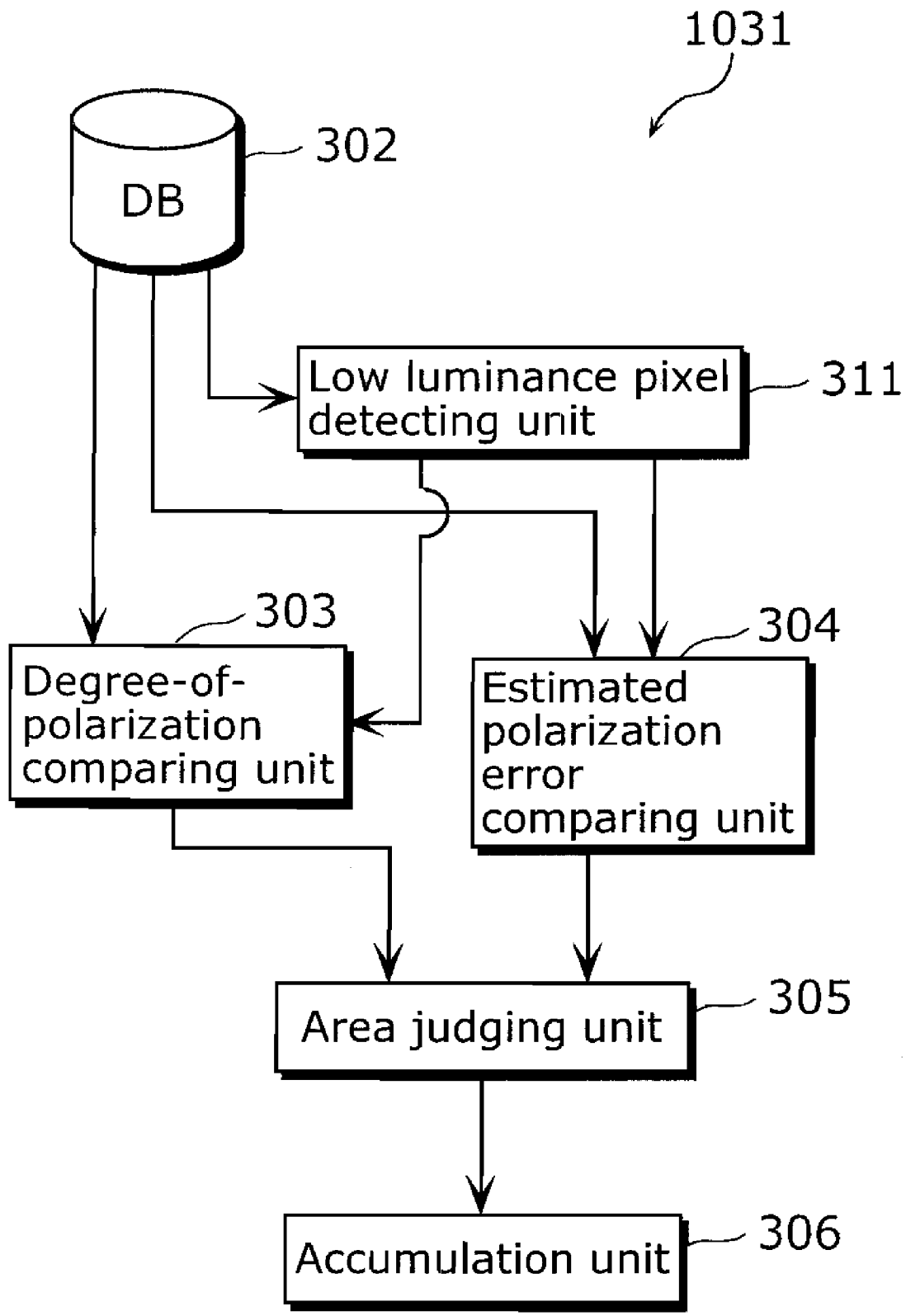
FIG. 32 is a functional block diagram showing a detailed structure of the area dividing unit in Embodiment 2 of the present invention.

FIG. 32 is a functional block diagram showing the detailed structure of the area dividing unit 1031 in the normal vector information generating device 100b shown in FIG. 30. This area dividing unit 1031 includes a DB 302, a degree-of-polarization comparing unit 303, an estimated polarization error comparing unit 304, an area judging unit 305, an accumulation unit 306, and a low luminance pixel detecting unit 311. It is to be noted that, in FIG. 32, the steps common with FIG. 14 in Embodiment 1 are assigned with the same numerical references as those in FIG. 14, and the descriptions thereof are omitted.

The low luminance pixel detecting unit 311 is a processing unit for estimating whether or not the pixels in the image obtained by the polarized image capturing unit 101 are low luminance areas (areas including "attached shadow areas or low reflectance areas" and cast shadow areas).

Figure 33:
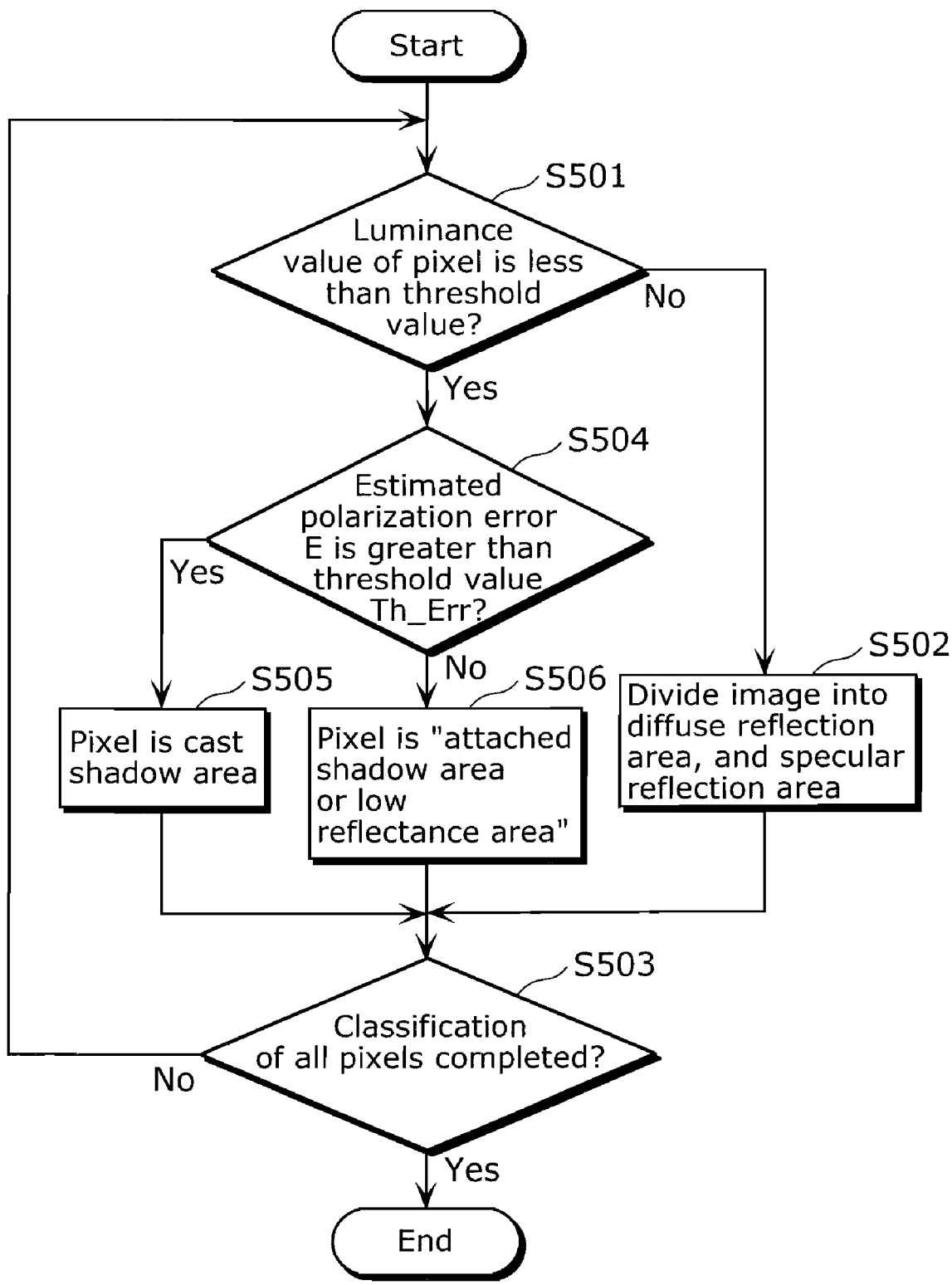
FIG. 33 is a flowchart of processes performed by the area dividing unit in Embodiment 2 of the present invention.

FIG. 33 is a flowchart of processes performed by this area dividing unit 1031. First, the low luminance pixel detecting unit 311 evaluates the luminance values of the pixels in the image obtained by the polarized image capturing unit 101 (S501). As in the step S201 described above, an evaluation is made to determine whether or not each of the luminance values is less than a threshold value. The threshold value for estimating the low luminance areas like this may be empirically determined, and for example, 256 may be set for a 16-bit monochrome image. This threshold value may be held in the DB 302. In the case where the luminance value is greater than the threshold value (No in S501), the area dividing unit 1031 judges whether diffuse reflection components are dominant in the image or specular reflection components are dominant in the image according to the method as in the step S202 described above (comparison by the degree-of-polarization comparing unit 303) (S502). After the completion of the diffuse reflection/specular reflection classification process (S502), the area judging unit 305 checks whether or not the optical classification of all the pixels has been completed (S503). In the case where there remains a pixel which has not yet been classified (No in S503), the low luminance pixel detecting unit 311 evaluates the luminance value of another pixel (S501). In addition, the optical classification of all the pixels has been completed (Yes in S503), the area dividing unit 1031 completes the processing.

On the other hand, when the luminance value of the pixel is equal to or less than the threshold value (Yes in S501), whether the pixel is "an attached shadow area or a low reflectance area" is judged (S504). As described above, the estimated polarization error comparing unit 304 is implemented by evaluating the magnitude of the estimated polarization error E defined by Expression 8 (by comparing the estimated polarization error E and the threshold value Th_Err). As the result, the area judging unit 305 judges that the pixel is an attached shadow area (S505) in the case where the magnitude of the estimated polarization error E is greater than the threshold value Th_Err (Yes in S504), while the area judging unit 305 judges that the pixel is "an attached shadow area or a low reflectance area" (S506) in the case where the magnitude of the estimated polarization error E is less than the threshold value Th_Err (No in S504). The threshold value Th_Err at this time may be determined according to the above-mentioned method. The result of the area division is accumulated in the accumulation unit 306.

The normal vector information generating unit 1041 generates normal vector information from the polarization information based on the result of the area division performed by the area dividing unit 1031. This normal vector information generating unit 1041 has the same structure as that of the normal vector information generating unit 104 in Embodiment 1, in other words, includes the accumulation unit 306, the area referencing unit 307, a unit for generating normal vector information assuming diffuse reflection 308 and a unit for generating normal vector information assuming specular reflection 309, as shown in FIG. 20. This normal vector information generating unit 1041 generates normal vector information assuming that the attached shadow areas are "attached shadow areas or low reflectance areas", unlike Embodiment 1.

Figure 34:
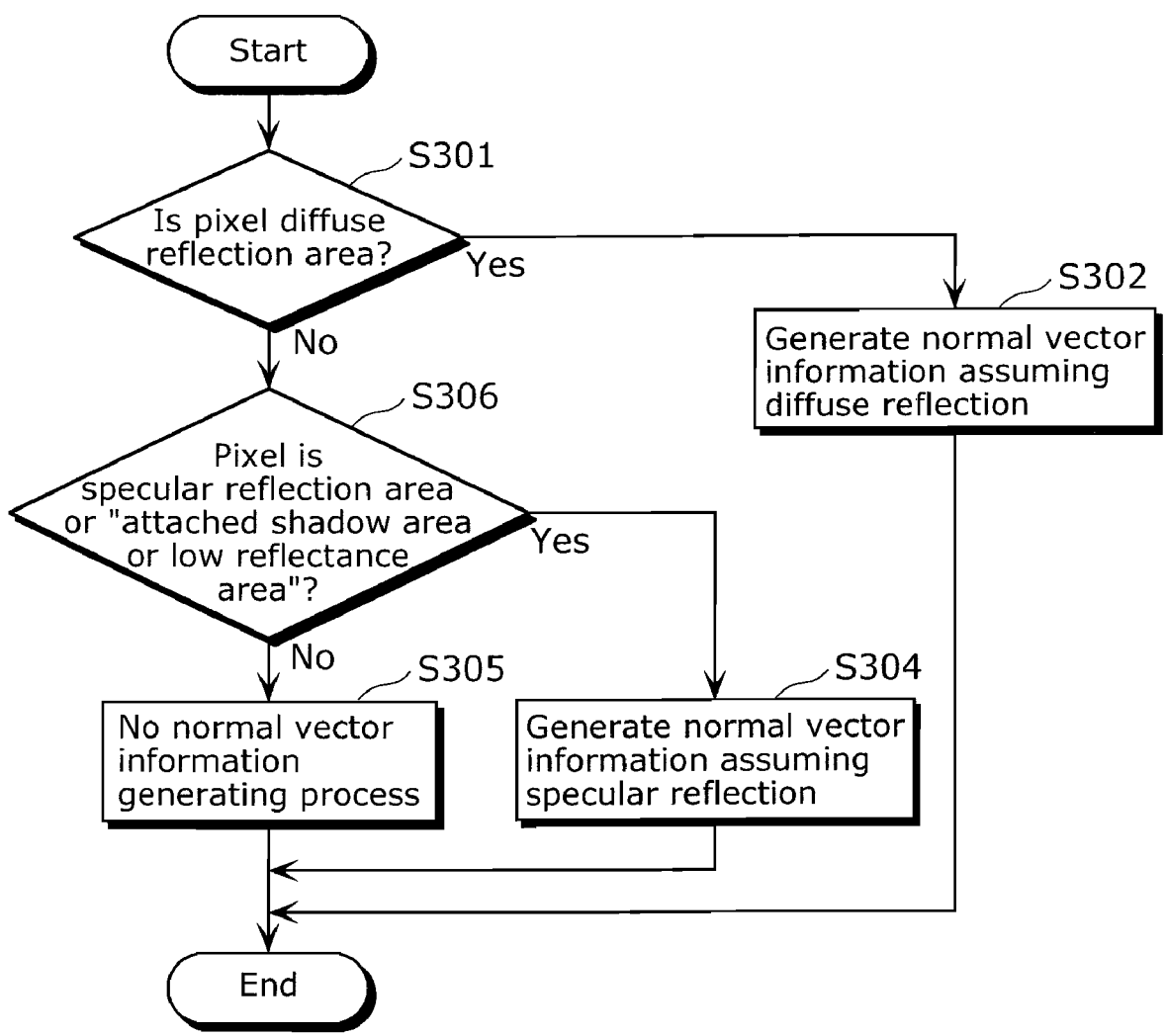
FIG. 34 is a flowchart of processes performed by the normal vector information generating unit in Embodiment 2 of the present invention.

FIG. 34 is a flowchart of processes performed by this normal vector information generating unit 1041. It is to be noted that, in FIG. 34, the steps common with FIG. 21 are assigned with the same numerical references as those in FIG. 21, and detailed descriptions thereof are omitted.

The area referencing unit 307 of the normal vector information generating unit 1041 judges whether or not diffuse reflection components are dominant in the pixel based on the result of the optical area division detected by the area dividing unit 1031 (S301). In this processing, the result of the area division may be read from the accumulation unit 306 in which the result of the area judging unit 305 is accumulated. When it is judged that diffuse reflection components are dominant (Yes in S301), the unit for generating normal vector information assuming diffuse reflection 308 generates normal vector information of the pixel assuming diffuse reflection (S302). More specifically, the one-dimensional degree of freedom of the normal vector on an emission plane is calculated as an angle at which luminance changed by the rotation of a deflecting plate becomes the maximum value. In addition, not diffuse reflection components (No in S301) but specular reflection components are dominant in the pixel or the pixel is "an attached shadow area or a low reflectance area" (Yes in S306), the unit for generating normal vector information assuming specular reflection 309 generates normal vector information of the pixel assuming specular reflection (S304). More specifically, the one-dimensional degree of freedom of the normal vector on the incidence plane is calculated as the angle at which the luminance changed by the rotation of a deflecting plate becomes the minimum value. On the other hand, in the case where the pixel is a cast shadow area (No in S303), it is judged that errors are dominant in the polarization information of the pixel, and no accurate normal vector information can be generated, and the normal vector information generating unit 1041 does not perform normal vector information generating processes (S305).

As described above, according to the normal vector information generating device in this Embodiment, the low luminance areas are classified into "attached shadow areas or low reflectance areas" and cast shadow areas, and accurate normal vector information of "attached shadow areas or low reflectance areas" is generated assuming specular reflection. In addition, as for shadow areas having polarization information including a lot of errors and where only extremely poor accuracy is obtained when normal vector information is generated, not performing normal vector information generating processes makes it possible to generate highly accurate normal vector information of areas as large as possible.

It is to be noted that, in step S504, the degree of polarization, both the estimated polarization error and the degree of polarization, or the polarization phase may be used as in Embodiment 1 instead of the estimated polarization error in order to judge whether the pixel is "an attached shadow area or a low reflectance area", or a cast shadow area.

Embodiment 3

Next, a description is given of the normal vector information generating device in Embodiment 3 of the present invention.

Figure 35:
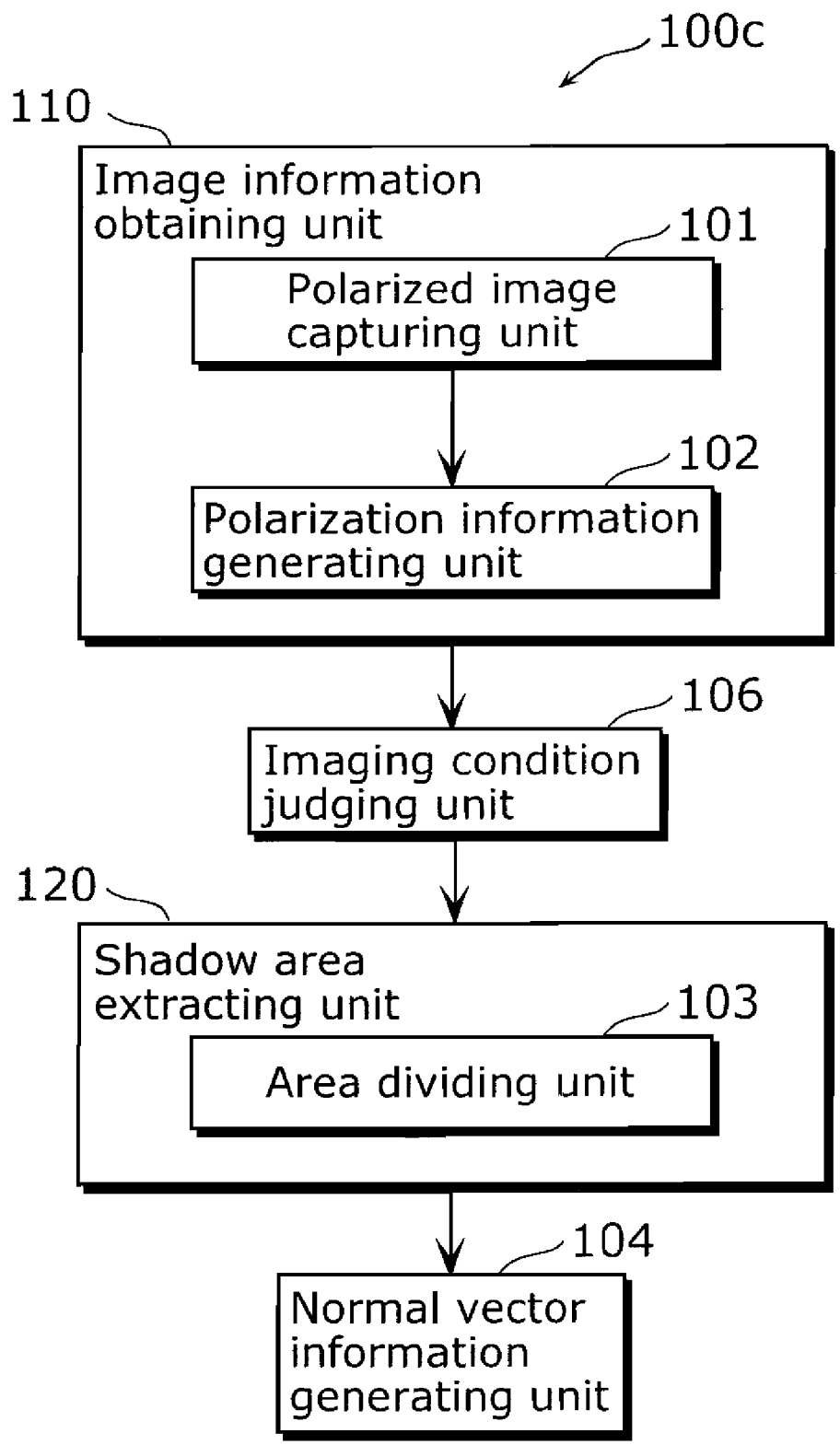
FIG. 35 is a functional block diagram showing the structure of a normal vector information generating device in Embodiment 3 of the present invention.

FIG. 35 is a functional block diagram showing the structure of the normal vector information generating device 100c in this Embodiment. This normal vector information generating device 100c is a device for generating normal vector information of the surface of the object, and characterized by generating normal vector information only when accurate normal vector information can be generated. The normal vector information generating device 100c includes an imaging condition judging unit 106 in addition to the structure of the normal vector information generating device 100 shown in FIG. 1. It is to be noted that, in FIG. 35, the structural elements common with FIG. 1 are assigned with the same numerical references as those in FIG. 1, and detailed descriptions thereof are omitted.

The imaging condition judging unit 106 is a processing unit for judging whether or not the target scene to be imaged by the polarized image capturing unit 101 satisfies the imaging condition predetermined as an imaging condition under which the normal vector information generating unit 104 can generate accurate normal vector information.

Figure 36:
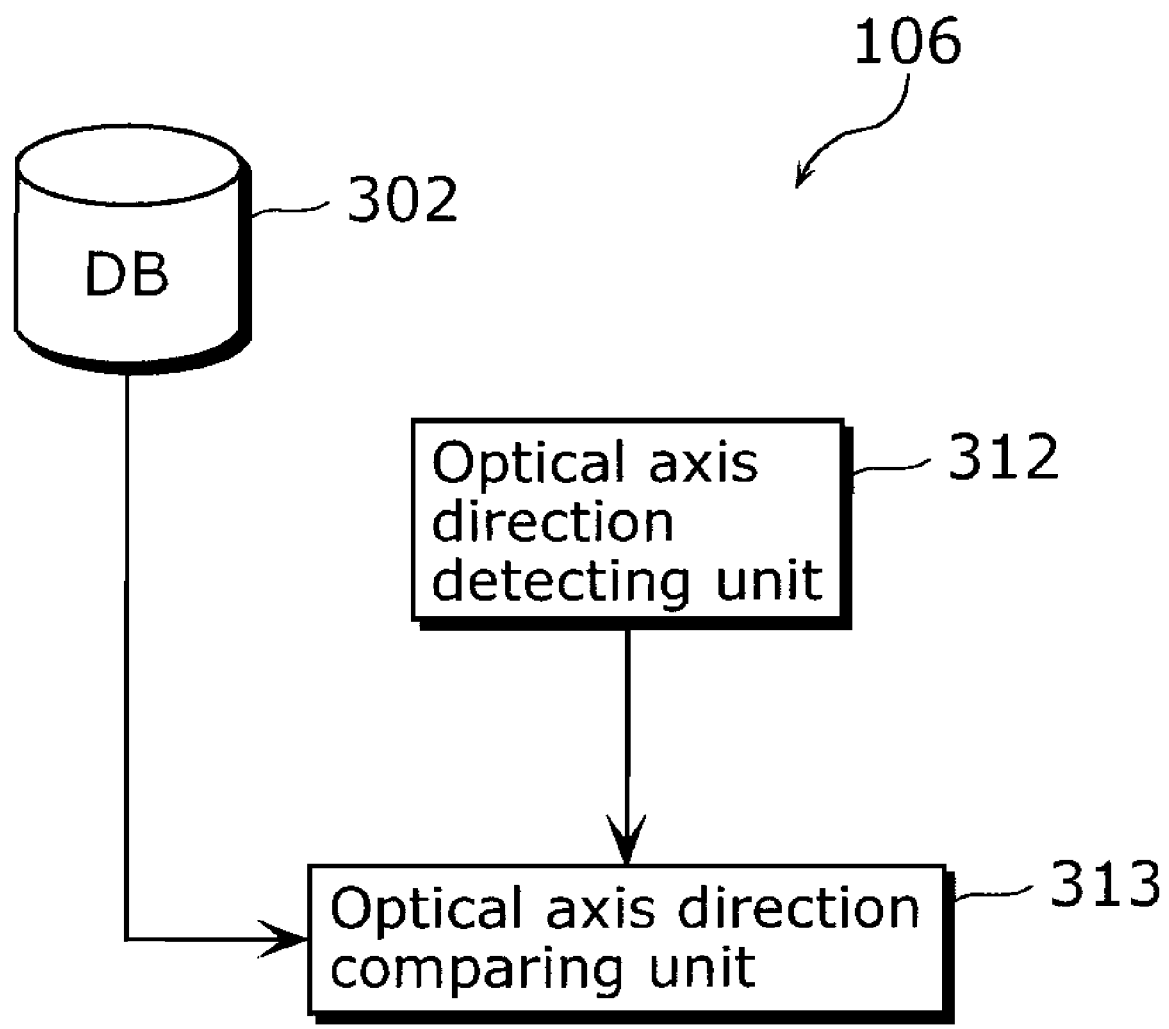
FIG. 36 is a functional block diagram showing a detailed structure of an imaging condition judging unit in Embodiment 3 of the present invention.

FIG. 36 is a functional block diagram showing the detailed structure of this imaging condition judging unit 106. This imaging condition judging unit 106 includes a DB 302, an optical axis direction detecting unit 312, and an optical axis direction comparing unit 313.

The optical axis direction detecting unit 312 is an angle sensor or the like for detecting an optical axis direction of the normal vector information generating unit 100c.

The optical axis direction detecting unit 313 is a processing unit for judging whether or not the normal vector information generating device 100c faces the upward direction of the horizontal surface (horizon plane).

Here, in this Embodiment, the image scene is required to satisfy the Condition 1 as explained in Embodiment 1.

Condition 1: "an object including a large plane exists near an object in an image scene, and a light source exists in the direction opposite to the object from a large plane.

It is to be noted that the above Condition 1 is not always satisfied in a state where the normal vector information generating device 100c is placed. For this, in this Embodiment, the imaging condition judging unit 106 judges whether or not the above Condition 1 is satisfied. Here, focusing on the great likelihood that a light source is in the upward direction, the Condition 1 is not satisfied under the following Condition 2.

Condition 2: "an image capturing person captures an image of an upward direction.

This Condition 2 is satisfied, for example, in the following image scene.

1. An outdoor scene of the sky, the moon, or stars.
2. An indoor scene in the direction of the ceiling on which fluorescent lamps are used.

In the case of the above image scene 1, for example, it is considered to image a crescent moon. It is considered that the shadow area of the crescent moon is an attached shadow area. However, this shadow area has a luminance due to the reflection which is multiple reflection from the Earth called earth shine. Therefore, although it is an attached area, it is considered that the multiple reflected light is incident from an extremely limited range, that is, only from the Earth, and that there are substantially no specular reflection components which are specular reflection components. Therefore, the normal vector information generating device 100c does not function accurately. For this, the imaging condition judging unit 106 judges whether or not the normal vector information generating device 100c accurately functions (can accurately generate normal vector information). When it is considered that the normal vector information generating device 100c accurately functions, processes for area division into attached shadow areas and cast shadow areas are performed, while processes for area division into shadow areas are cancelled and processes for generating normal vector information based on the shadow areas are cancelled when it is considered that the normal vector information generating device 100c does not accurately function.

Figure 37:
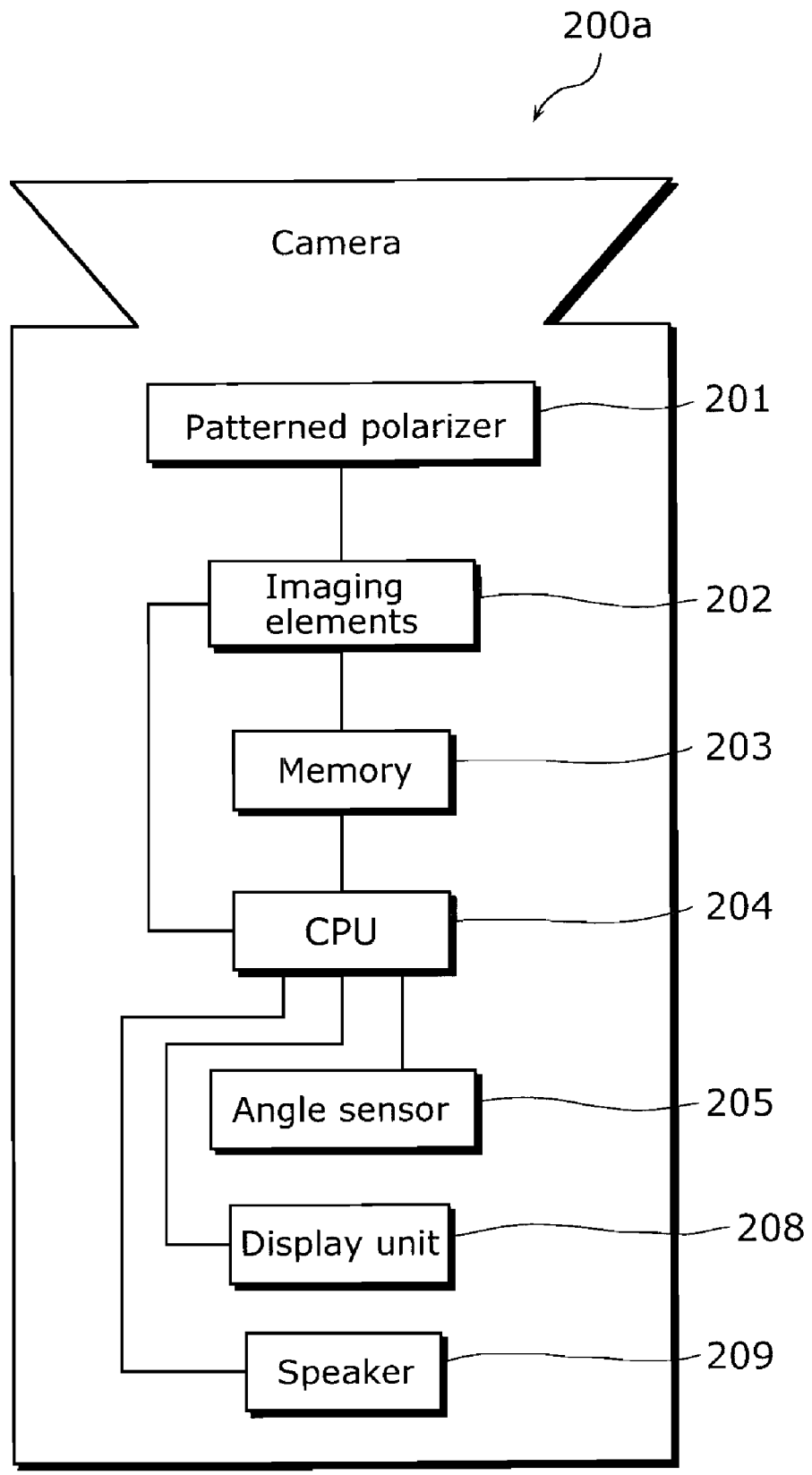
FIG. 37 is a structural example of a camera mounting the normal vector information generating device in Embodiment 3 of the present invention.

FIG. 37 shows an example of the hardware structure of a camera 200a mounting a normal vector information generating device 100c in this Embodiment. This camera 200a is an imaging device including a function for generating normal vector information, and includes a patterned polarizer 201, imaging elements 202, a memory 203, a CPU 204, an angle sensor 205, a display unit 208, and a speaker 209. It is to be noted that, in FIG. 37, the structural elements common with FIG. 2 are assigned with the same numerical references as those in FIG. 2, and detailed descriptions thereof are omitted.

The angle sensor 205 detects the optical axis direction of the camera 200a and outputs the information.

When the imaging condition judging unit 106 judges that the image scene does not satisfy the above Condition 1, the display unit 208 displays a message indicating the fact.

When the imaging condition judging unit 106 judges that the scene does not satisfy the above Condition 1, the speaker 209 outputs, in form of speech, the message indicating the fact.

It is noted that the optical axis direction detecting unit 312 shown in FIG. 36 is implemented as an angle sensor 205 shown in FIG. 37. The optical axis direction comparing unit 313 shown in FIG. 36 is implemented triggered by that the CPU 204 shown in FIG. 37 executes a program stored in the memory 203.

Figure 38:
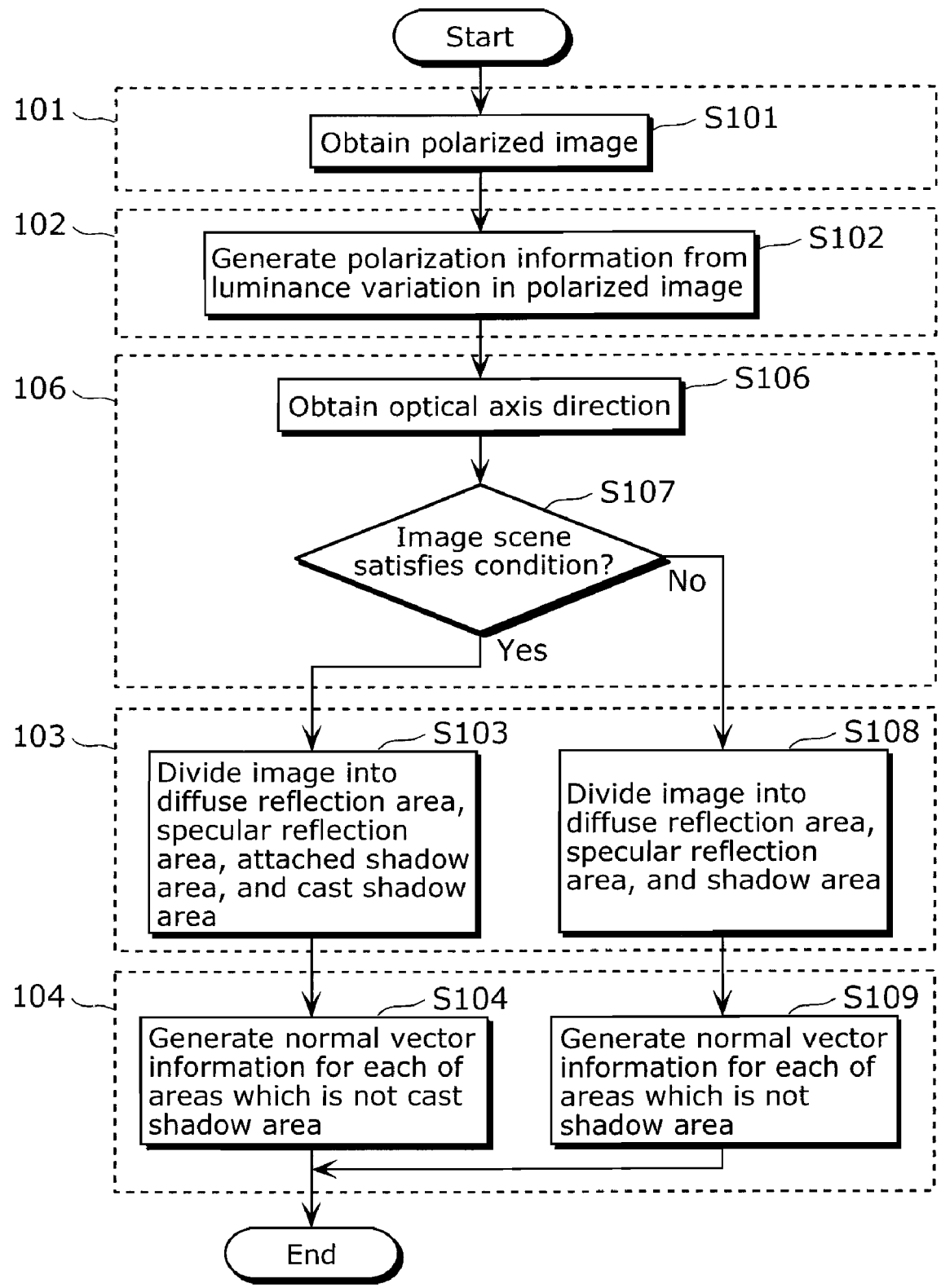
FIG. 38 is a flowchart of processes performed by the normal vector information generating device in Embodiment 3 of the present invention.

FIG. 38 is a flowchart of processes performed by the normal vector information generating device 100c in this Embodiment. It is to be noted that, in FIG. 38, the steps common with FIG. 4 are assigned with the same numerical references as those in FIG. 4, and the detailed descriptions thereof are omitted.

Figure 39:
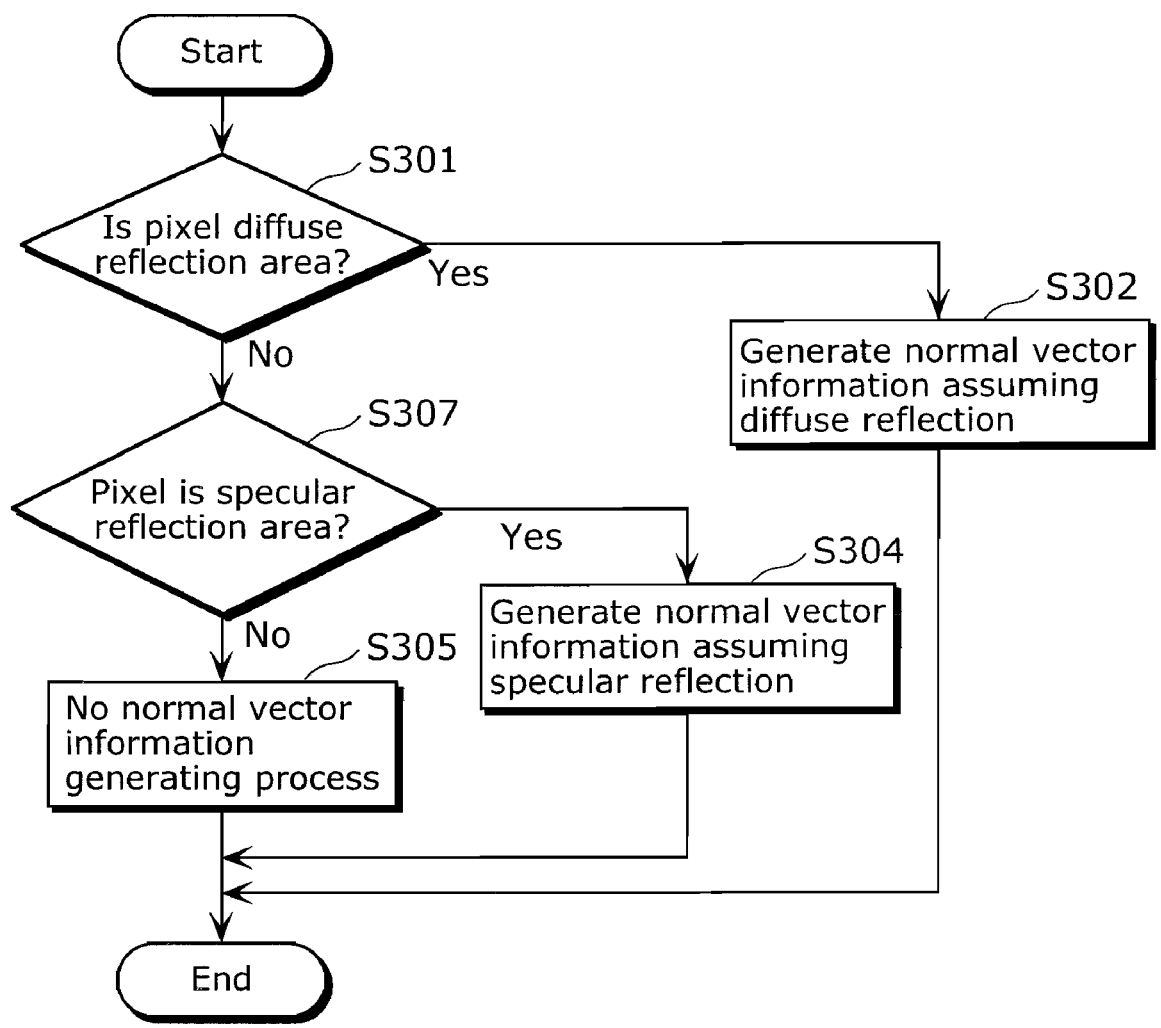
FIG. 39 is a flowchart of processes performed by the normal vector information generating unit in Embodiment 3 of the present invention.

In this Embodiment, the optical axis direction detecting unit 312 (the angle sensor 205) obtains optical direction information indicating the optical axis direction of the normal vector information generating device 100c (camera 200a) (S106). Whether or not a current environment is an environment where normal vector information is generated for an image scene is judged based on the optical axis direction information calculated in this way (S107). This is performed triggered by that the optical axis direction comparing unit 313 judges whether or not the optical axis direction of the normal vector information generating device 100c (camera 200a) faces upward. The optical axis direction comparing unit 313 judges that the optical axis direction faces upward, for example, in the case where the optical axis faces upward by 45 degrees from the horizontal direction. This threshold value of 45 degrees may be determined empirically, and the threshold value like this may be held in the DB 302. Here, in the case where the optical axis direction faces upward, the imaging condition judging unit 106 judges that the image scene does not satisfy the Condition 1 (No in S107), and the area dividing unit 103 classifies the portions of the image into diffuse reflection areas, specular reflection areas, and shadow areas using the polarization information generated by the polarization information generating unit 102 and the luminance information obtained by the polarized image capturing unit 101 (S108). Since the Condition 1 is not satisfied in this case, no classification of shadow areas into attached shadow areas and cast shadow areas is performed. Subsequently, the normal vector information generating unit 104 generates normal vector information from the polarized information based on the result of the area division performed by the area dividing unit 103 (S109). FIG. 39 is a flowchart of the detailed processes of this process (S109). It is to be noted that, in FIG. 39, the steps common with FIG. 21 are assigned with the same numerical references as those in FIG. 21, and detailed descriptions thereof are omitted.

The normal vector information generating unit 104 judges whether or not diffuse reflection components are dominant in the pixel based on the result of the optical area division detected by the area dividing unit 103 (S301). When it is judged that diffuse reflection components are dominant (Yes in S301), the normal vector information generating unit 104 generates normal vector information of the pixel assuming diffuse reflection (S302). More specifically, the one-dimensional degree of freedom of the normal vector on an emission plane is calculated as an angle at which luminance changed by the rotation of a deflecting plate becomes the maximum value. In addition, in the case where specular reflection components are dominant in the pixel (Yes in S307) not diffuse reflection components are dominant in the pixel (No in S301), the normal vector information generating unit 104 generates normal vector information of the pixel assuming specular reflection (S304). More specifically, the one-dimensional degree of freedom of the normal vector on the incidence plane is calculated as the angle at which the luminance changed by the rotation of a deflecting plate becomes the minimum value. On the other hand, in the case where the pixel is a shadow area, that is, neither diffuse reflection components nor specular reflection components are dominant (No in S307), the normal vector information generating unit 104 judges that errors are dominant in the polarization information of the pixel, and that no accurate normal vector information can be generated, and thus the normal vector information generating unit 104 does not perform normal vector information generating process (S305).

In contrast, when it is judged that the optical axis direction does not face upward (Yes in S107), the imaging condition judging unit 106 judges that the image scene satisfies the Condition 1, the area dividing unit 103 performs optical area dividing process (S103), and subsequently, the normal vector information generating unit 104 generates normal vector information (S104).

It is to be noted that, when the imaging condition judging unit 106 judges that the image scene does not satisfy the Condition 1, it is desirable that the display unit 208 displays, on the display, a message indicating that "No normal vector information generating processes for shadow areas can be implemented.", and that the speaker 209 notifies the image capturing person of a similar message by generating an audio signal.

As a matter of course, when the imaging condition judging unit 106 judges that the image scene does not satisfy the Condition 1, it is also good to generate normal vector information of the shadow areas assuming diffuse reflection instead of not performing optical area dividing processes and normal vector information generating processes, and it is good that the display unit 208 displays, on the display, a message indicating that "Normal vector information generating processes are unstable.", and that the speaker 209 notifies the image capturing person of the similar message by generating an audio signal.

In addition, when the imaging condition judging unit 106 judges that the image scene does not satisfy the Condition 1, the normal vector information generating unit 104 may synthesize normal vector information by performing an interpolating process using the normal vector information of the adjacent areas for the shadow areas. This interpolating process requires a conventional approach only.

In addition, the imaging condition judging unit 106 does not necessarily have the optical axis direction detecting unit 312, and for example, it is good to use a processing unit having a function for recognizing an environment where the normal vector information generating device 100c is placed. This is implemented by, for example, using a sonar or the like. A description is given of a normal vector information generating device according to this Variation, of this Embodiment, having such function for recognizing an environment.

Figure 40:
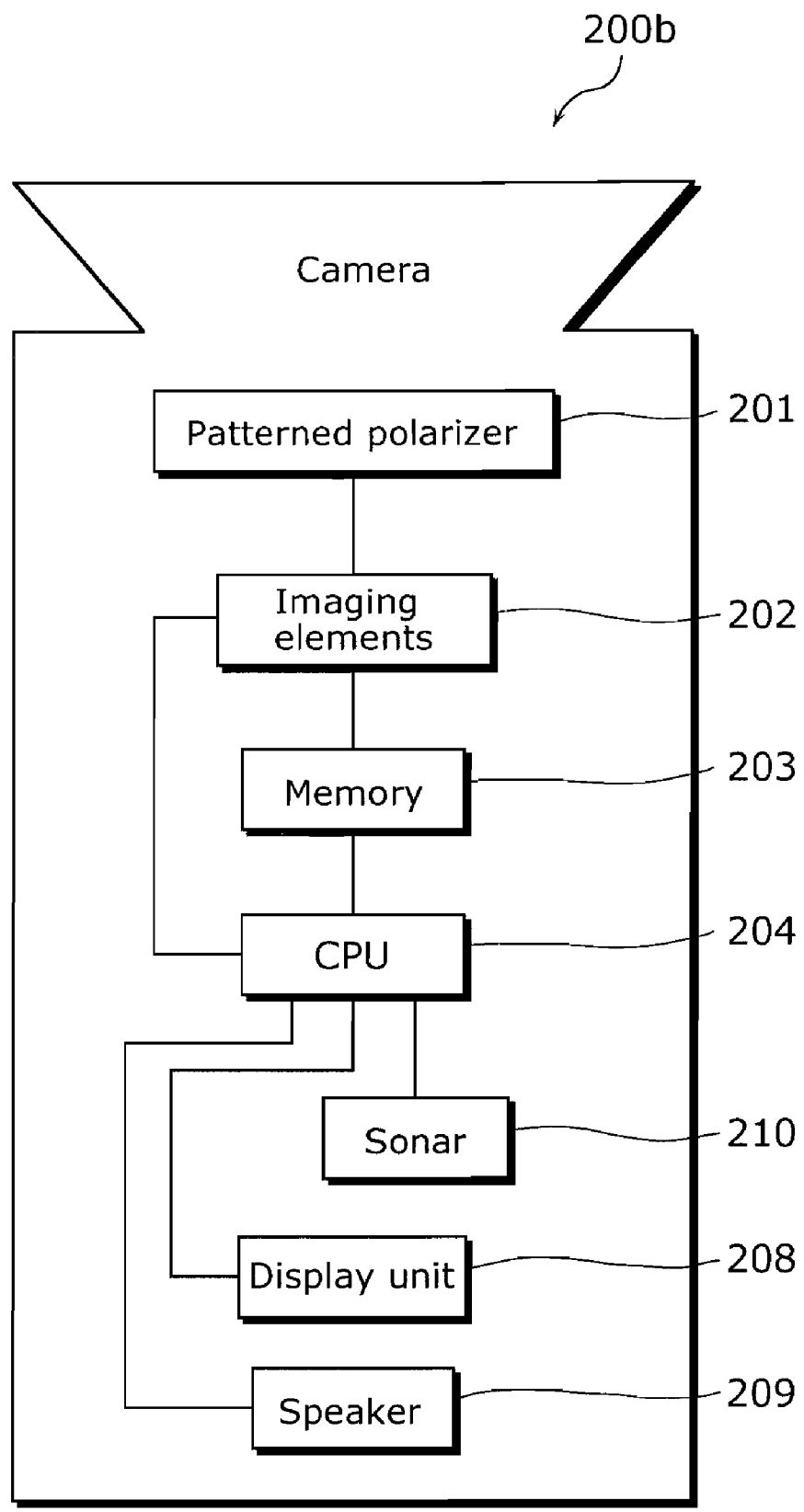
FIG. 40 is a structural example of the camera mounting the normal vector information generating device in a Variation using sonar, of Embodiment 3 of the present invention.

FIG. 40 shows an example of the hardware structure of the camera 200b mounting the normal vector information generating device according to this Variation. This camera 200b has the same structure as that of the camera 200a in this Embodiment shown in FIG. 37 except that the angle sensor 205 is replaced with the sonar 210. It is to be noted that, in FIG. 40, the structural elements common with FIG. 37 are assigned with the same numerical references as those in FIG. 37, and detailed descriptions thereof are omitted.

Figure 41:
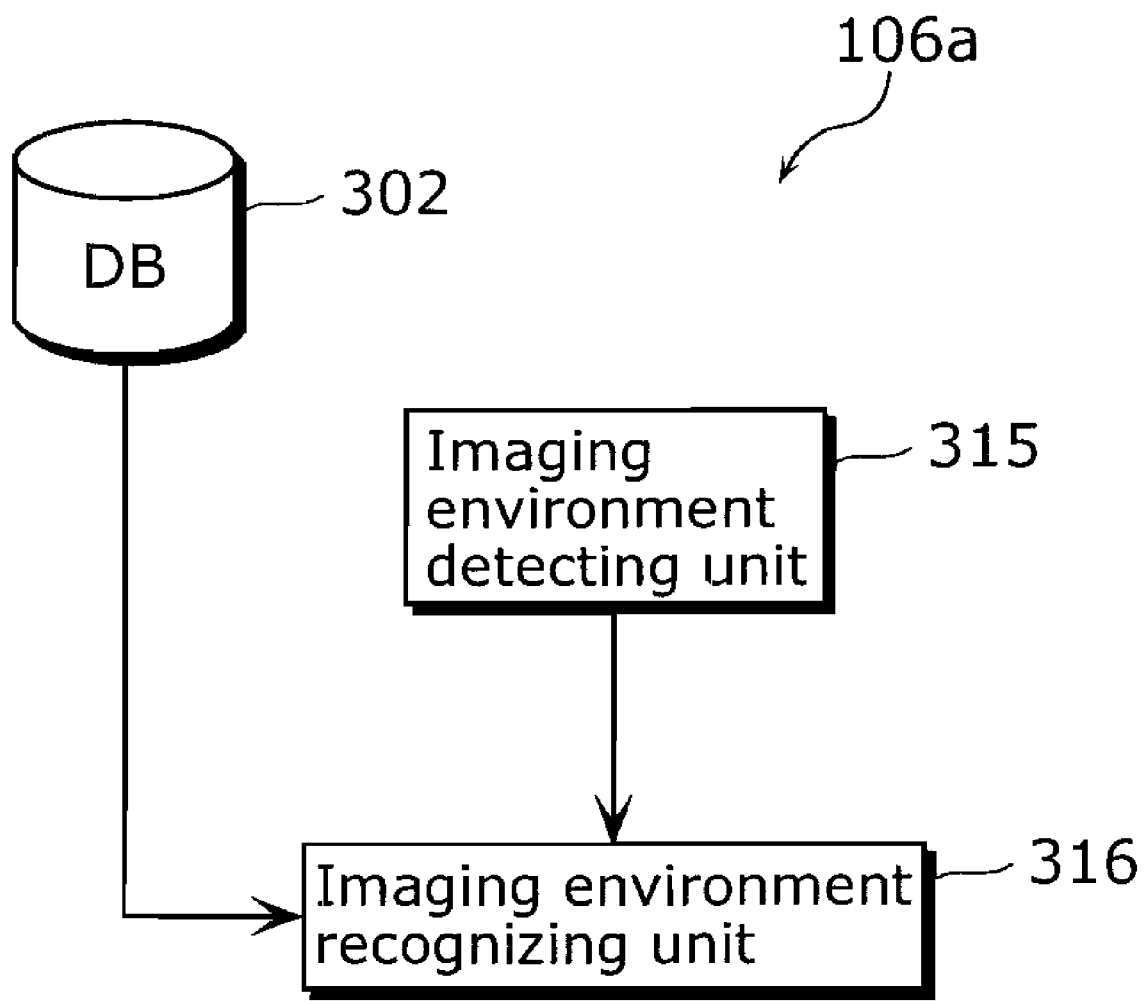
FIG. 41 is a functional block diagram showing a detailed structure of an imaging condition judging unit in Embodiment 3 of the present invention.

FIG. 41 is a functional block diagram showing the detailed structure of the imaging condition judging unit 106a included in the normal vector information generating device according to this Variation. It is to be noted that the normal vector information generating device according to this Variation has the same structure as that of the normal vector information generating device 100c in the Embodiment shown in FIG. 35 except that the imaging condition judging unit 106 is replaced with the imaging condition judging unit 106a. This imaging condition judging unit 106a includes a sonar for measuring a distance to a nearby object by generating a sound wave and receiving a reflected wave of the sound wave, judges whether or not there is a material body near the normal vector information generating device using the sonar, characterized by judging, when it is judged that there is no such material body, that the image scene does not satisfy the imaging condition, and includes a DB 302, an imaging environment detecting unit 315, and an imaging environment recognizing unit 316. It is to be noted that, in FIG. 41, the structural elements common with FIG. 36 are assigned with the same numerical references as those in FIG. 36, and detailed descriptions thereof are omitted.

The imaging environment detecting unit 315 is a processing unit for measuring the distance to the nearby object, and generating the distance information as imaging environment information, and corresponds to the sonar 210 shown in FIG. 40.

The imaging environment recognizing unit 316 is a processing unit for judging whether or not a current environment is an environment where optical area division can be performed on the image scene using the imaging environment information from the imaging environment detecting unit 315.

Figure 42:
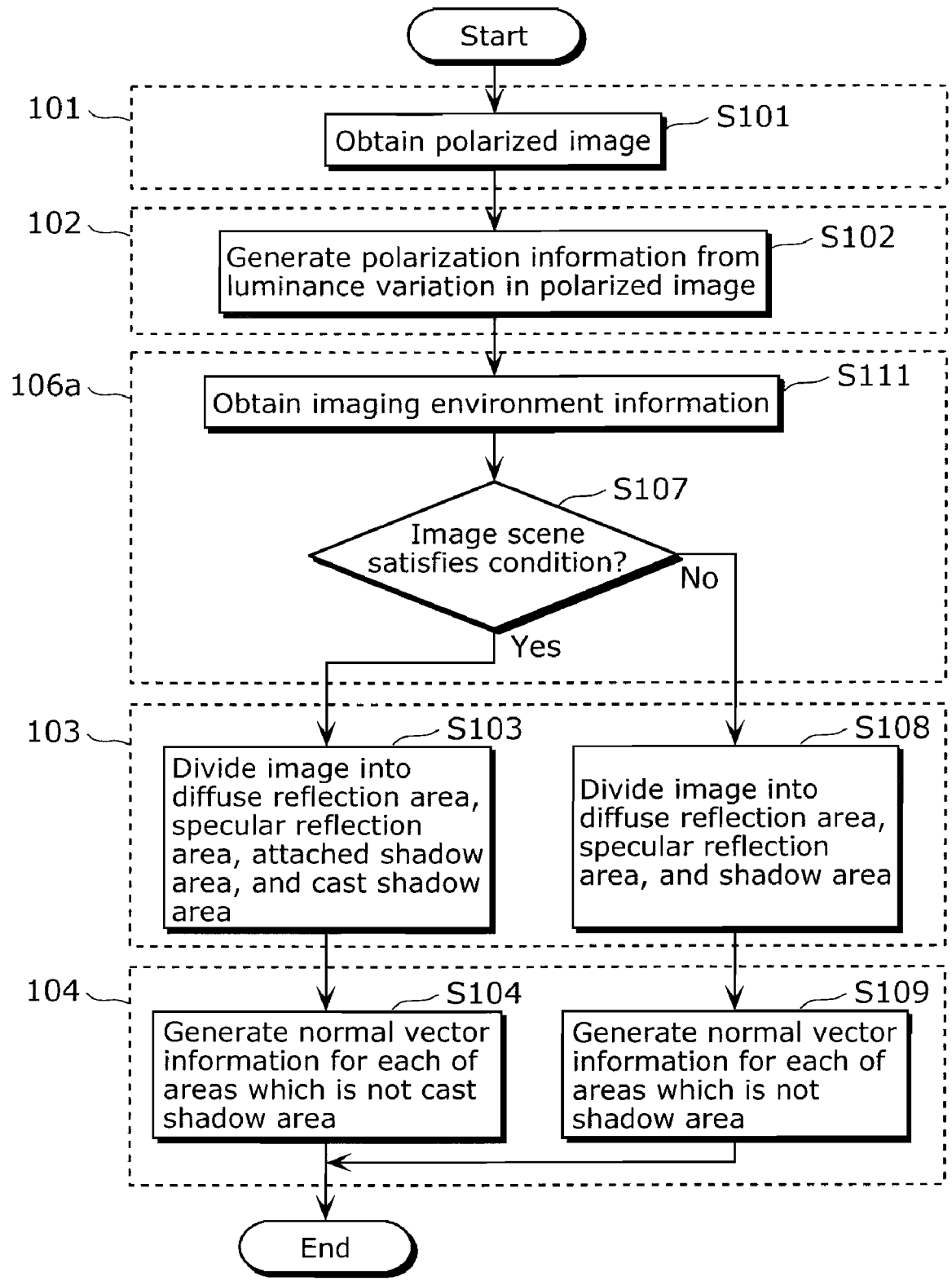
FIG. 42 is a flowchart of processes performed by the normal vector information generating device shown in FIG. 40.

FIG. 42 is a flowchart of processes performed by the normal vector information generating device according to this Variation. It is to be noted that, in FIG. 42, the steps common with FIG. 38 are assigned with the same numerical references as those in FIG. 38, and detailed descriptions thereof are omitted.

In the normal vector information generating device according to this Variation, the imaging environment detecting unit 315 obtains the image environment information using the sonar (S111). This sonar 210 is an active sonar which measures the distance to the nearby object by generating an ultrasound wave and a sound wave, and receiving the reflected wave. Therefore, the use of the sonar 210 makes it possible to detect whether or not there is a material body near the camera 200b, and when there is a material body, obtains the distance information to the material body as the imaging environment information. It is to be noted that the sonar 210 is widely used as a fish detector or the like and is known in public, and thus the detailed descriptions thereof are omitted.

Whether or not a current environment is an environment where optical area division is performed on the image scene is judged based on the imaging environment information calculated in this way (S107). This is performed triggered by that the imaging environment recognizing unit 316 judges whether or not there is a material body near the camera 200b. More specifically, it is only necessary that the imaging environment detecting unit 315 obtains the distance information to a material body near (in all directions) the camera 200b, and evaluates the magnitude of the solid angle at the distance shorter than a constant value TH_S. Here, in the case where the magnitude of the solid angle is less than the threshold value TH_SR, the imaging condition judging unit 106 judges that the image scene does not satisfy the Condition 1 (No in S107), and the area dividing unit 103 classifies the portions of the image into diffuse reflection areas, specular reflection areas, and shadow areas using the polarization information generated by the polarization information generating unit 102 and the luminance information obtained by the polarized image capturing unit 101 (S108). Since the Condition 1 is not satisfied, no classification of shadow areas into attached shadow areas and cast shadow areas is performed. Further, the normal vector information generating unit 104 generates normal vector information from the polarized information based on the result of the area division performed by the area dividing unit 103 (S109). On the other hand, when the magnitude of the solid angle like this is greater than the threshold value TH_SR, the imaging condition judging unit 106 judges that the image scene satisfies the Condition 1 (Yes in S108), and the area dividing unit 103 performs optical area dividing processes and further, the normal vector information generating unit 104 generates normal vector information.

It is to be noted that such threshold value TH_S, and TH_SR may be empirically determined and held in the DB 302.

As described above, according to the normal vector information generating device in this Embodiment, the shadow areas are classified into attached shadow areas and cast shadow areas, and as for the attached shadow areas, accurate normal vector information is generated assuming specular reflection. In addition, as for shadow areas having polarization information including a lot of errors and where only extremely poor accuracy is obtained when normal vector information is generated, not performing normal vector information generating processes makes it possible to generate highly accurate normal vector information of areas as large as possible. Further, when it is difficult to perform classification of shadow areas, it is possible to perform a highly-reliable normal vector information generating processes by notifying an image capturing person of the fact that such processes cannot be performed instead of obtaining a result with a low accuracy.

Embodiment 4

Next, a description is given of the normal vector information generating device in Embodiment 4 of the present invention.

Figure 43:
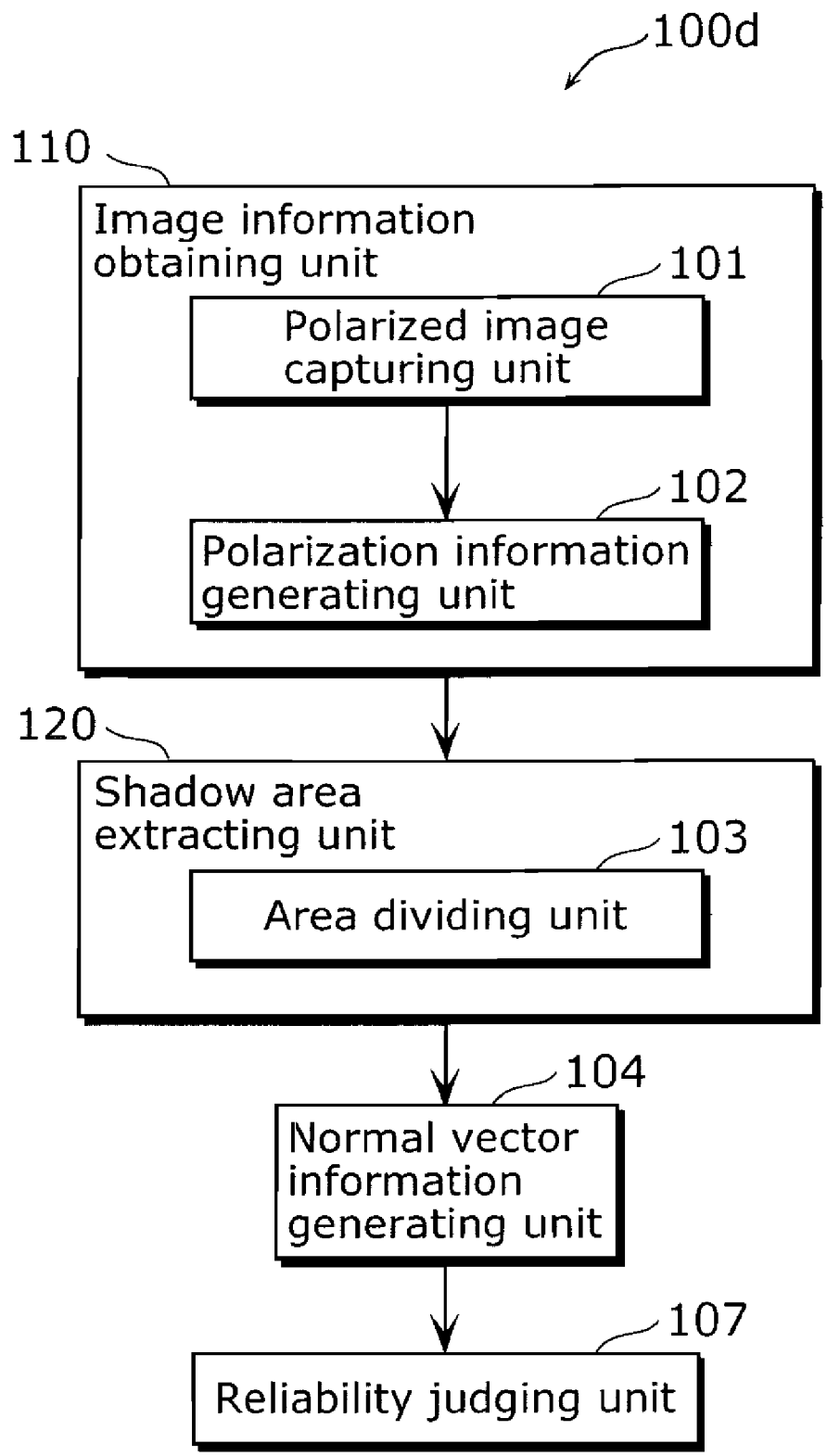
FIG. 43 is a functional block diagram showing the structure of a normal vector information generating device in Embodiment 4 of the present invention.

FIG. 43 is a functional block diagram showing the structure of the normal vector information generating device 100d in this Embodiment. This normal vector information generating device 100d is a device for generating normal vector information on the surface of an object, characterized by not generating normal vector information having a low reliability, and includes a reliability judging unit 107 added to the structure of the normal vector information generating device 100 shown in FIG. 1. It is to be noted that, in FIG. 43, the structural elements common with FIG. 1 are assigned with the same numerical references as those in FIG. 1, and detailed descriptions thereof are omitted. In addition, the camera mounting the normal vector information generating device 100d in this Embodiment has the same hardware structure as that of the camera 200 in Embodiment 1 shown in FIG. 2.

The reliability judging unit 107 evaluates the reliability of the result of the optical area division using the result of the optical area division performed by the area dividing unit 103, and when there is no reliability, discards the result of the optical area division and the normal vector information. As the result, the normal vector information of areas without reliability is discarded.

Figure 44:
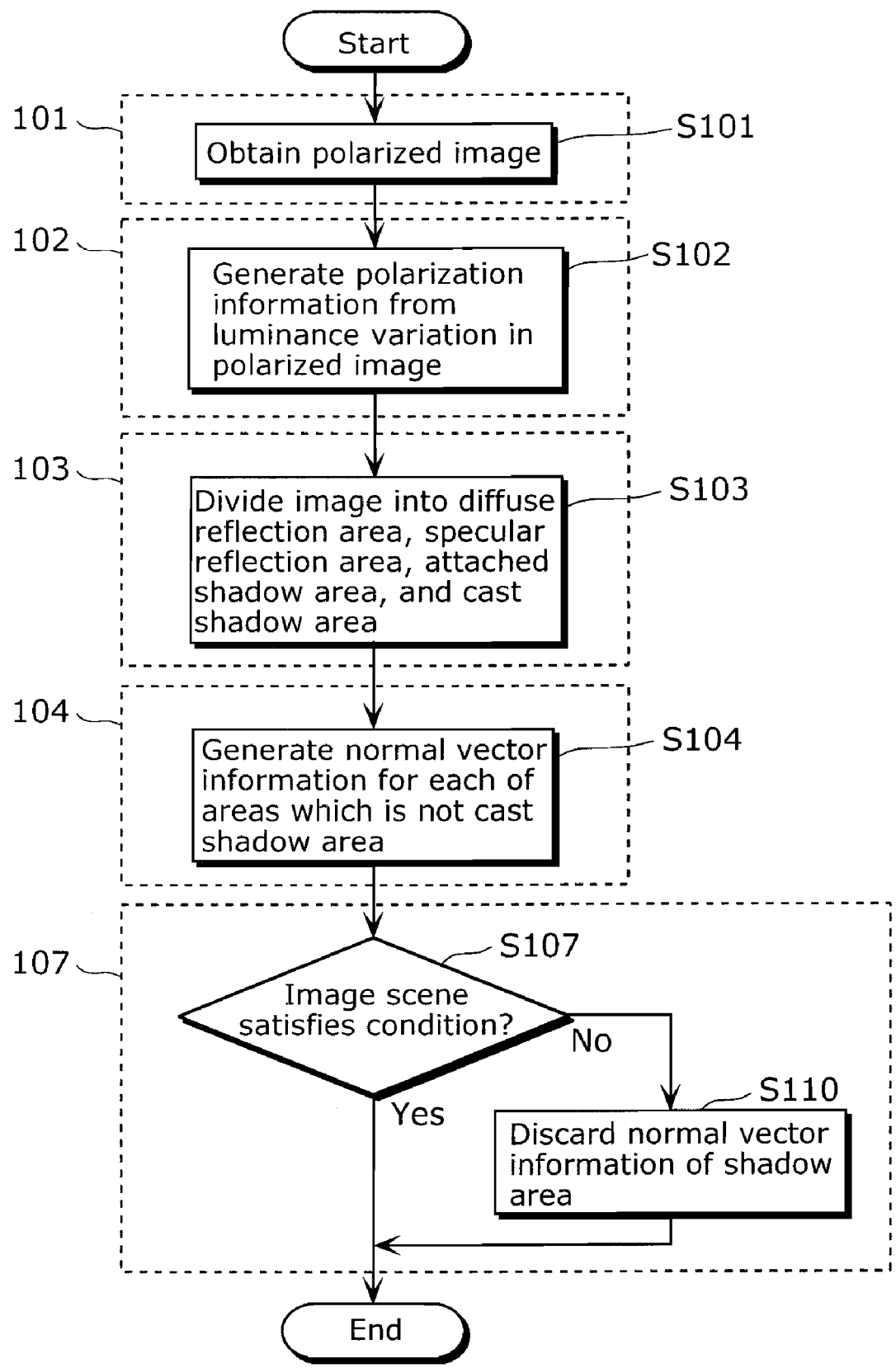
FIG. 44 is a flowchart of processes performed by the normal vector information generating device in Embodiment 4 of the present invention.

FIG. 44 is a flowchart of processes performed by the normal vector information generating device 100d in this Embodiment. It is to be noted that, in FIG. 44, the steps common with FIG. 4 and FIG. 38 are assigned with the same reference numerals as those in FIG. 4, and the detailed descriptions thereof are omitted. The reliability judging unit 107 evaluates whether or not the above-mentioned Condition 1 is satisfied, in other words, the reliability of the result of the optical area division, using the result of the optical area division performed by the area dividing unit 103. In the case where there is no reliability (No in S107), the reliability judging unit 107 discards the result of the optical area division and the normal vector information generated by the normal vector information generating unit 104 (S10).

Here, in order to judge whether or not the Condition 1 is satisfied, it is good to judge whether or not there is an attached shadow area where specular reflection components are dominant due to the influence of multiple specular reflected light within the shadow area. For this, here, a description is given of a method for evaluating the reliability based on the degree of polarization and the luminance value of the polarized image. It is good to judge that the Condition 1 is not satisfied in the case where no pixel indicating specular reflection polarization characteristic exists in the shadow area, in other words, no attached shadow area exists on the image.

Figure 45:
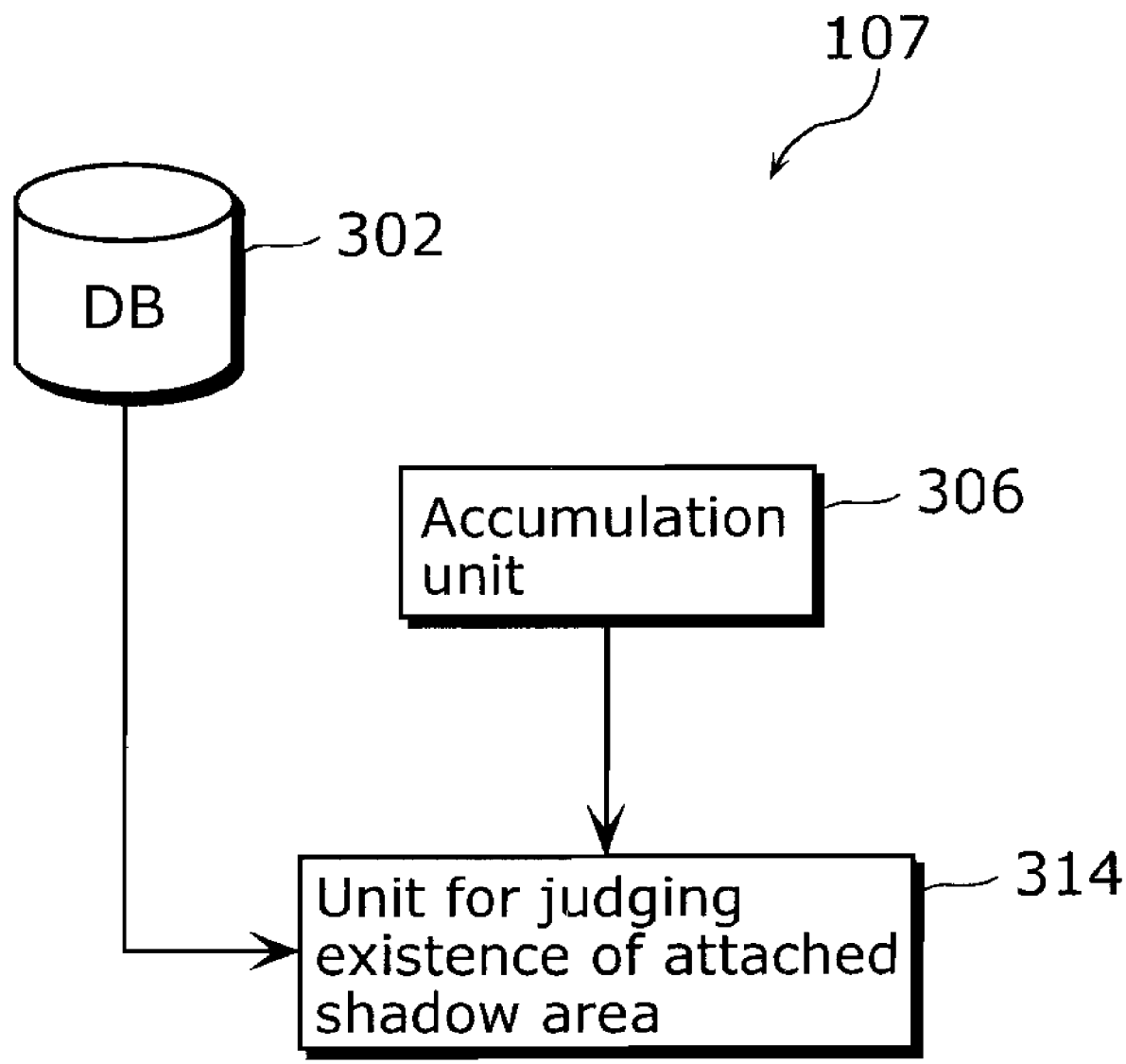
FIG. 45 is a functional block diagram showing a detailed structure of an imaging condition judging unit in Embodiment 4 of the present invention.

FIG. 45 is a functional block diagram showing the detailed structure of the reliability judging unit 107. The reliability judging unit 107 includes the DB 302, the accumulation unit 306, and the unit for judging existence of an attached shadow area 314.

The accumulation unit 306 accumulates the result of area division performed by the area dividing unit 103.

The unit for judging existence of an attached shadow area 314 is a processing unit for referring to the result of the area division accumulated in the accumulation unit 306, and judges whether or not an attached area having a sufficient size (equal to or more than a predetermined threshold value) has been divided.

The following are details of the processes (S107 and S110) performed by the reliability judging unit 107 shown in FIG. 44.

The unit for judging existence of an attached shadow area 314 judges whether or not an attached shadow area having a sufficient size has been divided by referring to the result of the area division accumulated in the accumulation unit 306 (S107). In the case where the result shows that no attached shadow area having a sufficient size exists in an image, more specifically, in 100 pixels or more in a VGA image (No in S107), the reliability judging unit 107 judges that the image scene does not satisfy the Condition 1, and the results of the optical area division of the shadow area and the normal vector information are discarded (S110). At this time, it is desirable that an image capturing person is notified of the fact by means that the display unit 208 displays, on a display, a message indicating that "No normal vector information generating processes of shadow areas can be implemented", or the speaker 209 generates an audio signal. In the opposite case where an attached shadow area exists in the image (Yes in S107), the reliability judging unit 107 judges that the image scene satisfies the Condition 1, and outputs the generated normal vector information. Here, it is good to empirically determine the threshold value for the size of the attached shadow area, and such threshold value may be held in the DB 302.

As described above, according to the normal vector information generating device of the present invention, the shadow areas are classified into attached shadow areas and cast shadow areas, and as for the attached shadow areas, accurate normal vector information is generated assuming specular reflection. In addition, as for shadow areas having polarization information including a lot of errors and where only extremely poor accuracy is obtained when normal vector information is generated, not performing normal vector information generating processes makes it possible to generate highly accurate normal vector information of areas as large as possible. Further, when it is difficult to perform classification of shadow areas, it is possible to perform a highly-reliable normal vector information generating processes by notifying an image capturing person of the fact that such processes cannot be performed instead of obtaining a result with a low accuracy.

Up to this point, the normal vector information generating device according to the present invention has been described using Embodiments 1 to 4, and their Variations, but the present invention is not limited to these Embodiments and Variations.

The present invention includes another embodiment where the structural elements in any of these Embodiments and Variations are arbitrarily combined and implemented, and an embodiment obtainable by making modifications which may be arrived at a person skilled in the art to any of these Embodiments and Variations. In addition, as shown in FIG. 46, the present invention includes application products such as digital still cameras, digital movie cameras, and the like provided with the normal vector information generating device according to the present invention.

In addition, in the case where the reliability judging unit 107 judges that the image scene does not satisfy the Condition 1, it is good to perform normal vector information generating processes instead of not performing the processes, and it is good that the display unit 208 displays, on the display, a message indicating that "Normal vector information generating processes are unstable." or the like, or the speaker 209 notifies the image capturing person of the fact by generating an audio signal.

In addition, when the reliability judging unit 107 judges that the image scene does not satisfy the Condition 1, all normal vector information may be discarded not only the normal vector information of the shadow areas.

In addition, in order to detect cast shadow areas, the shadow area detecting unit 301 shown in FIG. 14 makes a judgment on each shadow area using the luminance value first (for example, S201 in FIG. 15), but the present invention is not limited to this procedure, and such cast shadow areas may be detected based on only polarization information generated by the polarization information generating unit 102. This processing is effective for an object, such as oil painting, where a cast shadow area exists but no attached shadow area exists. This is because, in the case where an object, such as black paint, having a sufficiently low reflectance exists, it is impossible to distinguish the shadow areas and the black paint based on only the above-mentioned luminance value. With reference to the drawings, a detailed description is given of the normal vector information generating device like this according to the Variation of this Embodiment.

Descriptions of the block structures are omitted because the functional block diagrams showing the structure of the normal vector information generating device according to this Variation are the same as that of FIG. 1.

Figure 47:
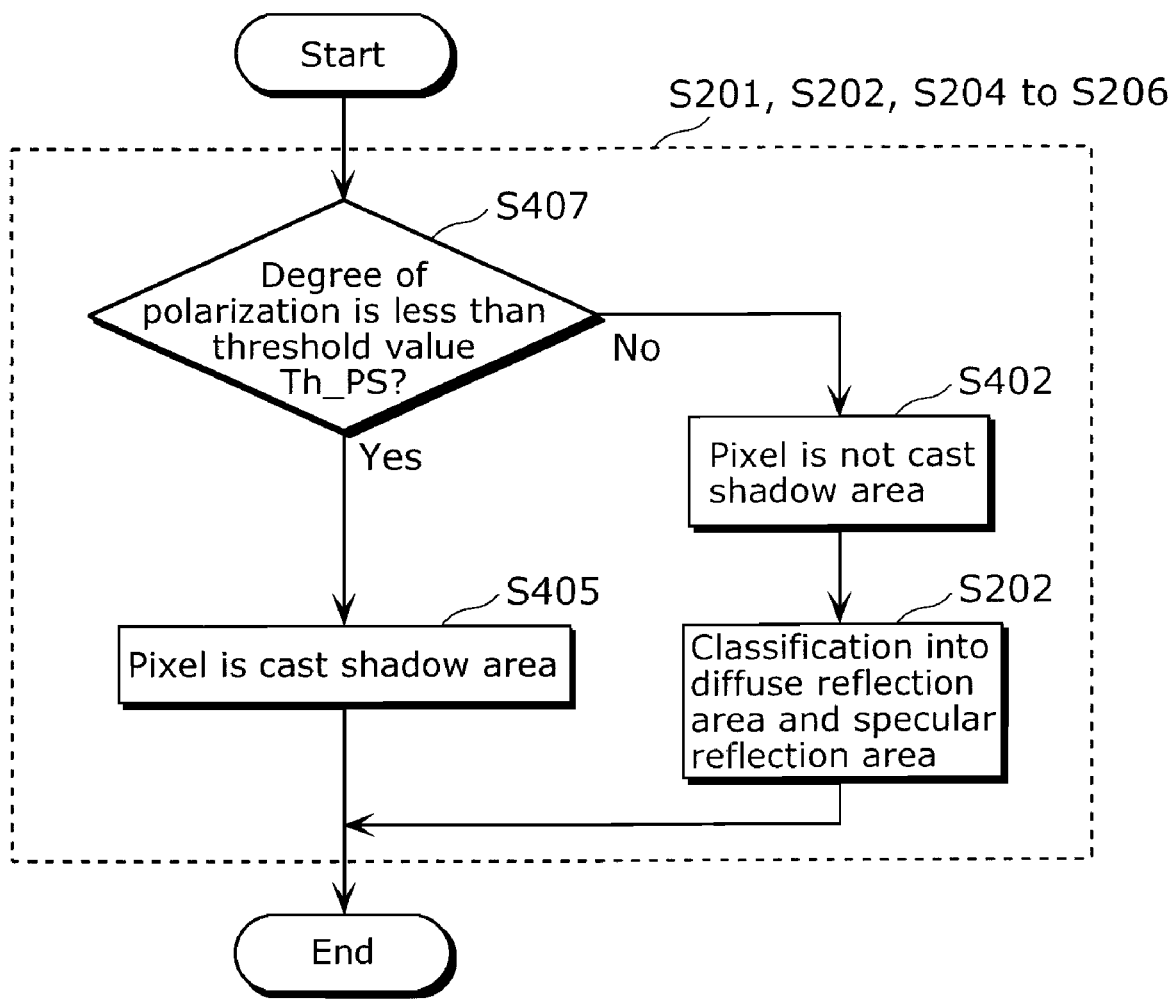
FIG. 47 is a flowchart showing shadow detecting processes performed by the normal vector information generating device according to a Variation of the present invention.

FIG. 47 is a Flowchart of shadow detecting processes performed by the normal vector information generating devices according to this Variation. In other words, FIG. 47 is a flowchart of another approach of the shadow area detecting processes (S201, S202, S204 to S206) shown in FIG. 15. As shown in FIG. 47, the degree-of-polarization comparing unit 303 checks whether the degree of polarization of a pixel is less or greater than the threshold value TH_PS (S407). When the degree of polarization of the pixel is greater than the threshold value TH_PS (No in S407), the shadow area detecting unit 301 judges that the pixel is not a cast shadow area (S402), judges whether diffuse reflection is dominant or specular reflection is dominant in the pixel (S202), and ends the processing. In contrast, when the degree of polarization of the pixel is less than the threshold value TH_PS (Yes in S407), the shadow area detecting unit 301 judges that the pixel is a cast shadow area (S405), and ends the processing.

Figure 49:
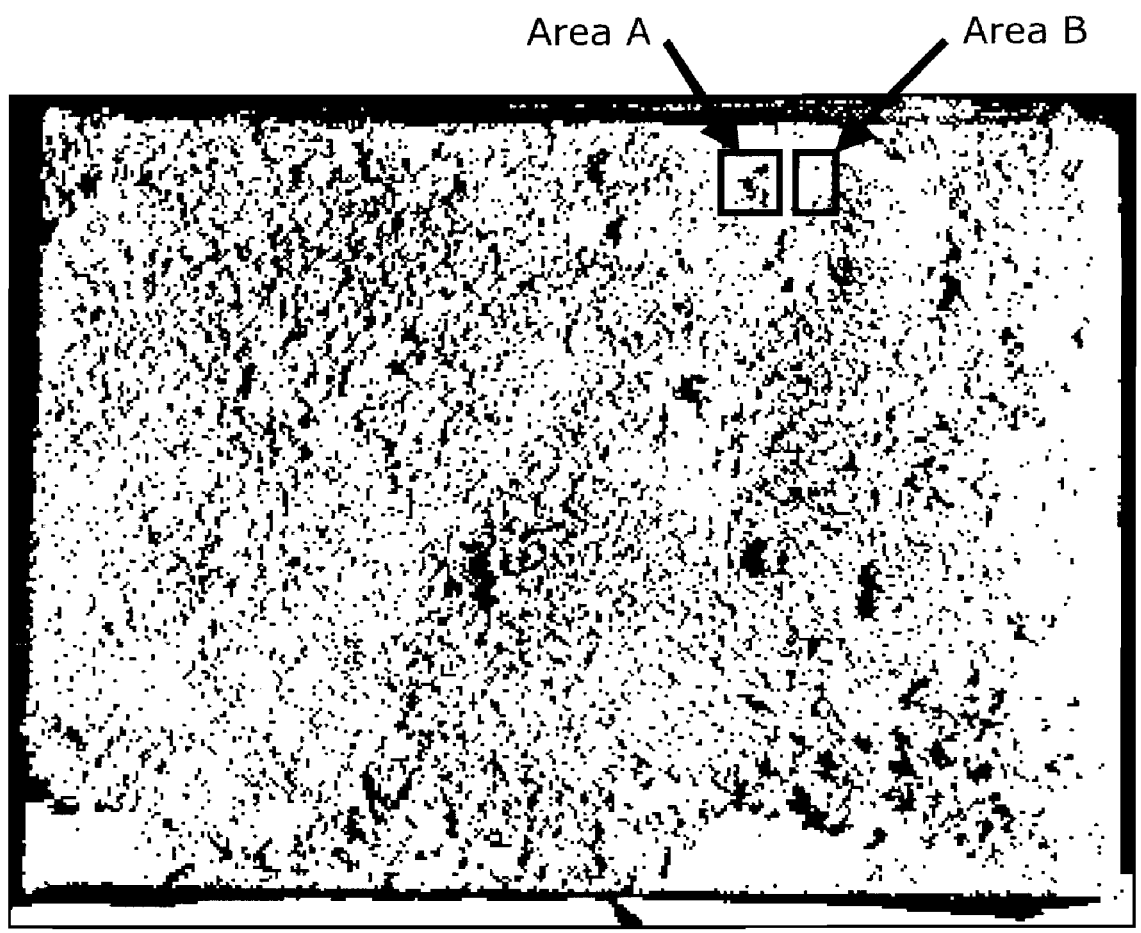
FIG. 49 is a diagram showing a cast shadow area extracted by the normal vector information generating device.

FIG. 48 is a diagram representing, as an image, the degree of polarization ρ in the case where an object of oil painting is imaged. In this diagram, FIG. 48(a) shows an image of oil painting which is an object, and FIG. 48(b) shows the degree of polarization ρ (which is the polarization information generated by the polarization information generating unit 102) corresponding to the image shown in FIG. 48(a). In addition, FIG. 49 shows a cast shadow area which the normal vector information generating device according to this Variation has extracted using the degree of polarization ρ shown in FIG. 48(b) corresponding to the image shown in FIG. 48(a). The black area in this diagram is the extracted cast shadow area. It is to be noted that the cast shadow areas extracted in this way may be finally outputted as cast shadow areas, and that areas newly defined may be finally outputted as cast shadow areas by performing contraction and expansion processes on large areas used in the image processing for each of the cast shadow areas extracted in this way.

The following is an advantage of the image processing performed by the normal vector information generating device according to this Variation. In each of FIG. 48 and FIG. 49, the area A shows a cast shadow area, and the area B shows an area of black paint. As know from the image shown in FIG. 48(a), the luminance information of the area A and the area B are substantially the same, and thus it is difficult to divide the area A and the area B. However, the use of the polarization information of FIG. 48(b) has enabled the accurate area extraction showing that the area A is a cast shadow area and the area B is not a cast shadow area, as shown in FIG. 49.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A normal vector information generating device according to the present invention is useful as a normal vector information generating device which generates normal vector information on the surface of an object, for example, as a device which generates three-dimensional shape information of the object, as a device which highly refines the image using the information, and more specifically, as a digital still camera, a digital movie camera, a surveillance camera or the like.

What is claimed is:

1. A normal vector information generating device which generates normal vector information on a surface of an object, said normal vector information generating device comprising:
   a CPU;
   an image information obtaining unit configured to obtain, using the CPU, information about an image of the object, the information including luminance information which is information about luminance of light from the object and polarization information which is information about polarization of the light from the object;
   a shadow area extracting unit configured to extract an attached shadow area and a cast shadow area from the image of the object based on the luminance information and the polarization information obtained by said image information obtaining unit, the attached shadow area appearing on the surface of the object depending on an angle of incidence light, and the cast shadow area appearing on a surface of a material body other than the object when the light is blocked by the object; and
   a normal vector information generating unit configured to generate normal vector information identifying a normal vector on the surface of the object in the attached shadow area extracted by said shadow area extracting unit using the polarization information obtained by said image information obtaining unit,
   wherein said image information obtaining unit includes:
      a polarization image capturing unit configured to obtain a polarized image of the object having the luminance information; and
      a polarization information generating unit configured to generate, from the obtained polarized image, the polarization information of each of unit images which makes up the polarized image, and
   wherein said shadow area extracting unit is configured to extract the attached shadow area and the cast shadow area by: comparing, for each unit image, luminance of the unit image and a predetermined threshold value based on luminance information of the polarized image; judging that the unit image belongs to a low luminance area including an attached shadow area and a cast shadow area when the luminance is less than the threshold value; and judging, for the unit image belonging to the low luminance area, whether the unit image is the attached shadow area or the cast shadow area, based on the polarization information generated by said polarization information generating unit.

2. The normal vector information generating device according to claim 1,
   wherein said polarization image capturing unit is configured to obtain the polarized image of the object having the luminance information by receiving the light transmitted through a plurality of polarizers each having a different angle of a polarization principal axis, and
   wherein the polarization information generating unit is configured to generate the polarization information of each of unit images which makes up the polarized image using a correspondence relationship between the angle of the polarization principal axis of each of the plurality of polarizers and luminance of the light transmitted through the plurality of polarizers.

3. The normal vector information generating device according to claim 2,
   wherein said polarized image capturing unit includes a plurality of imaging units for obtaining the polarized image,
   each of the plurality of imaging units includes:
   a plurality of polarizers each having a different angle of a polarization principal axis; and
   a plurality of unit pixels each receiving light transmitted through a corresponding one of the plurality of polarizers; and
   said polarization information generating unit is configured to generate polarization information using, as the unit images, the image obtained by said imaging units.

4. The normal vector information generating device according to claim 2,
   wherein said normal vector information generating unit is configured to generate, for the attached shadow area, the angle of the polarization principal axis as normal vector information of an incidence plane of the object corresponding to the area, the angle of the polarization principal axis being an angle at which luminance is a minimum in the correspondence relationship.

5. The normal vector information generating device according to claim 2,
wherein said normal vector information generating unit is configured to generate the normal vector information of only the attached shadow area among the attached shadow area and the cast shadow area.

6. The normal vector information generating device according to claim 2,
wherein said shadow area extracting unit is configured to judge whether or not the polarization information of the unit image belonging to the low luminance area indicates polarization characteristics of specular reflection, and extract the unit image as the attached shadow area in the case where said shadow area extracting unit judges that the polarization information shows polarization characteristics of specular reflection.

7. The normal vector information generating device according to claim 2,
wherein said polarization information generating unit is configured to generate, as the polarization information, a degree of polarization which is a parameter indicating a degree of polarization of light, and
said shadow area extracting unit is configured to compare the degree of polarization in the unit image belonging to the low luminance area and a predetermined threshold value, extract the unit image as the cast shadow area when the degree of polarization is less than the threshold value, and extract the unit image as the attached shadow area when the degree of polarization is equal to or greater than the threshold value.

8. The normal vector information generating device according to claim 2,
wherein said polarization information generating unit is configured to generate, as the polarization information, an estimated polarization error which is a difference between the luminance obtained by said polarization image capturing unit and luminance determined from a sinusoidal approximating a correspondence relationship between the angle of the polarization principal axis and the obtained luminance, and
said shadow area extracting unit is configured to compare the estimated polarization error in the unit image belonging to the low luminance area and the predetermined threshold value, extract, as the cast shadow area, the unit image when the estimated polarization error is greater than the threshold value, and extract, as the attached shadow area, the unit image when the estimated polarization error is equal to or less than the threshold value.

9. The normal vector information generating device according to claim 2,
wherein said polarization image capturing unit is configured to obtain a first polarized image obtained in the case where light from a flash is projected on the object and a second polarized image obtained in the case where no light from a flash is projected on the object, and
said shadow area extracting unit is configured to calculate, for each unit image belonging to the low luminance area, a difference between the first polarized image and the second polarized image, compare the calculated difference and the predetermined threshold value, and extract the unit image as the attached shadow area or the cast shadow area when the difference is greater than the threshold value.

10. The normal vector information generating device according to claim 2,
wherein said shadow area extracting unit is configured to judge whether or not the polarization information of the unit image belonging to the low luminance area indicates polarization characteristics of specular reflection, and extract the unit image as the attached shadow area or the low reflectance area in the case where said shadow area extracting unit judges that the polarization information shows polarization characteristics of specular reflection.

11. The normal vector information generating device according to claim 10,
wherein said normal vector information generating unit is configured to generate, for the attached shadow area or the low reflectance area, the angle of the polarization principal axis as normal vector information of the incidence plane of the object corresponding to the area, the angle of the polarization principal axis being an angle at which luminance is a minimum in the correspondence relationship.

12. The normal vector information generating device according to claim 10,
wherein said normal vector information generating unit is configured to generate the normal vector information of only the attached shadow area or the low reflectance area from among the attached shadow area or the low reflectance area and the cast shadow area.

13. The normal vector information generating device according to claim 10,
wherein said polarization information generating unit is configured to generate, as the polarization information, a degree of polarization which is a parameter indicating a degree of polarization of light, and
said shadow area extracting unit is configured to compare the degree of polarization in the unit image belonging to the low luminance area and the predetermined threshold value, extract the unit image as the cast shadow area when the degree of polarization is less than the threshold value, and extract the unit image as the attached shadow area or the low reflectance area when the degree of polarization is equal to or greater than the threshold value.

14. The normal vector information generating device according to claim 10,
wherein said polarization information generating unit is configured to generate, as the polarization information, an estimated polarization error which is a difference between the luminance obtained by said polarization image capturing unit and luminance determined from a sinusoidal approximating a correspondence relationship between the angle of the polarization principal axis and the obtained luminance, and
said shadow area extracting unit is configured to compare the estimated polarization error in the unit image belonging to the low luminance area and a predetermined threshold value, extract the unit image as the cast shadow area when the estimated polarization error is greater than the threshold value, and extract the unit image as the attached shadow area or the low reflectance area when the estimated polarization error is equal to or less than the threshold value.

15. The normal vector information generating device according to claim 1, comprising
an imaging condition judging unit configured to judge whether or not an image scene to be imaged by said polarization image capturing unit satisfies a predetermined imaging condition which allows said normal vector information generating unit to generate accurate normal vector information, wherein said shadow area extracting unit is configured to cancel area extraction as a low luminance area in the case where said imaging condition judging unit judges that the imaging condition is not satisfied.

16. The normal vector information generating device according to claim 15, wherein the predetermined imaging condition is a condition that a material body including a large plane exist near the object in an image scene, and a light source exist opposite to the large plane across the object.

17. The normal vector information generating device according to claim 15, wherein said imaging condition judging unit has an angle sensor for detecting an imaging direction of said polarized image capturing unit, and is configured to judge that the image scene does not satisfy the imaging condition in the case where said angle sensor detects that said polarized image capturing unit faces upward from a horizontal plane.

18. The normal vector information generating device according to claim 15, wherein said imaging condition judging unit includes a sonar for measuring a distance to a nearby target by generating a sound wave and receiving a reflected wave of the sound wave, and is configured to judge whether or not there is a material body near the normal vector information generating device using the sonar, and judges that the image scene does not satisfy the imaging condition in the case where said imaging condition judging unit judges that there is no material body.

19. The normal vector information generating device according to claim 1, comprising a reliability judging unit configured to judge whether area extraction is reliable or not by evaluating a result of the area extraction performed by said shadow area extracting unit, and discard the result of the area extraction performed by said shadow area extracting unit and the normal vector information generated by said normal vector information generating unit in the case where said reliability judging unit judges that the area extraction is not reliable.

20. The normal vector information generating device according to claim 19, wherein said reliability judging unit is configured to judge whether or not an attached shadow area exists in a low luminance area as the result of the area extraction performed by said shadow area extracting unit, and judge that the area extraction is not reliable in the case where no attached shadow area exists in the low luminance area.

21. A normal vector information generating method for generating normal vector information on a surface of an object, said normal vector information generating method comprising:

obtaining, using a CPU, information about an image of the object, the information including luminance information which is information about luminance of light from the object and polarization information which is information about polarization of the light from the object;

extracting an attached shadow area and a cast shadow area from the image of the object based on the luminance information and the polarization information obtained in said obtaining, the attached shadow area appearing on the surface of the object depending on an angle of incidence light, and the cast shadow area appearing on a surface of a material body other than the object when the light is blocked by the object; and generating normal vector information identifying a normal vector on the surface of the object in the attached shadow area extracted in said extracting using the polarization information obtained in said obtaining, wherein said obtaining comprises:

obtaining a polarized image of the object having the luminance information; and generating, from the obtained polarized image, the polarization information of each of unit images which makes up the polarized image, and wherein said extracting comprises:

comparing, for each unit image, luminance of the unit image and a predetermined threshold value based on luminance information of the polarized image;

judging that the unit image belongs to a low luminance area including an attached shadow area and a cast shadow area when the luminance is less than the threshold value; and judging, for the unit image belonging to the low luminance area, whether the unit image is the attached shadow area or the cast shadow area, based on the generated polarization information.

22. A computer-readable storage medium having a program stored thereon for a normal vector information generating device which generates normal vector information on a surface of an object, said program causing a computer to execute the normal vector information generating method according to claim 21.

* * * * *